(12) United States Patent
Bellof et al.

(10) Patent No.: US 12,507,693 B2
(45) Date of Patent: Dec. 30, 2025

(54) ACTIVE COMPOUND COMBINATIONS COMPRISING FATTY ACIDS

(71) Applicant: Bayer Aktiengesellschaft, Leverkusen (DE)

(72) Inventors: Svenja Bellof, Solingen (DE); Joachim Meyer, Leverkusen (DE); Xavier Alaine Marie Van Waetermeulen, Sante Foy les Lyon (FR)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 885 days.

(21) Appl. No.: 17/777,897

(22) PCT Filed: Nov. 16, 2020

(86) PCT No.: PCT/EP2020/082285
§ 371 (c)(1),
(2) Date: May 18, 2022

(87) PCT Pub. No.: WO2021/099271
PCT Pub. Date: May 27, 2021

(65) Prior Publication Data
US 2022/0408727 A1   Dec. 29, 2022

(30) Foreign Application Priority Data
Nov. 18, 2019 (EP) .................................. 19209801

(51) Int. Cl.
| | | |
|---|---|---|
| A01N 37/06 | (2006.01) | |
| A01N 37/02 | (2006.01) | |
| A01N 43/40 | (2006.01) | |
| A01N 43/78 | (2006.01) | |
| A01N 53/00 | (2006.01) | |
| A01P 7/04 | (2006.01) | |

(52) U.S. Cl.
CPC ............ *A01N 37/06* (2013.01); *A01N 37/02* (2013.01); *A01N 43/40* (2013.01); *A01N 43/78* (2013.01); *A01N 53/00* (2013.01); *A01P 7/04* (2021.08)

(58) Field of Classification Search
CPC ........ A01N 37/06; A01N 37/02; A01N 43/40; A01N 43/78; A01N 53/00; A01N 37/04; A01P 7/04
See application file for complete search history.

(56) References Cited

U.S. PATENT DOCUMENTS

| | | |
|---|---|---|
| 2022/0022463 A1 | 1/2022 | Münks et al. |
| 2022/0132851 A1 | 5/2022 | Herrmann et al. |

FOREIGN PATENT DOCUMENTS

| | | |
|---|---|---|
| EP | 3123862 A1 | 2/2017 |
| WO | 90/03730 A1 | 4/1990 |
| WO | WO-2009103991 A2 * | 8/2009 ............ A01N 37/02 |
| WO | 2016/189329 A1 | 12/2016 |
| WO | 2017/092978 A1 | 6/2017 |
| WO | 2020187656 A1 | 9/2020 |
| WO | 2021064075 A1 | 4/2021 |

OTHER PUBLICATIONS

Anonymous: "United States Office of Prevention, Pesticides Environmental Protection and Toxic Substances Agency (H-7 508WI Eligillility Document (RED) Soap Salts", 2000, :https://www.floraldaily.com/article/9016667/uk-sceptreplus-delivers-newbiopesticide/ (Year: 2000).*
Anonymous: "UK: SCEPTREplus delivers new biopesticide", https://www.floraldaily.com/, 2018 (Year: 2018).*
Jude Bennison: "Efficacy of plant protection products against western flower thrips (WFT) on protected ornamentals", https://projectblue.blob.core.windows.neUmedia/Default/ Research%20 Papers/Horticulture/CP%20165%20SCEPTREplus%20Final%20Report%20SP15%20Western%2 (Year: 2018).*
Anonymous, "UK: SCEPTREplus delivers new biopesticide", Aug. 14, 2018 (Aug. 14, 2018), XP055770870, Retrieved from the Internet: URL:https://www.floraldaily.com/article/90 16667/uk-sceptreplus-delivers-new-biopesticide/ [retrieved on Feb. 1, 2021].
Anonymous, "United States Office of Prevention, Pesticides Environmental Protection and Toxic Substances Agency (H-7 508W1 Eligillility Document (RED) Soap Salts", Oct. 16, 2000, XP055771245, Oct. 16, 2000 (Oct. 16, 2000), XP055771245, Retrieved from the Internet: URL:https://www.floraldaily.com/article/90 16667/uk-sceptreplus-delivers-new-biopesti cide/ [retrieved on Feb. 2, 2021].
Bennison, J., "Efficacy of Plant Protection Products Against Western Flower Thrips (WFT) on Protected Ornamentals", Retrieved from the Internet: URL:https://projectblue.blob.core.windows. net/media/Default/Research%20Papers/Horticulture/CP%20165%20SCEPTREplus%20Final%20Re port%20SP15%20Western%20Flower%20Thrips%20 in%20verbena.pdf [retrieved on Feb. 1, 2021].
International Search Report and Written Opinion of the International Searching Authority for PCT International Patent Application No. PCT/EP2020/082285, dated Feb. 15, 2021, 12 pages.

* cited by examiner

*Primary Examiner* — Deborah D Carr
(74) *Attorney, Agent, or Firm* — Michael VanEngelen

(57) ABSTRACT

The present invention relates to active compound combinations, in particular within a pesticide composition, which comprise as compound (a) one or more fatty acids or derivatives thereof selected from unsaturated and saturated $C_{12-24}$ fatty acids, salts thereof, esters thereof or mixtures of any of the foregoing and as compound (b) at least one further pesticidally active agent. Moreover, the invention relates to pest control compositions comprising such compound combination and to the use of the compound combinations and the pest control compositions for control of insects, nematodes or mites in crop protection and in the protection of industrial materials.

13 Claims, No Drawings

ACTIVE COMPOUND COMBINATIONS COMPRISING FATTY ACIDS

CROSS-REFERENCE TO RELATED APPLICATIONS

The present application is a 35 U.S.C. § 371 national phase entry of International Application No. PCT/EP2020/082285, filed on Nov. 16, 2020, which claims priority to European Patent Application No. 19209801.0 filed Nov. 18, 2019, all of which are hereby incorporated by reference in their entirety.

The present invention relates to active compound combinations, which comprise as compound (a) one or more fatty acids or derivatives thereof selected from unsaturated and saturated C12-24 fatty acids, salts thereof, esters thereof or mixtures of any of the foregoing and as compound (b) at least one further pesticidally active agent as specified below. Moreover, the invention relates to pest control compositions comprising such compound combination and to the use of the compound combinations as biologically active agent, especially for control of insects and other pests in crop protection and in the protection of industrial materials and as plant growth regulators.

WO2016/189329 discloses the use of a combination of certain fatty acids and a *Trichoderma* strain to increase plant health or to combat nematodes or certain fungal diseases. WO2017/092978 discloses compositions of a metal compound and certain fatty acids for crop defense and against fungi, oomycetes and bacteria.

Albeit fatty acids or fatty acid derivatives provide excellent means in protecting plants from insect pests, there is still the need to even improve those means in order to address the ever increasing environmental and economic requirements imposed on modern-day crop protection agents and compositions. This includes, for example, improvement to the spectrum of action, safety profile, selectivity, application rate, formation of residues, and favorable preparation ability, and development of new compositions to deal with potential problems, like resistances.

The present invention provides active compound combinations and compositions comprising said combinations which at least in some aspects achieve the stated objective.

Accordingly, the present invention provides active compound combinations comprising (a) one or more fatty acids or derivatives thereof selected from unsaturated and saturated C12-24 fatty acids, salts thereof, esters thereof or mixtures of any of the foregoing; and (b) at least one pesticidally active agent.

The term "one or more" in connection with the present invention relates to one or more different members of a kind, for example two, three, four etc. different kinds of fatty acids or derivatives thereof as described herein.

Compound a) as well as compound b) may comprise more than one active ingredient. For example, compound a) may comprise more than one different fatty acids or derivatives thereof as described hereunder. Equally, compound b) may comprise more than one further pesticidally active agent. In such cases, such compound a) or b) may also be referred to as component a) or component b).

Compounds or components a) and b) of the present active compound combination may be present in a composition, which is obtained e.g. by mixing both compounds with at least one agriculturally acceptable auxiliary. Another way of obtaining a composition of both compounds is to mix a composition comprising compound a) and another composition comprising compound b), wherein each of these compositions comprise the respective compound mixed with at least one agriculturally acceptable auxiliary. In other words, the latter composition is composed of two formulations comprising one of compounds a) or b).

In general "pesticidally active" or "pesticidal" means the ability of a substance to increase mortality or inhibit the growth rate of plant pests. The term is used herein, to describe the property of a substance to exhibit activity against insects, acarids such as mites and/or nematodes. Accordingly, in the sense of the present invention the term "pests" include insects, acarids and nematodes.

Fatty acids are compounds of formula $RCO_2H$ where R is an aliphatic hydrocarbon group. Typically, R is a long chain aliphatic hydrocarbon group. For the purpose of the present invention, R may be a saturated or unsaturated aliphatic hydrocarbon group having from 11 to 23 carbons (i.e. a C12-24 fatty acid). Typically, R is a linear, saturated or unsaturated aliphatic hydrocarbon group having from 11 to 23 carbon atoms, e.g. a linear C11-23 alkane group or a linear C11-23 alkene group. R is often a linear, saturated or unsaturated, aliphatic hydrocarbon group having from 11 to 21 carbon atoms, e.g. a linear C11-21 alkane group or a linear C11-21 alkene group. Unsaturated aliphatic hydrocarbon groups typically contain from 1 to 4 double bonds, for instance 1 or 2 double bonds.

Derivatives of fatty acids include salts, esters and amides of the fatty acid. Typically, a derivative of the fatty acid, as used herein is a salt or an ester of the fatty acid.

An ester of a fatty acid is typically an ester of the fatty acid with an alcohol such as methanol, ethanol, propanol, butanol, ethane-1,2-diol, propane-1,3-diol and propane-1,2,3-triol (glycerol). The derivative of the fatty acid may be a salt of the fatty acid or a methyl ester of the fatty acid (i.e. $RCO_2Me$). Alternatively, the derivative of the C12-C24 fatty acid may be an ester of methanol, ethanol, 1-propanol, 2-propanol, butanol or a mixture thereof.

A salt of a fatty acid is typically a metal salt of the fatty acid. Often, the one or more fatty acids or derivatives thereof are one or more metal salts of fatty acids. The metal salts are typically alkali metal salts or earth alkali metal salts, but also comprise aluminum, copper, iron and zinc salts. Alkali metal salts of fatty acids include lithium, sodium, potassium and rubidium salts of fatty acids. The composition may therefore comprise one or more fatty acids or sodium or potassium salts thereof. For instance, compound/component (a) may be one or more sodium or potassium salt of fatty acids. Earth alkali metal salts of fatty acids include magnesium and calcium salts. The active compound combination may therefore comprise one or more fatty acids or magnesium or calcium salts thereof as component a). For instance, component (a) may be one or more magnesium or calcium salt of fatty acids. Alternatively, or in addition, component (a) may be one or more aluminum, copper, iron or zinc salt of fatty acids. Such salts may be formed by reacting the one or more fatty acids with a base comprising the desired metal cation, for instance by reacting one or more fatty acids with sodium hydroxide or potassium hydroxide in case of alkali metals, magnesium hydroxide or calcium hydroxide for earth alkali metals, or aluminum hydroxide, copper hydroxide, zinc hydroxide or iron hydroxide for other metals.

In a preferred embodiment, compound/component a) is one or more fatty acid (hereinafter also sometimes referred to as (I.01)). In other words, in this preferred embodiment, the active compound combination according to the invention comprises one or more fatty acids but not salts or derivatives thereof.

The one or more fatty acids or derivatives thereof as described above may be present in a mixture. For example, component a) may comprise one or more fatty acids and one or more esters of at least one fatty acid and/or one or more salt of a fatty acid. In this respect, the fatty acid forming the basis of the one or more ester and/or the one or more salt of fatty acids may be the same or a different fatty acid than a fatty acid comprised in the part of the composition according to a). For example, if a mixture of fatty acids and salts of fatty acids is present, the ratio of fatty acids:salts of fatty acids may range between 1:10000 and 10000:1, such as between 1:1000 and 1000:1.

The one or more fatty acids or derivatives thereof are typically selected from: saturated or unsaturated acids selected from undecylic acid (C11), lauric acid (C12), tridecylic acid (C13), myristic acid (C14), pentadecanoic acid (C15), palmitic acid (C16), margaric acid (C17), stearic acid (C18), nonadecylic acid (C19), arachidic acid (C20), heneicosylic acid (C21), behenic acid (C22), tricosylic acid (C23), lignoceric acid (C24), and derivatives thereof; and unsaturated acids selected from u-linolenic acid (C18:3), stearidonic acid (C18:4), eicosapentaenoic acid (C20:5), docosahexaenoic acid (C22:6), linoleic acid (C18:2), y-linolenic acid (C18:3), dihomo-y-linolenic acid (C20:3), arachidonic acid (C20:4), adrenic acid (C22:4), palmitoleic acid (C16:1), vaccenic acid (C18:1), paullinic acid (C20:1), oleic acid (C18:1), elaidic acid (Ctrans-18:1), gondoic acid (C20:1), erucic acid (C22:1), nervonic acid (C24:1), mead acid (20:3) and derivatives thereof.

The notation CM:N fatty (where M and N are integers), as used herein, means that the fatty acid comprises M carbon atoms and N double bonds. The N double bonds may be at any position (cis or trans configuration), although two double bonds are not usually adjacent (i.e. bonded to the same carbon atom). Thus, C18:0 (or simply C18) covers only octadecanoic acid (stearic acid) and C18:1 includes all fatty acids having 18 carbons and one double bond, such as oleic acid ((Z)-octadec-9-enoic acid) and vaccenic acid ((E)-octadec-11-enoic acid).

The fatty acids or derivatives thereof may originate from any plant producing such fatty acids, preferably from an organ of a plant producing and/or containing high contents of fatty acids such as seeds. Examples of such seeds include apple seed, argan seed, coconut, colza, canola, corn, cottonseed, grape seed, hazelnut, macadamia, mustard, *niger* seed, olive, palm kernel, peanut, poppyseed, pumpkin seed, ramtil, rice bran, safflower, soybean, sesame, sunflower, tamarind seed, tea seed and walnut. Preferably, the fatty acids or derivatives thereof originate from olive oil, sunflower oil (both regular and high oleic acid sunflower oil), soybean oil and canola oil. More preferably, the fatty acids originate from olive oil obtained from the endocarp and/or olive seed (olive pits). The fatty acids or derivatives thereof may also be Tall Oil Fatty Acids (TOFA). TOFA are based on a by-product of the Kraft process of wood pulp manufacture when pulping mainly coniferous trees called tall oil and are a result of reducing rosin content of tall oil to between 1 and 10 wt. %, e.g. by fractional distillation. TOFA consists mainly of oleic acid.

The fatty acids or derivatives thereof may equally originate from animals (for a review see Food Processing: Principles and Applications, Second Edition. Edited by Stephanie Clark, Stephanie Jung, and Buddhi Lamsal© 2014 John Wiley & Sons, Ltd. Published 2014 by John Wiley & Sons, Ltd; Chapter 21: Fats and Oils—Animal Based).

In the course of the present invention, it has surprisingly been found that the action of certain pesticidal agents can be enhanced by co-application of one or more fatty acid or derivative thereof according to the invention. Fatty acids and derivatives thereof are themselves also considered to be biological plant protection agents and have obtained market authorization as such, thus the combination of such agents with other biological control agents results in an efficient measure for biological plant protection which can be similar to the application of chemical plant protection agents. In combinations comprising a chemical pesticidally active agent as compound/component b), combination of both may result in increased efficacy, a different efficacy spectrum or reduced residues due to less chemical agents needed to be applied.

In one embodiment, said one or more fatty acids or derivatives thereof are selected from unsaturated and saturated C14-20 fatty acids, salts thereof, esters thereof or mixtures of any of the foregoing. The one or more fatty acids or derivatives thereof may also be selected from unsaturated and saturated C16-20 fatty acids, and salts or esters thereof.

Preferably, the one or more fatty acids or derivatives thereof comprises two or more fatty acids selected from C16:0 fatty acids, C16:1 fatty acids, C18:0 fatty acid, C18:1 fatty acids, C18:2 fatty acids, and C18:3 fatty acids, or salts (for instance potassium or sodium salts) or other derivatives thereof.

For instance, the one or more fatty acids may comprise the following fatty acids in the following proportions:
C16 fatty acids from 1 to 10 wt %;
C16:1 fatty acids from 0 to 5 wt %;
C18:1 fatty acids from 60 to 94 wt %; and
C18:2 fatty acids from 5 to 20 wt %.

In connection with this and the following embodiments, if reference is made to fatty acids, this equally encompasses salts and other derivatives of fatty acids. The term is used to denote the basic structural features of the underlying fatty acid(s).

Often, the one or more fatty acids comprise the following fatty acids in the following proportions:
C16 fatty acids from 3 to 7 wt %;
C16:1 fatty acids from 0 to 4 wt %;
C18:1 fatty acids from 70 to 89 wt %; and
C18:2 fatty acids from 8 to 18 wt %.

Fatty acid amounts in wt % as used in the present invention are relative to the total amount of fatty acids in the composition.

The one or more fatty acids or derivatives thereof may comprise:
sodium or potassium salts of C16 fatty acids in an amount of from 1 to 10 wt %;
sodium or potassium salts of C16:1 fatty acids in an amount of from 0 to 5 wt %;
sodium or potassium salts of C18:1 fatty acids in an amount of from 60 to 94 wt %;
and sodium or potassium salts of C18:2 fatty acids in an amount of from 5 to 20 wt %.

Often, the one or more fatty acids comprise the following fatty acids in the following proportions:
sodium or potassium salts of C16 fatty acids in an amount of from 3 to 7 wt %;
sodium or potassium salts of C16:1 fatty acids in an amount of from 0 to 4 wt %;
sodium or potassium salts of C18:1 fatty acids in an amount of from 70 to 89 wt %;
and sodium or potassium salts of C18:2 fatty acids in an amount of from 8 to 18 wt %.

It is preferred that the one or more fatty acid or derivative thereof, in particular sodium or potassium salts comprise C18, C18:1, C18:2 and C18:3 fatty acids or derivatives thereof which amount to at least 90 wt.-% of the total fatty acid content, preferably at least 95 wt.-%, possibly up to 97 wt.-%.

In particular, the one or more fatty acids or derivatives thereof may comprise one or more of oleic acid (C18:1), linoleic acid (C18:2), y-linolenic acid (C18:3), palmitoleic acid (C16:1), vaccenic acid (C18:1), paullinic acid (C20:1), elaidic acid (Ctrans-18:1) or derivatives thereof or a mixture of any of the foregoing.

In one preferred embodiment, the one or more fatty acids or derivatives thereof comprises oleic acid or a salt thereof. The one or more fatty acid or derivatives thereof typically comprise at least 70 wt % of oleic acid or a salt thereof, for instance a potassium salt of oleic acid (potassium oleate). More preferably, in this embodiment, said one or more fatty acid in addition comprises a C16-C20 fatty acid or derivative thereof. It is even more preferred that the one or more fatty acid is not derivatized and comprises oleic acid. In an alternative much preferred embodiment, the fatty acids are derivatives in the form of potassium salts.

Whereas up to 97% of the one or more fatty acids or derivatives thereof are in the range of C14-C20, minor percentages of fatty acids or derivatives thereof may be C12, C13, C21 or C22 fatty acids or derivatives thereof. It is even more preferred that up to 95 wt.-% of one or more fatty acids or derivatives thereof are C18, C18:1, C18:2 and C18:3. In this embodiment, the remaining percentage of fatty acids or derivatives thereof are in the range of C12 to C17, such as C14, C16, C16:1 and C17, and C19 to C22.

In one embodiment, no fatty acids or derivatives thereof in the range below C12 or above C22 are present.

Alternative preferred embodiments are those further comprising a metal complex selected from the group consisting of copper mandelate, copper salicylate, copper anthranilate, copper 2,6-dihydroxybenzoate, copper benzenesulphonate, zinc mandelate, zinc salicylate, zinc anthranilate, zinc benzenesulphonate, iron mandelate, iron salicylate, iron 2,6-dihydroxybenzoate, silver mandelate, silver anthranilate, silver benzenesulphonate, magnesium mandelate, magnesium 2,6-dihydroxybenzoate, and mixtures thereof, in addition to a C16-C20 fatty acid or derivative thereof, said fatty acid or derivative thereof being a mixture comprising at least 70 wt % of potassium oleate, on the weight of the derivative of C16-C20 fatty acid.

In another preferred embodiment, the one or more fatty acids or derivatives thereof comprise one or more metal or alkali metal salts of fatty acids. Such metal or alkali metal salts of fatty acids are obtainable by a process comprising (a) Providing a vegetable oil; (b) Hydrolyzing triglycerides in the vegetable oil; (c) Extracting fatty acids from the hydrolyzed vegetable oil; and (d) Forming the metal or alkali metal salts of the extracted fatty acids. Preferably the alkali metal is potassium and/or the composition of fatty acids is as described above.

The vegetable oil is an oil or fat derived from a plant or animal and may comprise triglycerides, lipids, and fatty acids. Examples of oils derived from plants include apple seed oil, argan oil, coconut oil, colza oil, canola oil, corn oil, cottonseed oil, grape seed oil, hazelnut oil, macadamia oil, mustard oil, *niger* seed oil, olive oil, palm kernel oil, peanut oil, poppyseed oil, pumpkin seed oil, ramtil oil, rice bran oil, safflower oil, soybean oil, sesame oil, sunflower oil, tamarind seed oil, tea seed oil and walnut oil. Examples of oils derived from animals include fats derived from animal rendering. Preferably, the vegetable oil is olive oil.

Hydrolysing triglycerides in vegetable oil typically comprises treating the vegetable oil with an aqueous acid, for instance aqueous sulfuric acid, but may also be effected using other means such as heat treatment. The treated vegetable oil may be heated.

Extracting fatty acids from the hydrolysed vegetable oil may be done by any suitable method as are well known to the skilled person, for instance evaporation, solvent extraction, liquid-liquid extraction or chromatography.

Forming the metal or alkali metal salts of the extracted fatty acids may be done by any suitable method as are well known to the skilled person. Typically, this comprises treating the fatty acids with a base comprising the metal or alkali metal, e.g. a metal or alkali metal hydroxide such as KOH or NaOH. The metal is often an alkali metal, e.g. Li, Na, K or Rb, or preferably K, or an alkali earth metal, e.g. Mg, Ca, Sr or Ba.

In some cases, the fatty acid derivatives may be formed starting simply from a composition comprising the fatty acids. Thus, the fatty acid component may be produced by providing one or more fatty acids and forming the metal or alkali metal salts of the extracted fatty acids.

In some embodiments, said fatty acid derivatives are salts of lithium, sodium, potassium, magnesium, calcium, or a mixture thereof.

In a more preferred embodiment, the fatty acid derivatives are alkali metal salts of fatty acids, preferably potassium salts of fatty acids (hereinafter sometimes also referred to as (I.02)).

In an alternative embodiment, the fatty acid is not derivatized.

The total amount of the one or more fatty acids or derivatives thereof depends on the intended use and is often from 0.01 to 10 vol % for ready-to-use formulations, or from 0.5 to 7 vol %. For instance, the concentration of the fatty acid component may be from 0.5 to 30 g/L or from 1 to 20 g/L. Preferably, the concentration of the fatty acid component is from 3 to 15 g/L, for instance from 7 to 12 g/L. In concentrated formulations, the total amount of the one or more fatty acids or derivatives thereof may range between 20 and 60 wt.-%, such as between 25 and 55 wt.-%.

At the concentrations given above for the one or more fatty acid or derivatives thereof, the active compound combination is typically in a form suitable for application to plants. The composition may of course also be presented in a form suitable for storage or transport. In such cases, the concentration is typically much higher. For instance, the concentration of the fatty acid component may be greater than 100 ml/L or greater than 500 ml/L.

The active compound combinations according to the invention further comprise as compound b)/in component b) at least one pesticidally active agent selected from the following groups
 (1) Acetylcholinesterase (AChE) inhibitors,
 (2) GABA-gated chloride channel blockers,
 (3) Sodium channel modulators,
 (4) Nicotinic acetylcholine receptor (nAChR) competitive modulators,
 (5) Nicotinic acetylcholine receptor (nAChR) allosteric modulators,
 (6) Glutamate-gated chloride channel (GluCl) allosteric modulators,
 (7) Juvenile hormone mimics,
 (8) Miscellaneous non-specific (multi-site) inhibitors,
 (9) Chordotonal organ TRPV channel modulators,
 (10) Mite growth inhibitors,
 (11) Microbial disruptors of the insect gut membrane,

(12) Inhibitors of mitochondrial ATP synthase,
(13) Uncouplers of oxidative phosphorylation via disruption of the proton gradient,
(14) Nicotinic acetylcholine receptor channel blockers
(15) Inhibitors of chitin biosynthesis, type 0
(16) Inhibitors of chitin biosynthesis, type 1
(17) Moulting disruptors
(18) Ecdysone receptor agonists
(19) Octopamine receptor agonists
(20) Mitochondrial complex III electron transport inhibitors
(21) Mitochondrial complex I electron transport inhibitors
(22) Voltage-dependent sodium channel blockers
(23) Inhibitors of acetyl CoA carboxylase
(24) Mitochondrial complex IV electron transport inhibitors
(25) Mitochondrial complex II electron transport inhibitors
(26) Ryanodine receptor modulators
(27) Chordotonal organ modulators and
(28) further pesticidally active compounds.

In a preferred embodiment, said pesticidally active agent is selected from the group consisting of (1) Acetylcholinesterase (AChE) inhibitors which are carbamates and preferably selected from (1.1) alanycarb, (1.2) aldicarb, (1.3) bendiocarb, (1.4) benfuracarb, (1.5) butocarboxim, (1.6) butoxycarboxim, (1.7) carbaryl, (1.8) carbofuran, (1.9) carbosulfan, (1.10) ethiofencarb, (1.11) fenobucarb, (1.12) formetanate, (1.13) furathiocarb, (1.14) isoprocarb, (1.15) methiocarb, (1.16) methomyl, (1.17) metolcarb, (1.18) oxamyl, (1.19) pirimicarb, (1.20) propoxur, (1.21) thiodicarb, (1.22) thiofanox, (1.23) triazamate, (1.24) trimethacarb, (1.25) XMC and (1.26) xylylcarb, or organophosphates, preferably selected from (1.27) acephate, (1.28) azamethiphos, (1.29) azinphos-ethyl, (1.30) azinphos-methyl, (1.31) cadusafos, (1.32) chlorethoxyfos, (1.33) chlorfenvinphos, (1.34) chlormephos, (1.35) chlorpyrifos-methyl, (1.36) coumaphos, (1.37) cyanophos, (1.38) demeton-S-methyl, (1.39) diazinon, (1.40) dichlorvos/DDVP, (1.41) dicrotophos, (1.42) dimethoate, (1.43) dimethylvinphos, (1.44) disulfoton, (1.45) EPN, (1.46) ethion, (1.47) ethoprophos, (1.48) famphur, (1.49) fenamiphos, (1.50) fenitrothion, (1.51) fenthion, (1.52) fosthiazate, (1.53) heptenophos, (1.54) imicyafos, (1.55) isofenphos, (1.56) isopropyl 0-(methoxyaminothiophosphoryl) salicylate, (1.57) isoxathion, (1.58) malathion, (1.59) mecarbam, (1.60) methamidophos, (1.61) methidathion, (1.62) mevinphos, (1.63) monocrotophos, (1.64) naled, (1.65) omethoate, (1.66) oxydemeton-methyl, (1.67) parathion-methyl, (1.68) phenthoate, (1.69) phorate, (1.70) phosalone, (1.71) phosmet, (1.72) phosphamidon, (1.73) phoxim, (1.74) pirimiphos-methyl, (1.75) profenofos, (1.76) propetamphos, (1.77) prothiofos, (1.78) pyraclofos, (1.79) pyridaphenthion, (1.80) quinalphos, (1.81) sulfotep, (1.82) tebupirimfos, (1.83) temephos, (1.84) terbufos, (1.85) tetrachlorvinphos, (1.86) thiometon, (1.87) triazophos, (1.88) triclorfon and (1.89) vamidothion;

(2) GABA-gated chloride channel blockers which are cyclodiene-organochlorines and preferably selected from (2.1) chlordane and (2.2) endosulfan, or phenylpyrazoles (fiproles) and preferably selected from (2.3) ethiprole and (2.4) fipronil;

(3) Sodium channel modulators which are pyrethroids and preferably selected from (3.1) acrinathrin, (3.2) allethrin, (3.3) d-cis-trans allethrin, (3.4) d-trans allethrin, (3.5) bifenthrin, (3.6) bioallethrin, (3.7) bioallethrin s-cyclopentenyl isomer, (3.8) bioresmethrin, (3.9) cycloprothrin, (3.10) cyfluthrin, (3.11) beta-cyfluthrin, (3.12) cyhalothrin, (3.13) lambda-cyhalothrin, (3.14) gamma-cyhalothrin, (3.15) cypermethrin, (3.16) alpha-cypermethrin, (3.17) beta-cypermethrin, (3.18) theta-cypermethrin, (3.19) zeta-cypermethrin, (3.20) cyphenothrin [(1R)-trans-isomer], (3.21) deltamethrin, (3.22) empenthrin [(EZ)-(1R)-isomer], (3.23) esfenvalerate, (3.24) etofenprox, (3.25) fenpropathrin, (3.26) fenvalerate, (3.27) flucythrinate, (3.28) flumethrin, (3.29) tau-fluvalinate, (3.30) halfenprox, (3.31) imiprothrin, (3.32) kadethrin, (3.33) momfluorothrin, (3.34) permethrin, (3.35) phenothrin [(1R)-trans-isomer], (3.36) prallethrin, (3.37) pyrethrins (pyrethrum), (3.38) resmethrin, (3.39) silafluofen, (3.40) tefluthrin, (3.41) tetramethrin, (3.42) tetramethrin [(1R)-isomer)], (3.43) tralomethrin and (3.44) transfluthrin or (3.45) DDT or (3.46) methoxychlor;

(4) Nicotinic acetylcholine receptor (nAChR) competitive modulators which are neonicotinoids and preferably selected from (4.1) acetamiprid, (4.2) clothianidin, (4.3) dinotefuran, (4.4) imidacloprid, (4.5) nitenpyram, (4.6) thiacloprid and (4.7) thiamethoxam, or nicotine, or sulfoximines and preferably selected from (4.8) sulfoxaflor, or butenolids and preferably selected from (4.9) flupyradifurone, or mesoionics and preferably selected from (4.10) triflumezopyrim;

(5) Nicotinic acetylcholine receptor (nAChR) allosteric modulators which are spinosyns and preferably selected from (5.1) spinetoram and (5.2) spinosad;

(6) Glutamate-gated chloride channel (GluCl) allosteric modulators which are avermectins/milbemycins and preferably selected from (6.1) abamectin, (6.2) emamectin benzoate, (6.3) lepimectin and (6.4) milbemectin;

(7) Juvenile hormone mimics which are juvenile hormone analogues and preferably selected from (7.1) hydroprene, (7.2) kinoprene and (7.3) methoprene, or (7.4) fenoxycarb or (7.5) pyriproxyfen;

(8) Miscellaneous non-specific (multi-site) inhibitors which are alkyl halides and preferably selected from (8.1) methyl bromide and other alkyl halides, or (8.2) chloropicrine or (8.3) sulphuryl fluoride or (8.4) borax or (8.5) tartar emetic or methyl isocyanate generators selected from (8.6) diazomet and (8.7) metam;

(9) Chordotonal organ TRPV channel modulators selected from (9.1) pymetrozine and (9.2) pyrifluquinazone;

(10) Mite growth inhibitors selected from (10.1) clofentezine, (10.2) hexythiazox, (10.3) diflovidazin and (10.4) etoxazole;

(11) Microbial disruptors of the insect gut membrane selected from (11.1) *Bacillus thuringiensis* subspecies *israelensis*, (11.2) *Bacillus sphaericus*, (11.3) *Bacillus thuringiensis* subspecies *aizawai*, (11.4) *Bacillus thuringiensis* subspecies kurstaki, (11.5) *Bacillus thuringiensis* subspecies tenebrionis, and (11.6) pesticidally active proteins, e.g. originating from *Bacillus thuringiensis;*

(12) Inhibitors of mitochondrial ATP synthase which are ATP disruptors, preferably selected from (12.1) diafenthiuron, or organotin compounds selected from (12.2) azocyclotin, (12.3) cyhexatin and (12.4) fenbutatin oxide, or (12.5) propargite or (12.6) tetradifon;

(13) Uncouplers of oxidative phosphorylation via disruption of the proton gradient selected from (13.1) chlorfenapyr, (13.2) DNOC and (13.3) sulfluramid;

(14) Nicotinic acetylcholine receptor channel blockers selected from (14.1) bensultap, (14.2) cartap hydrochloride, (14.3) thiocylam and (14.4) thiosultap-sodium;

(15) Inhibitors of chitin biosynthesis, type 0 selected from (15.1) bistrifluron, (15.2) chlorfluazuron, (15.3) diflubenzuron, (15.4) flucycloxuron, (15.5) flufenoxuron, (15.6) hexaflumuron, (15.7) lufenuron, (15.8) novaluron, (15.9) noviflumuron, (15.10) teflubenzuron and (15.11) triflumuron;

(16) Inhibitors of chitin biosynthesis, type 1 selected from (16.1) buprofezin;

(17) Moulting disruptor (in particular for Diptera, i.e. dipterans) selected from (17.1) cyromazine;

(18) Ecdysone receptor agonists selected from (18.1) chromafenozide, (18.2) halofenozide, (18.3) methoxyfenozide and (18.4) tebufenozide;

(19) Octopamine receptor agonists selected from (19.1) amitraz;

(20) Mitochondrial complex III electron transport inhibitors selected from (20.1) hydramethylnone, (20.2) acequinocyl and (20.3) fluacrypyrim;

(21) Mitochondrial complex I electron transport inhibitors which are METI acaricides, preferably selected from (21.1) fenazaquin, (21.2) fenpyroximate, (21.3) pyrimidifen, (21.4) pyridaben, (21.5) tebufenpyrad and (21.6) tolfenpyrad, or (21.7) rotenone (Derris);

(22) Voltage-dependent sodium channel blockers selected from (22.1) indoxacarb and (22.2) metaflumizone;

(23) Inhibitors of acetyl CoA carboxylase which are tetronic and tetramic acid derivatives, preferably selected from (23.1) spirodiclofen and (23.2) spiromesifen;

(24) Mitochondrial complex IV electron transport inhibitors which are phosphines, preferably selected from (24.1) aluminium phosphide, (24.2) calcium phosphide, (24.3) phosphine and (24.4) zinc phosphide, or cyanides selected from (24.5) calcium cyanide, (24.6) potassium cyanide and (24.7) sodium cyanide;

(25) Mitochondrial complex II electron transport inhibitors which are beta-ketonitrile derivatives, preferably selected from (25.1) cyenopyrafen and (25.2) cyflumetofen, and carboxanilides selected from (25.3) pyflubumide;

(26) Ryanodine receptor modulators which are diamides, preferably selected from (26.1) chlorantraniliprole, (26.2) cyantraniliprole and (26.3) flubendiamide;

(27) Chordotonal organ Modulators (with undefined target site) selected from (27.1) flonicamid;

(28) further active compounds selected from (28.1) Acynonapyr, (28.2) Afidopyropen, (28.3) Afoxolaner, (28.4) Azadirachtin, (28.5) Benclothiaz, (28.6) Benzoximate, (28.7) Benzpyrimoxan, (28.8) Bifenazate, (28.9) Broflanilide, (28.10) Bromopropylate, (28.11) Chinomethionat, (28.12) Chloroprallethrin, (28.13) Cryolite, (28.14) Cyclaniliprole, (28.15) Cycloxaprid, (28.16) Cyhalodiamide, (28.17) Dicloromezotiaz, (28.18) Dicofol, (28.19) Dimpropyridaz, (28.20) epsilon-Metofluthrin, (28.21) epsilon-Momfluthrin, (28.22) Flometoquin, (28.23) Fluazaindolizine, (28.24) Fluensulfone, (28.25) Flufenerim, (28.26) Flufenoxystrobin, (28.27) Flufiprole, (28.28) Fluhexafon, (28.29) Fluopyram, (28.30) Flupyrimin, (28.31) Fluralaner, (28.32) Fluxametamide, (28.33) Fufenozide, (28.34) Guadipyr, (28.35) Heptafluthrin, (28.36) Imidaclothiz, (28.37) Iprodione, (28.38) Isocycloseram, (28.39) kappa-Bifenthrin, (28.40) kappa-Tefluthrin, (28.41) Lotilaner, (28.42) Meperfluthrin, (28.43) Oxazosulfyl, (28.44) Paichongding, (28.45) Pyridalyl, (28.46) Pyrifluquinazon, (28.47) Pyriminostrobin, (28.48) Spirobudiclofen, (28.49) Spiropidion, (28.50) Tetramethylfluthrin, (28.51) Tetraniliprole, (28.52) Tetrachlorantraniliprole, (28.53) Tigolaner, (28.54) Tioxazafen, (28.55) Thiofluoximate iodomethane; (28.56) 1-{2-fluoro-4-methyl-5-[(2,2,2-trifluoroethyl)sulphinyl]phenyl}-3-(trifluoromethyl)-1H-1,2,4-triazole-5-amine, (28.57) {1'-[(2E)-3-(4-chlorophenyl)prop-2-en-1-yl]-5-fluorospiro [indol-3,4'-piperidin]-1 (2H)-yl}(2-chloropyridin-4-yl)methanone, (28.58) 2-chloro-N-[2-{1-[(2E)-3-(4-chlorophenyl)prop-2-en-1-yl]piperidin-4-yl}-4-(trifluoromethyl)phenyl]isonicotinamide, (28.59) 3-(4-chloro-2,6-dimethylphenyl)-4-hydroxy-8-methoxy-1,8-diazaspiro [4.5]dec-3-en-2-one, (28.60) 3-(4-chloro-2,6-dimethylphenyl)-8-methoxy-2-oxo-1,8-diazaspiro [4.5]dec-3-en-4-yl ethyl carbonate, (28.61) 4-(but-2-yn-1-yloxy)-6-(3,5-dimethylpiperidin-1-yl)-5-fluoropyrimidine, (28.62) PF1364 (known from JP2010/018586), (28.63) (3E)-3-[4(6-chloro-3-pyridyl)methyl]-2-pyridylidene]-1,1, 1-trifluoro-propan-2-one, (28.64) N-[3-(benzylcarbamoyl)-4-chlorophenyl]-1-methyl-3-(pentafluoroethyl)-4-(trifluoromethyl)-1H-pyrazole-5-carboxamide, (28.65) 5-bromo-4-chloro-N44-chloro-2-methyl-6-(methylcarbamoyl)phenyl]-2-(3-chloro-2-pyridyl)pyrazole-3-carboxamide, (28.66) 4-[5-(3,5-dichlorophenyl)-4,5-dihydro-5-(trifluoromethyl)-3 soxazolyl]-2-methyl-N-(cis-1-oxido-3-thietanyl)-benzamide, (28.67) 4-[5-(3, 5-dichlorophenyl)-4,5-dihydro-5-(trifluoromethyl)-3 soxazolyl]-2-methyl-N-(trans-1-oxido-3-thietanyl)-benzamide and 44(5 S)-5-(3,5-dichlorophenyl)-4,5-dihydro-5-(trifluoromethyl)-3-isoxazolyl]-2-methyl-N-(cis-1-oxido-3-thietanyl)benzamide, (28.68) N-[3-chloro-1-(3-pyridinyl)-1H-pyrazol-4-yl]-N-ethyl-3-[(3,3,3-trifluoropropyl) sulfinyl]-propanamide, (28.69) (+)-N-[3-chloro-1-(3-pyridinyl)-1H-pyrazol-4-yl]-N-ethyl-3-[(3,3,3-trifluoropropyl)sulfinyl]-propanamide and (−)-N-[3-chloro-1-(3-pyridinyl)-1H-pyrazol-4-yl]-N-ethyl-3-[(3,3,3-trifluoropropyl) sulfinyl]-propanamide, (28.70) 5-[[(2E)-3-chloro-2-propen-1-yl]amino]-1-[2, 4-[(trifluoromethyl) sulfinyl]-1H-pyrazole-3-carbonitrile, (28.71) 3-bromo-N44-chloro-2-methyl-6-[(methylamino)thioxomethyl]phenyl]-1-(3-chloro-2-pyridinyl)-1H-pyrazole-5-carboxamide; (28.72) N44-chloro-24 [(1,1-dimethylethyl)amino]carbonyl]-6-methylphenyl]-1-(3-chloro-2-pyridinyl)-3-(fluoromethoxy)-1H-Pyrazole-5-carboxamide, (28.73) N42-(5-amino-1,3,4-thiadiazol-2-yl)-4-chloro-6-methylphenyl]-3-bromo-1-(3-chloro-2-pyridinyl)-1H-pyrazole-5-carboxamide, (28.74) 4-[3-[2,6-dichloro-4-[(3, 3-dichloro-2-propen-1-yl)oxy]phenoxy]propoxy]-2-methoxy-6-(trifluoromethyl)-pyrimidine; (28.75) (2E)- and 2 (Z)-2-[2-(4-cyanophenyl)-1-[3-(trifluoromethyl) phenyl]ethylidene]-N44-(difluoromethoxy)phenyl]-hydrazinecarboxamide; (28.76) 3-(2,2-dichloroethenyl)-2,2-dimethyl-4-(1H-benzimidazol-2-yl)phenyl-cyclopropanecarboxylic acid ester; (28.77) (4aS)-7-chloro-2,5-dihydro-2-[[(methoxycarbonyl) [4-[(trifluoromethyl)thio]phenyl]amino]carbonyl]-indeno [1,2-e][1,3,4]oxadiazine-4a(3H)-carboxylic acid methyl ester; (28.78) 6-deoxy-3-O-ethyl-2,4-di-O-methyl-14N44-[1-[4-(1,1,2,2,2-pentafluoroethoxy)

phenyl]-1H-1,2,4-triazol-3-yl]phenyl]carbamate]-α-L-mannopyranose; (28.79) 8-(2-cyclopropylmethoxy-4-trifluoromethyl-phenoxy)-3-(6-trifluoromethyl-pyridazin-3-yl)-3-aza-bicyclo[3.2.1]octane, (28.80) (8-anti)-8-(2-cyclopropylmethoxy-4-trifluoromethyl-phenoxy)-3-(6-trifluoromethyl-pyridazin-3-yl)-3-aza-bicyclo[3.2.1]octane, (28.81) (8-syn)-8-(2-cyclopropylmethoxy-4-trifluoromethyl-phenoxy)-3-(6-trifluoromethyl-pyridazin-3-yl)-3-aza-bicyclo[3.2.1]octane, (28.82) N43-chloro-1-(3-pyridinyl)-1H-pyrazol-4-yl]-N-ethyl-3-[(3,3,3-trifluoropropyl)thio]-propanamide and N44-(aminothioxomethyl)-2-methyl-6-[(methylamino)carbonyl]phenyl]-3-bromo-1-(3-chloro-2-pyridinyl)-1H-pyrazole-5-carboxamide, (28.83) 5-(1,3-dioxan-2-yl)-4 [4-(trifluoromethyl)phenyl]methoxy]-pyrimidine, (28.84) 3-(4-chloro-2,6-dimethylphenyl)-8-methoxy-1-methyl-1,8-diazaspiro[4.5]decane-2,4-dione, (28.85) 3-(4-chloro-2,6-dimethylphenyl)-8-methoxy-1-methyl-2-oxo-1,8-diazaspiro [4.5]dec-3-en-4-yl-carbonic acid ethyl ester, and (28.86) 44(5S)-5-(3,5-Dichloro-4-fluorophenyl)-4,5-dihydro-5-(trifluoromethyl)-3-isoxazolyl]-N-[(4R)-2-ethyl-3-oxo-4-isoxazolidinyl]-2-methyl-benzamide, (28.87) 2-({2-fluoro-4-methyl-5-[(R)-(2,2,2-trifluoroethyl)sulfinyl]phenyl}imino)-3-(2,2,2-trifluoroethyl)-1,3-thiazolidin-4-one, (28.88) 1,4-dimethyl-2-[2-(pyridin-3-yl)-2H-indazol-5-yl]-1,2,4-triazolidine-3,5-dione and a (28.89) terpene blend comprising as active ingredients substantially pure α-terpinene, substantially pure p-cymene and substantially pure limonene in a relative ratio of about 35-45:12-20:10-15.

In a more preferred embodiment, the pesticidally active agent is selected from the group consisting of
(1) Acetylcholinesterase (AChE) inhibitors selected from (1.27) acephate, (1.35) chlorpyrifos-methyl, (1.47) ethoprophos, (1.49) fenamiphos and (1.52) fosthiazate;
(2) GABA-gated chloride channel blockers selected from (2.3) ethiprole and (2.4) fipronil;
(3) Sodium channel modulators selected from (3.1) acrinathrin, (3.5) bifenthrin, (3.10) cyfluthrin, (3.11) beta-cyfluthrin, (3.13) lambda-cyhalothrin, (3.14) gamma-cyhalothrin, (3.15) cypermethrin, (3.16) alpha-cypermethrin, (3.17) beta-cypermethrin, (3.18) theta-cypermethrin, (3.19) zeta-cypermethrin, (3.21) deltamethrin, (3.29) tau-fluvalinate, (3.40) tefluthrin, and (3.44) transfluthrin;
(4) Nicotinic acetylcholine receptor (nAChR) competitive modulators selected from (4.1) acetamiprid, (4.2) clothianidin, (4.3) dinotefuran, (4.4) imidacloprid, (4.5) nitenpyram, (4.6) thiacloprid, (4.7) thiamethoxam, (4.8) sulfoxaflor, (4.9) flupyradifurone, and (4.10) triflumezopyrim;
(5) Nicotinic acetylcholine receptor (nAChR) allosteric modulators selected from (5.1) spinetoram and (5.2) Spinosad;
(6) Glutamate-gated chloride channel (GluCl) allosteric modulators selected from (6.1) abamectin, (6.2) emamectin benzoate, (6.3) lepimectin and (6.4) milbemectin;
(7) Juvenile hormone mimics selected from (7.4) fenoxycarb or (7.5) pyriproxyfen;
(9) Chordotonal organ TRPV channel modulators selected from (9.1) pymetrozine and (9.2) pyrifluquinazone;
(10) Mite growth inhibitors selected from (10.2) hexythiazox and (10.4) etoxazole;
(11) Microbial disruptors of the insect gut membrane selected from (11.1) *Bacillus thuringiensis* subspecies *israelensis*, (11.2) *Bacillus sphaericus*, (11.3) *Bacillus thuringiensis* subspecies *aizawai*, (11.4) *Bacillus thuringiensis* subspecies kurstaki, (11.5) *Bacillus thuringiensis* subspecies tenebrionis, and pesticidally active proteins originating from (11.6) *Bacillus thuringiensis*, such as those selected from (11.6.1) Cry1Aa, (11.6.2) Cry1Ab, (11.6.3) Cry1Ac, (11.6.4) Cry1Ad, (11.6.5) Cry1Ba, (11.6.6) Cry1Bb, (11.6.7) Cry1Ca, (11.6.8) Cry1Da, (11.6.9) Cry1Ea, (11.6.10) Cry1Fa, (11.6.11) Cry1A.105, (11.6.12) Cry11a, (11.6.13) Cry2Aa, (11.6.14) Cry2Ab, (11.6.15) Cry2Ac, (11.6.16) Vip3A, (11.6.17) Cry3Aa, (11.6.18) Cry3Ab, (11.6.19) Cry3Ba, (11.6.20) Cry3Bb, (11.6.21) Cry4Aa, (11.6.22) Cry4Ba, (11.6.23) Cry34Ab1/35Ab1; any one of Cry5 to Cry78 proteins, a Cyt protein or a Vip protein;
(12) Inhibitors of mitochondrial ATP synthase which is (12.1) diafenthiuron;
(13) Uncouplers of oxidative phosphorylation via disruption of the proton gradient which is (13.1) chlorfenapyr;
(15) Inhibitors of chitin biosynthesis, type 0 selected from (15.8) novaluron and (15.11) triflumuron;
(16) Inhibitors of chitin biosynthesis, type 1 which is (16.1) buprofezin;
(17) Moulting disruptor (in particular for Diptera, i.e. dipterans) which is (17.1) cyromazine;
(18) Ecdysone receptor agonists which is (18.3) methoxyfenozide;
(20) Mitochondrial complex III electron transport inhibitors which is (20.2) acequinocyl;
(21) Mitochondrial complex I electron transport inhibitors selected from (21.1) fenazaquin, (21.2) fenpyroximate, (21.3) pyrimidifen, (21.4) pyridaben, (21.5) tebufenpyrad and (21.6) tolfenpyrad;
(22) Voltage-dependent sodium channel blockers selected from (22.1) indoxacarb and (22.2) metaflumizone;
(23) Inhibitors of acetyl CoA carboxylase selected from (23.1) spirodiclofen and (23.2) spiromesifen;
(25) Mitochondrial complex II electron transport inhibitors selected from (25.1) cyenopyrafen, (25.2) cyflumetofen, and (25.3) pyflubumide;
(26) Ryanodine receptor modulators selected from (26.1) chlorantraniliprole, (26.2) cyantraniliprole and (26.3) flubendiamide;
(27) Chordotonal organ Modulators (with undefined target site) which is (27.1) flonicamid;
(28) further active compounds selected from (28.2) Afidopyropen, (28.4) Azadirachtin, (28.7) Benzpyrimoxan, (28.9) Broflanilide, (28.14) Cyclaniliprole, (28.17) Dicloromezotiaz, (28.19) Dimpropyridaz, (28.22) Flometoquin, (28.23) Fluazaindolizine, (28.24) Fluensulfone, (28.27) Flufiprole, (28.29) Fluopyram, (28.32) Fluxametamide, (28.37) lprodione, (28.38) Isocycloseram, (28.39) kappa-Bifenthrin, (28.40) kappa-Tefluthrin, (28.43) Oxazosulfyl, (28.45) Pyridalyl, (28.46) Pyrifluquinazon, (28.48) Spirobudiclofen, (28.49) Spiropidion, (28.51) Tetraniliprole, (28.52) Tetrachlorantraniliprole, (28.54) Tioxazafen, (28.87) 2-({2-fluoro-4-methyl-5-[(R)-(2,2,2-trifluoroethyl) sulfinyl]phenyl]imino)-3-(2,2,2-trifluoroethyl)-1,3-thiazolidin-4-one, (28.88) 1,4-dimethyl-2-[2-(pyridin-3-yl)-2H-indazol-5-yl]-1,2,4-triazolidine-3,5-dione, and (28.89) a terpene blend comprising as active ingredients substantially pure α-terpinene, substantially pure p-cymene and substantially pure limonene in a relative ratio of about 35-45:12-20:10-15.

In an even more preferred embodiment, the pesticidally active agent is selected from the group consisting of
(2) GABA-gated chloride channel blockers selected from (2.3) ethiprole and (2.4) fipronil;
(3) Sodium channel modulators selected from (3.10) cyfluthrin, (3.11) beta-cyfluthrin, (3.13) lambda-cyhalothrin, (3.14) gamma-cyhalothrin, (3.21) deltamethrin, (3.29) tau-fluvalinate and (3.40) tefluthrin;
(4) Nicotinic acetylcholine receptor (nAChR) competitive modulators selected from (4.1) acetamiprid, (4.2) clothianidin, (4.3) dinotefuran, (4.4) imidacloprid, (4.6) thiacloprid, (4.7) thiamethoxam, (4.8) sulfoxaflor, (4.9) flupyradifurone, and (4.10) triflumezopyrim;
(5) Nicotinic acetylcholine receptor (nAChR) allosteric modulators selected from (5.1) spinetoram and (5.2) spinosad;
(6) Glutamate-gated chloride channel (GluCl) allosteric modulators selected from (6.1) abamectin and (6.2) emamectin benzoate;
(9) Chordotonal organ TRPV channel modulators selected from (9.1) pymetrozine and (9.2) pyrifluquinazone;
(11) Microbial disruptors of the insect gut membrane selected from (11.1) Bacillus thuringiensis subspecies israelensis, (11.2) Bacillus sphaericus, (11.3) Bacillus thuringiensis subspecies aizawai, (11.4) Bacillus thuringiensis subspecies kurstaki, (11.5) Bacillus thuringiensis subspecies tenebrionis, and pesticidally acitve proteins selected from (11.6.1) Cry1Aa, (11.6.2) Cry1Ab, (11.6.3) Cry1Ac, (11.6.10) Cry1Fa, (11.6.11) Cry1A.105, (11.6.13) Cry2Aa, (11.6.14) Cry2Ab, (11.6.16) Vip3A, (11.6.17) Cry3Aa, (11.6.18) Cry3Ab, (11.6.20) Cry3Bb and (11.6.23) Cry34Ab1/35Ab1;
(17) Moulting disruptor (in particular for Diptera, i.e. dipterans) which is (17.1) cyromazine;
(18) Ecdysone receptor agonists which is (18.3) methoxyfenozide;
(21) Mitochondrial complex I electron transport inhibitors selected from (21.1) fenazaquin, (21.2) fenpyroximate and (21.6) tolfenpyrad;
(22) Voltage-dependent sodium channel blockers selected from (22.1) indoxacarb and (22.2) metaflumizone;
(23) Inhibitors of acetyl CoA carboxylase selected from (23.1) spirodiclofen and (23.2) spiromesifen;
(25) Mitochondrial complex II electron transport inhibitors selected from (25.1) cyenopyrafen, (25.2) cyflumetofen, and (25.3) pyflubumide;
(26) Ryanodine receptor modulators selected from (26.1) chlorantraniliprole, (26.2) cyantraniliprole and (26.3) flubendiamide;
(27) Chordotonal organ Modulators (with undefined target site) which is (27.1) flonicamid;
(28) further active compounds selected from (28.2) Afidopyropen, (28.4) Azadirachtin, (28.7) Benzpyrimoxan, (28.9) Broflanilide, (28.14) Cyclaniliprole, (28.17) Dicloromezotiaz, (28.19) Dimpropyridaz, (28.22) Flometoquin, (28.23) Fluazaindolizine, (28.24) Fluensulfone, (28.29) Fluopyram, (28.32) Fluxametamide, (28.38) Isocycloseram, (28.39) kappa-Bifenthrin, (28.40) kappa-Tefluthrin, (28.43) Oxazosulfyl, P(28.46) yrifluquinazon, (28.48) Spirobudiclofen, (28.49) Spiropidion, (28.51) Tetraniliprole, (28.52) Tetrachlorantraniliprole, (28.54) Tioxazafen; (28.87) 2-({2-fluoro-4-methyl-5-[(R)-(2,2,2-trifluoroethyl) sulfinyl]phenyl]imino)-3-(2,2,2-trifluoroethyl)-1,3-thiazolidin-4-one, (28.88) 1,4-dimethyl-2-[2-(pyridin-3-yl)-2H-indazol-5-yl]-1,2,4-triazolidine-3,5-dione, and (28.89) a terpene blend comprising as active ingredients substantially pure α-terpinene, substantially pure p-cymene and substantially pure limonene in a relative ratio of about 35-45:12-20:10-15.

Accordingly, preferred compound combinations are selected from group (G1) consisting of the following mixtures:

(I.01)+(1.1), (I.01)+(1.2), (I.01)+(1.3), (I.01)+(1.4), (I.01)+(1.5), (I.01)+(1.6), (I.01)+(1.7), (I.01)+(1.8), (I.01)+(1.9), (I.01)+(1.10), (I.01)+(1.11), (I.01)+(1.12), (I.01)+(1.13), (I.01)+(1.14), (I.01)+(1.15), (I.01)+(1.16), (I.01)+(1.17), (I.01)+(1.18), (I.01)+(1.19), (I.01)+(1.20), (I.01)+(1.21), (I.01)+(1.22), (I.01)+(1.23), (I.01)+(1.24), (I.01)+(1.25), (I.01)+(1.26), (I.01)+(1.27), (I.01)+(1.28), (I.01)+(1.29), (I.01)+(1.30), (I.01)+(1.31), (I.01)+(1.32), (I.01)+(1.33), (I.01)+(1.34), (I.01)+(1.35), (I.01)+(1.36), (I.01)+(1.37), (I.01)+(1.38), (I.01)+(1.39), (I.01)+(1.40), (I.01)+(1.41), (I.01)+(1.42), (I.01)+(1.43), (I.01)+(1.44), (I.01)+(1.45), (I.01)+(1.46), (I.01)+(1.47), (I.01)+(1.48), (I.01)+(1.49), (I.01)+(1.50), (I.01)+(1.51), (I.01)+(1.52), (I.01)+(1.53), (I.01)+(1.54), (I.01)+(1.55), (I.01)+(1.56), (I.01)+(1.57), (I.01)+(1.58), (I.01)+(1.59), (I.01)+(1.60), (I.01)+(1.61), (I.01)+(1.62), (I.01)+(1.63), (I.01)+(1.64), (I.01)+(1.65), (I.01)+(1.66), (I.01)+(1.67), (I.01)+(1.68), (I.01)+(1.69), (I.01)+(1.70), (I.01)+(1.71), (I.01)+(1.72), (I.01)+(1.73), (I.01)+(1.74), (I.01)+(1.75), (I.01)+(1.76), (I.01)+(1.77), (I.01)+(1.78), (I.01)+(1.79), (I.01)+(1.80), (I.01)+(1.81), (I.01)+(1.82), (I.01)+(1.83), (I.01)+(1.84), (I.01)+(1.85), (I.01)+(1.86), (I.01)+(1.87), (I.01)+(1.88), (I.01)+(1.89), (I.01)+(2.1), (I.01)+(2.2), (I.01)+(2.3), (I.01)+(2.4), (I.01)+(3.1), (I.01)+(3.2), (I.01)+(3.3), (I.01)+(3.4), (I.01)+(3.5), (I.01)+(3.6), (I.01)+(3.7), (I.01)+(3.8), (I.01)+(3.9), (I.01)+(3.10), (I.01)+(3.11), (I.01)+(3.12), (I.01)+(3.13), (I.01)+(3.14), (I.01)+(3.15), (I.01)+(3.16), (I.01)+(3.17), (I.01)+(3.18), (I.01)+(3.19), (I.01)+(3.20), (I.01)+(3.21), (I.01)+(3.22), (I.01)+(3.23), (I.01)+(3.24), (I.01)+(3.25), (I.01)+(3.26), (I.01)+(3.27), (I.01)+(3.28), (I.01)+(3.29), (I.01)+(3.30), (I.01)+(3.31), (I.01)+(3.32), (I.01)+(3.33), (I.01)+(3.34), (I.01)+(3.35), (I.01)+(3.36), (I.01)+(3.37), (I.01)+(3.38), (I.01)+(3.39), (I.01)+(3.40), (I.01)+(3.41), (I.01)+(3.42), (I.01)+(3.43), (I.01)+(3.44), (I.01)+(3.45), (I.01)+(3.46), (I.01)+(4.1), (I.01)+(4.2), (I.01)+(4.3), (I.01)+(4.4), (I.01)+(4.5), (I.01)+(4.6), (I.01)+(4.7), (I.01)+(4.8), (I.01)+(4.9), (I.01)+(4.10), (I.01)+(5.1), (I.01)+(5.2), (I.01)+(6.1), (I.01)+(6.2), (I.01)+(6.3), (I.01)+(6.4), (I.01)+(7.1), (I.01)+(7.2), (I.01)+(7.3), (I.01)+(7.4), (I.01)+(7.5), (I.01)+(8.1), (I.01)+(8.2), (I.01)+(8.3), (I.01)+(8.4), (I.01)+(8.5), (I.01)+(8.6), (I.01)+(8.7), (I.01)+(9.1), (I.01)+(9.2), (I.01)+(10.1), (I.01)+(10.2), (I.01)+(10.3), (I.01)+(10.4), (I.01)+(11.1), (I.01)+(11.2), (I.01)+(11.3), (I.01)+(11.4), (I.01)+(11.5), (I.01)+(11.6), (I.01)+(12.1), (I.01)+(12.2), (I.01)+(12.3), (I.01)+(12.4), (I.01)+(12.5), (I.01)+(12.6), (I.01)+(13.1), (I.01)+(13.2), (I.01)+(13.3), (I.01)+(14.1), (I.01)+(14.2), (I.01)+(14.3), (I.01)+(14.4), (I.01)+(15.1), (I.01)+(15.2), (I.01)+(15.3), (I.01)+(15.4), (I.01)+(15.5), (I.01)+(15.6), (I.01)+(15.7), (I.01)+(15.8), (I.01)+(15.9), (I.01)+(15.10), (I.01)+(15.11), (I.01)+(16.1), (I.01)+(17.1),), (I.01)+(18.1), (I.01)+(18.2), (I.01)+(18.3), (I.01)+(18.4),), (I.01)+(19.1),), (I.01)+(20.1), (I.01)+(20.2), (I.01)+(20.3),), (I.01)+(21.1), (I.01)+(21.2), (I.01)+(21.3), (I.01)+(21.4), (I.01)+(21.5), (I.01)+(21.6), (I.01)+(21.7), (I.01)+(22.1), (I.01)+(22.2), (I.01)+(23.1), (I.01)+(23.2),), (I.01)+(24.1), (I.01)+(24.2), (I.01)+(24.3), (I.01)+(24.4), (I.01)+(24.5), (I.01)+(24.6), (I.01)+(24.7),), (I.01)+(25.1), (I.01)+(25.2), (I.01)+(25.3), (I.01)+(26.1), (I.01)+(26.2), (I.01)+(26.3), (I.01)+(27.1), (I.01)+(28.1), (I.01)+(28.2), (I.01)+(28.3), (I.01)+(28.4), (I.01)+(28.5), (I.01)+(28.6), (I.01)+(28.7), (I.01)+(28.8), (I.01)+(28.9), (I.01)+(28.10), (I.01)+(28.11), (I.01)+(28.12), (I.01)+(28.13), (I.01)+(28.14), (I.01)+(28.15), (I.01)+(28.16), (I.01)+(28.17), (I.01)+(28.18), (I.01)+(28.19), (I.01)+(28.20), (I.01)+(28.21), (I.01)+(28.22), (I.01)+(28.23), (I.01)+(28.24), (I.01)+(28.25), (I.01)+(28.26), (I.01)+(28.27), (I.01)+(28.28), (I.01)+(28.29), (I.01)+(28.30), (I.01)+(28.31), (I.01)+(28.32), (I.01)+(28.33), (I.01)+(28.34), (I.01)+(28.35), (I.01)+(28.36), (I.01)+(28.37), (I.01)+(28.38), (I.01)+(28.39), (I.01)+(1.40), (I.01)+(28.41), (I.01)+(28.42), (I.01)+(28.43), (I.01)+(28.44), (I.01)+(28.45), (I.01)+(28.46), (I.01)+(28.47), (I.01)+(28.48), (I.01)+(28.49), (I.01)+(28.50), (I.01)+(28.51), (I.01)+(28.52), (I.01)+(28.53), (I.01)+(28.54), (I.01)+(28.55), (I.01)+(28.56), (I.01)+(28.57), (I.01)+(28.58), (I.01)+(28.59), (I.01)+(28.60), (I.01)+(28.61), (I.01)+(28.62), (I.01)+(28.63), (I.01)+(28.64), (I.01)+(28.65), (I.01)+(28.66), (I.01)+(28.67), (I.01)+(28.68), (I.01)+(28.69), (I.01)+(28.70), (I.01)+(28.71), (I.01)+(28.72), (I.01)+(28.73), (I.01)+(28.74), (I.01)+(28.75), (I.01)+(28.76), (I.01)+(28.77), (I.01)+(28.78), (I.01)+(28.79), (I.01)+(28.80), (I.01)+(28.81), (I.01)+(28.82), (I.01)+(28.83), (I.01)+(28.84), (I.01)+(28.85), (I.01)+(28.86), (I.01)+(28.87), (I.01)+(28.88), (I.01)+(28.89).

Also preferred compound combinations are selected from group (G2) consisting of the following mixtures:

(I.02)+(1.1), (I.02)+(1.2), (I.02)+(1.3), (I.02)+(1.4), (I.02)+(1.5), (I.02)+(1.6), (I.02)+(1.7), (I.02)+(1.8), (I.02)+(1.9), (I.02)+(1.10), (I.02)+(1.11), (I.02)+(1.12), (I.02)+(1.13), (I.02)+(1.14), (I.02)+(1.15), (I.02)+(1.16), (I.02)+(1.17), (I.02)+(1.18), (I.02)+(1.19), (I.02)+(1.20), (I.02)+(1.21), (I.02)+(1.22), (I.02)+(1.23), (I.02)+(1.24), (I.02)+(1.25), (I.02)+(1.26), (I.02)+(1.27), (I.02)+(1.28), (I.02)+(1.29), (I.02)+(1.30), (I.02)+(1.31), (I.02)+(1.32), (I.02)+(1.33), (I.02)+(1.34), (I.02)+(1.35), (I.02)+(1.36), (I.02)+(1.37), (I.02)+(1.38), (I.02)+(1.39), (I.02)+(1.40), (I.02)+(1.41), (I.02)+(1.42), (I.02)+(1.43), (I.02)+(1.44), (I.02)+(1.45), (I.02)+(1.46), (I.02)+(1.47), (I.02)+(1.48), (I.02)+(1.49), (I.02)+(1.50), (I.02)+(1.51), (I.02)+(1.52), (I.02)+(1.53), (I.02)+(1.54), (I.02)+(1.55), (I.02)+(1.56), (I.02)+(1.57), (I.02)+(1.58), (I.02)+(1.59), (I.02)+(1.60), (I.02)+(1.61), (I.02)+(1.62), (I.02)+(1.63), (I.02)+(1.64), (I.02)+(1.65), (I.02)+(1.66), (I.02)+(1.67), (I.02)+(1.68), (I.02)+(1.69), (I.02)+(1.70), (I.02)+(1.71), (I.02)+(1.72), (I.02)+(1.73), (I.02)+(1.74), (I.02)+(1.75), (I.02)+(1.76), (I.02)+(1.77), (I.02)+(1.78), (I.02)+(1.79), (I.02)+(1.80), (I.02)+(1.81), (I.02)+(1.82), (I.02)+(1.83), (I.02)+(1.84), (I.02)+(1.85), (I.02)+(1.86), (I.02)+(1.87), (I.02)+(1.88), (I.02)+(1.89), (I.02)+(2.1), (I.02)+(2.2), (I.02)+(2.3), (I.02)+(2.4), (I.02)+(3.1), (I.02)+(3.2), (I.02)+(3.3), (I.02)+(3.4), (I.02)+(3.5), (I.02)+(3.6), (I.02)+(3.7), (I.02)+(3.8), (I.02)+(3.9), (I.02)+(3.10), (I.02)+(3.11), (I.02)+(3.12), (I.02)+(3.13), (I.02)+(3.14), (I.02)+(3.15), (I.02)+(3.16), (I.02)+(3.17), (I.02)+(3.18), (I.02)+(3.19), (I.02)+(3.20), (I.02)+(3.21), (I.02)+(3.22), (I.02)+(3.23), (I.02)+(3.24), (I.02)+(3.25), (I.02)+(3.26), (I.02)+(3.27), (I.02)+(3.28), (I.02)+(3.29), (I.02)+(3.30), (I.02)+(3.31), (I.02)+(3.32), (I.02)+(3.33), (I.02)+(3.34), (I.02)+(3.35), (I.02)+(3.36), (I.02)+(3.37), (I.02)+(3.38), (I.02)+(3.39), (I.02)+(3.40), (I.02)+(3.41), (I.02)+(3.42), (I.02)+(3.43), (I.02)+(3.44), (I.02)+(3.45), (I.02)+(3.46), (I.02)+(4.1), (I.02)+(4.2), (I.02)+(4.3), (I.02)+(4.4), (I.02)+(4.5), (I.02)+(4.6), (I.02)+(4.7), (I.02)+(4.8), (I.02)+(4.9), (I.02)+(4.10), (I.02)+(5.1), (I.02)+(5.2), (I.02)+(6.1), (I.02)+(6.2), (I.02)+(6.3), (I.02)+(6.4), (I.02)+(7.1), (I.02)+(7.2), (I.02)+(7.3), (I.02)+(7.4), (I.02)+(7.5), (I.02)+(8.1), (I.02)+(8.2), (I.02)+(8.3), (I.02)+(8.4), (I.02)+(8.5), (I.02)+(8.6), (I.02)+(8.7), (I.02)+(9.1), (I.02)+(9.2), (I.02)+(10.1), (I.02)+(10.2), (I.02)+(10.3), (I.02)+(10.4), (I.02)+(11.1), (I.02)+(11.2), (I.02)+(11.3), (I.02)+(11.4), (I.02)+(11.5), (I.02)+(11.6), (I.02)+(12.1), (I.02)+(12.2), (I.02)+(12.3), (I.02)+(12.4), (I.02)+(12.5), (I.02)+(12.6), (I.02)+(13.1), (I.02)+(13.2), (I.02)+(13.3), (I.02)+(14.1), (I.02)+(14.2), (I.02)+(14.3), (I.02)+(14.4), (I.02)+(15.1), (I.02)+(15.2), (I.02)+(15.3), (I.02)+(15.4), (I.02)+(15.5), (I.02)+(15.6), (I.02)+(15.7), (I.02)+(15.8), (I.02)+(15.9), (I.02)+(15.10), (I.02)+(15.11), (I.02)+(16.1), (I.02)+(17.1),), (I.02)+(18.1), (I.02)+(18.2), (I.02)+(18.3), (I.02)+(18.4),), (I.02)+(19.1),), (I.02)+(20.1), (I.02)+(20.2), (I.02)+(20.3),), (I.02)+(21.1), (I.02)+(21.2), (I.02)+(21.3), (I.02)+(21.4), (I.02)+(21.5), (I.02)+(21.6), (I.02)+(21.7), (I.02)+(22.1), (I.02)+(22.2), (I.02)+(23.1), (I.02)+(23.2),), (I.02)+(24.1), (I.02)+(24.2), (I.02)+(24.3), (I.02)+(24.4), (I.02)+(24.5), (I.02)+(24.6), (I.02)+(24.7),), (I.02)+(25.1), (I.02)+(25.2), (I.02)+(25.3), (I.02)+(26.1), (I.02)+(26.2), (I.02)+(26.3), (I.02)+(27.1), (I.02)+(28.1), (I.02)+(28.2), (I.02)+(28.3), (I.02)+(28.4), (I.02)+(28.5), (I.02)+(28.6), (I.02)+(28.7), (I.02)+(28.8), (I.02)+(28.9), (I.02)+(28.10), (I.02)+(28.11), (I.02)+(28.12), (I.02)+(28.13), (I.02)+(28.14), (I.02)+(28.15), (I.02)+(28.16), (I.02)+(28.17), (I.02)+(28.18), (I.02)+(28.19), (I.02)+(28.20), (I.02)+(28.21), (I.02)+(28.22), (I.02)+(28.23), (I.02)+(28.24), (I.02)+(28.25), (I.02)+(28.26), (I.02)+(28.27), (I.02)+(28.28), (I.02)+(28.29), (I.02)+(28.30), (I.02)+(28.31), (I.02)+(28.32), (I.02)+(28.33), (I.02)+(28.34), (I.02)+(28.35), (I.02)+(28.36), (I.02)+(28.37), (I.02)+(28.38), (I.02)+(28.39), (I.02)+(1.40), (I.02)+(28.41), (I.02)+(28.42), (I.02)+(28.43), (I.02)+(28.44), (I.02)+(28.45), (I.02)+(28.46), (I.02)+(28.47), (I.02)+(28.48), (I.02)+(28.49), (I.02)+(28.50), (I.02)+(28.51), (I.02)+(28.52), (I.02)+(28.53), (I.02)+(28.54), (I.02)+(28.55), (I.02)+(28.56), (I.02)+(28.57), (I.02)+(28.58), (I.02)+(28.59), (I.02)+(28.60), (I.02)+(28.61), (I.02)+(28.62), (I.02)+(28.63), (I.02)+(28.64), (I.02)+(28.65), (I.02)+(28.66), (I.02)+(28.67), (I.02)+(28.68), (I.02)+(28.69), (I.02)+(28.70), (I.02)+(28.71), (I.02)+(28.72), (I.02)+(28.73), (I.02)+(28.74), (I.02)+(28.75), (I.02)+(28.76), (I.02)+(28.77), (I.02)+(28.78), (I.02)+(28.79), (I.02)+(28.80), (I.02)+(28.81), (I.02)+(28.82), (I.02)+(28.83), (I.02)+(28.84), (I.02)+(28.85), (I.02)+(28.86), (I.02)+(28.87), (I.02)+(28.88), (I.02)+(28.89).

More preferred the compound combinations are selected from the mixtures belonging to group (G1).

(I.01)+(1.27), (I.01)+(1.35), (I.01)+(1.47), (I.01)+(1.49), (I.01)+(1.52), (I.01)+(2.2), (I.01)+(2.3), (I.01)+(2.4), (I.01)+(3.1), (I.01)+(3.5), (I.01)+(3.10), (I.01)+(3.11), (I.01)+(3.13), (I.01)+(3.14), (I.01)+(3.15), (I.01)+(3.16), (I.01)+(3.17), (I.01)+(3.18), (I.01)+(3.19), (I.01)+(3.21), (I.01)+(3.29), (I.01)+(3.40), (I.01)+(3.44), (I.01)+(4.1), (I.01)+(4.2), (I.01)+(4.3), (I.01)+

(4.4), (I.01)+(4.5), (I.01)+(4.6), (I.01)+(4.7), (I.01)+(4.8), (I.01)+(4.9), (I.01)+(4.10), (I.01)+(5.1), (I.01)+(5.2), (I.01)+(6.1), (I.01)+(6.2), (I.01)+(6.3), (I.01)+(6.4), (I.01)+(7.4), (I.01)+(7.5), (I.01)+(9.1), (I.01)+(9.2), (I.01)+(10.2), (I.01)+(10.4), (I.01)+(11.1), (I.01)+(11.2), (I.01)+(11.3), (I.01)+(11.4), (I.01)+(11.5), (I.01)+(11.6.1), (I.01)+(11.6.2), (I.01)+(11.6.3), (I.01)+(11.6.4), (I.01)+(11.6.5), (I.01)+(11.6.6), (I.01)+(11.6.7), (I.01)+(11.6.8), (I.01)+(11.6.9), (I.01)+(11.6.10), (I.01)+(11.6.11), (I.01)+(11.6.12), (I.01)+(11.6.13), (I.01)+(11.6.14), (I.01)+(11.6.15), (I.01)+(11.6.16), (I.01)+(11.6.17), (I.01)+(11.6.18), (I.01)+(11.6.19), (I.01)+(11.6.20), (I.01)+(11.6.21), (I.01)+(11.6.22), (I.01)+(11.6.23), (I.01)+(12.1), (I.01)+(13.1), (I.01)+(15.8), (I.01)+(15.11), (I.01)+(16.1), (I.01)+(17.1),), (I.01)+(18.3), (I.01)+(20.2), (I.01)+(21.1), (I.01)+(21.2), (I.01)+(21.3), (I.01)+(21.4), (I.01)+(21.5), (I.01)+(21.6), (I.01)+(22.1), (I.01)+(22.2), (I.01)+(23.1), (I.01)+(23.2), (I.01)+(25.1), (I.01)+(25.2), (I.01)+(25.3), (I.01)+(26.1), (I.01)+(26.2), (I.01)+(26.3), (I.01)+(27.1), (I.01)+(28.2), (I.01)+(28.4), (I.01)+(28.7), (I.01)+(28.9), (I.01)+(28.14), (I.01)+(28.17), (I.01)+(28.19), (I.01)+(28.22), (I.01)+(28.23), (I.01)+(28.24), (I.01)+(28.27), (I.01)+(28.29), (I.01)+(28.32), (I.01)+(28.37), (I.01)+(28.38), (I.01)+(28.39), (I.01)+(1.40), (I.01)+(28.43), (I.01)+(28.45), (I.01)+(28.46), (I.01)+(28.48), (I.01)+(28.49), (I.01)+(28.51), (I.01)+(28.52), (I.01)+(28.54), (I.01)+(28.87), (I.01)+(28.88), (I.01)+(28.89).

Also more preferred compound combinations are selected from group (G2) consisting of the following mixtures:

(I.02)+(1.27), (I.02)+(1.35), (I.02)+(1.47), (I.02)+(1.49), (I.02)+(1.52), (I.02)+(2.2), (I.02)+(2.3), (I.02)+(2.4), (I.02)+(3.1), (I.02)+(3.5), (I.02)+(3.10), (I.02)+(3.11), (I.02)+(3.13), (I.02)+(3.14), (I.02)+(3.15), (I.02)+(3.16), (I.02)+(3.17), (I.02)+(3.18), (I.02)+(3.19), (I.02)+(3.21), (I.02)+(3.29), (I.02)+(3.40), (I.02)+(3.44), (I.02)+(4.1), (I.02)+(4.2), (I.02)+(4.3), (I.02)+(4.4), (I.02)+(4.5), (I.02)+(4.6), (I.02)+(4.7), (I.02)+(4.8), (I.02)+(4.9), (I.02)+(4.10), (I.02)+(5.1), (I.02)+(5.2), (I.02)+(6.1), (I.02)+(6.2), (I.02)+(6.3), (I.02)+(6.4), (I.02)+(7.4), (I.02)+(7.5), (I.02)+(9.1), (I.02)+(9.2), (I.02)+(10.2), (I.02)+(10.4), (I.02)+(11.1), (I.02)+(11.2), (I.02)+(11.3), (I.02)+(11.4), (I.02)+(11.5), (I.02)+(11.6.1), (I.02)+(11.6.2), (I.02)+(11.6.3), (I.02)+(11.6.4), (I.02)+(11.6.5), (I.02)+(11.6.6), (I.02)+(11.6.7), (I.02)+(11.6.8), (I.02)+(11.6.9), (I.02)+(11.6.10), (I.02)+(11.6.11), (I.02)+(11.6.12), (I.02)+(11.6.13), (I.02)+(11.6.14), (I.02)+(11.6.15), (I.02)+(11.6.16), (I.02)+(11.6.17), (I.02)+(11.6.18), (I.02)+(11.6.19), (I.02)+(11.6.20), (I.02)+(11.6.21), (I.02)+(11.6.22), (I.02)+(11.6.23), (I.02)+(12.1), (I.02)+(13.1), (I.02)+(15.8), (I.02)+(15.11), (I.02)+(16.1), (I.02)+(17.1),), (I.02)+(18.3), (I.02)+(20.2), (I.02)+(21.1), (I.02)+(21.2), (I.02)+(21.3), (I.02)+(21.4), (I.02)+(21.5), (I.02)+(21.6), (I.02)+(22.1), (I.02)+(22.2), (I.02)+(23.1), (I.02)+(23.2), (I.02)+(25.1), (I.02)+(25.2), (I.02)+(25.3), (I.02)+(26.1), (I.02)+(26.2), (I.02)+(26.3), (I.02)+(27.1), (I.02)+(28.2), (I.02)+(28.4), (I.02)+(28.7), (I.02)+(28.9), (I.02)+(28.14), (I.02)+(28.17), (I.02)+(28.19), (I.02)+(28.22), (I.02)+(28.23), (I.02)+(28.24), (I.02)+(28.27), (I.02)+(28.29), (I.02)+(28.32), (I.02)+(28.37), (I.02)+(28.38), (I.02)+(28.39), (I.02)+(1.40), (I.02)+(28.43), (I.02)+(28.45), (I.02)+(28.46), (I.02)+(28.48), (I.02)+(28.49), (I.02)+(28.51), (I.02)+(28.52), (I.02)+(28.54), (I.02)+(28.87), (I.02)+(28.88), (I.02)+(28.89).

Even more preferred compound combinations are selected from the group (G1-A) consisting of the following mixtures:

(I.01)+(2.3), (I.01)+(2.4), (I.01)+(3.10), (I.01)+(3.11), (I.01)+(3.13), (I.01)+(3.14), (I.01)+(3.21), (I.01)+(3.29), (I.01)+(3.40), (I.01)+(4.1), (I.01)+(4.2), (I.01)+(4.3), (I.01)+(4.4), (I.01)+(4.6), (I.01)+(4.7), (I.01)+(4.8), (I.01)+(4.9), (I.01)+(4.10), (I.01)+(5.1), (I.01)+(5.2), (I.01)+(6.1), (I.01)+(6.2), (I.01)+(9.1), (I.01)+(9.2), (I.01)+(11.1), (I.01)+(11.2), (I.01)+(11.3), (I.01)+(11.4), (I.01)+(11.5), (I.01)+(11.6.1), (I.01)+(11.6.2), (I.01)+(11.6.3), (I.01)+(11.6.10), (I.01)+(11.6.11), (I.01)+(11.6.13), (I.01)+(11.6.14), (I.01)+(11.6.16), (I.01)+(11.6.17), (I.01)+(11.6.18), (I.01)+(11.6.20), (I.01)+(11.6.23), (I.01)+(17.1),), (I.01)+(18.3), (I.01)+(21.1), (I.01)+(21.2), (I.01)+(21.6), (I.01)+(22.1), (I.01)+(22.2), (I.01)+(23.1), (I.01)+(23.2), (I.01)+(25.1), (I.01)+(25.2), (I.01)+(25.3), (I.01)+(26.1), (I.01)+(26.2), (I.01)+(26.3), (I.01)+(27.1), (I.01)+(28.2), (I.01)+(28.4), (I.01)+(28.7), (I.01)+(28.9), (I.01)+(28.14), (I.01)+(28.17), (I.01)+(28.19), (I.01)+(28.22), (I.01)+(28.23), (I.01)+(28.24), (I.01)+(28.29), (I.01)+(28.32), (I.01)+(28.38), (I.01)+(28.39), (I.01)+(1.40), (I.01)+(28.43), (I.01)+(28.45), (I.01)+(28.46), (I.01)+(28.48), (I.01)+(28.49), (I.01)+(28.51), (I.01)+(28.52), (I.01)+(28.54), (I.01)+(28.87), (I.01)+(28.88), (I.01)+(28.89).

Alternative even more preferred compound combinations are also selected from the group (G2-A) consisting of the following mixtures:

(I.02)+(2.3), (I.02)+(2.4), (I.02)+(3.10), (I.02)+(3.11), (I.02)+(3.13), (I.02)+(3.14), (I.02)+(3.21), (I.02)+(3.29), (I.02)+(3.40), (I.02)+(4.1), (I.02)+(4.2), (I.02)+(4.3), (I.02)+(4.4), (I.02)+(4.6), (I.02)+(4.7), (I.02)+(4.8), (I.02)+(4.9), (I.02)+(4.10), (I.02)+(5.1), (I.02)+(5.2), (I.02)+(6.1), (I.02)+(6.2), (I.02)+(9.1), (I.02)+(9.2), (I.02)+(11.1), (I.02)+(11.2), (I.02)+(11.3), (I.02)+(11.4), (I.02)+(11.5), (I.02)+(11.6.1), (I.02)+(11.6.2), (I.02)+(11.6.3), (I.02)+(11.6.10), (I.02)+(11.6.11), (I.02)+(11.6.13), (I.02)+(11.6.14), (I.02)+(11.6.16), (I.02)+(11.6.17), (I.02)+(11.6.18), (I.02)+(11.6.20), (I.02)+(11.6.23), (I.02)+(17.1),), (I.02)+(18.3), (I.02)+(21.1), (I.02)+(21.2), (I.02)+(21.6), (I.02)+(22.1), (I.02)+(22.2), (I.02)+(23.1), (I.02)+(23.2), (I.02)+(25.1), (I.02)+(25.2), (I.02)+(25.3), (I.02)+(26.1), (I.02)+(26.2), (I.02)+(26.3), (I.02)+(27.1), (I.02)+(28.2), (I.02)+(28.4), (I.02)+(28.7), (I.02)+(28.9), (I.02)+(28.14), (I.02)+(28.17), (I.02)+(28.19), (I.02)+(28.22), (I.02)+(28.23), (I.02)+(28.24), (I.02)+(28.29), (I.02)+(28.32), (I.02)+(28.38), (I.02)+(28.39), (I.02)+(1.40), (I.02)+(28.43), (I.02)+(28.45), (I.02)+(28.46), (I.02)+(28.48), (I.02)+(28.49), (I.02)+(28.51), (I.02)+(28.52), (I.02)+(28.54), (I.02)+(28.87), (I.02)+(28.88), (I.02)+(28.89).

Most preferred the compound combinations are selected from the mixtures belonging to group (G2-A).

In another even more preferred embodiment, the pesticidally active agent in either group G1-A or G2-A is selected from the group consisting of flupyradifurone, acetamiprid, deltamethrin and thiacloprid.

As can be seen in the examples, active agents selected from the above group provide excellent pest control when applied together with fatty acids or salts or derivatives thereof, in particular with potassium salts of fatty acids as defined herein. Due to the structural similarities and the mode of action, it is to be expected that combinations comprising other members of the group of sodium channel modulators which are pyrethroids, in particular lambda-cyhalothrin, cypermethrin and bifenthrin, or nicotinic acetylcholine receptor (nAChR) competitive modulators, such as imidaclorprid, or clothianidin, as well as sulfoxaflor, will provide a similar level of control.

In one embodiment, the pesticidally active agent is a biological control agent.

As used herein, "biological control" is defined as control of an insect and/or an acarid and/or a nematode by the use of an organism such as a microorganism or metabolite produced by such microorganism. In some cases biological control is also achieved by the use of naturally occurring compounds or compounds derived from such naturally occurring compounds.

According to one embodiment of the present invention the biological control agent comprises not only the isolated, pure cultures of the respective fungus or bacterium, in particular the pesticidally active fungus or bacterium but also suspensions in a whole broth culture or a metabolite-containing supernatant or a purified metabolite obtained from whole broth culture of the fungal or bacterial strain. "Whole broth culture" refers to a liquid culture containing both cells and media. "Supernatant" refers to the liquid broth remaining when cells grown in broth are removed by centrifugation, filtration, sedimentation, or other means well known in the art. According to another embodiment, the biological control agent comprises the isolated, pure cultures of the respective fungus or bacterium formulated in a suitable formulation apart from its fermentation broth, as described further below.

Said biological control agent may be an insecticidally active biological control agent selected from the group consisting of (C1) bacteria selected from the group consisting of *Bacillus thuringiensis* subsp. *aizawai*, in particular strain ABTS-1857 (SD-1372; e.g. XENTARI® from Valent BioSciences); *Bacillus mycoides*, isolate J. (e.g. BmJ from Certis USA LLC, a subsidiary of Mitsui & Co.); *Bacillus sphaericus*, in particular Serotype H5a5b strain 2362 (strain ABTS-1743) (e.g. VECTOLEX® from Valent BioSciences, US); *Bacillus thuringiensis* subsp. kurstaki strain BMP 123 from Becker Microbial Products, IL; *Bacillus thuringiensis* subsp. *aizawai*, in particular serotype H-7 (e.g. FLORBAC® WG from Valent BioSciences, US); *Bacillus thuringiensis* subsp. kurstaki strain HD-1 (e.g. DIPEL® ES from Valent BioSciences, US); *Bacillus thuringiensis* subsp. kurstaki strain BMP 123 by Becker Microbial Products, IL; *Bacillus thuringiensis israelensis* strain BMP 144 (e.g. AQUABAC® by Becker Microbial Products IL); *Burkholderia* spp., in particular *Burkholderia* rinojensis strain A396 (also known as *Burkholderia* rinojensis strain MBI 305) (Accession No. NRRL B-50319; WO 2011/106491 and WO 2013/032693; e.g. MBI-206 TGAI and ZELTO® from Marrone Bio Innovations); Chromobacterium subtsugae, in particular strain PRAA4-1T (MBI-203; e.g. GRANDEVO® from Marrone Bio Innovations); *Paenibacillus popilliae* (formerly *Bacillus popilliae*; e.g. MILKY SPORE POWDER™ and MILKY SPORE GRANULAR™ from St. Gabriel Laboratories); *Bacillus thuringiensis* subsp. *israelensis* (serotype H-14) strain AM65-52 (Accession No. ATCC 1276) (e.g. VECTOBAC® by Valent BioSciences, US); *Bacillus thuringiensis* var. kurstaki strain EVB-113-19 (e.g., BIOPROTEC® from AEF Global); *Bacillus thuringiensis* subsp. tenebrionis strain NB 176 (SD-5428; e.g. NOVODOR® FC from BioFa DE); *Bacillus thuringiensis* var. japonensis strain Buibui; *Bacillus thuringiensis* subsp. kurstaki strain ABTS 351; *Bacillus thuringiensis* subsp. kurstaki strain PB 54; *Bacillus thuringiensis* subsp. kurstaki strain SA 11; *Bacillus thuringiensis* subsp. kurstaki strain SA 12; *Bacillus thuringiensis* subsp. kurstaki strain EG 2348; *Bacillus thuringiensis* var. Colmeri (e.g. TIANBAO-BTC by Changzhou Jianghai Chemical Factory); *Bacillus thuringiensis* subsp. *aizawai* strain GC-91; *Serratia entomophila* (e.g. INVADED by Wrightson Seeds); *Serratia marcescens*, in particular strain SRM (Accession No. MTCC 8708); and *Wolbachia pipientis* ZAP strain (e.g., ZAP MALES® from MosquitoMate); and (C2) fungi selected from the group consisting of C2.1 *Muscodor albus*, in particular strain QST 20799 (Accession No. NRRL 30547); C2.2 *Muscodor roseus* in particular strain A3-5 (Accession No. NRRL 30548); C2.3 *Beauveria bassiana*, in particular strain ATCC 74040 (e.g. Naturalis® from Intrachem Bio Italia); strain GHA (Accession No. ATCC74250; e.g. BotaniGuard Es and Mycotrol-O from Laverlam International Corporation); strain ATP02 (Accession No. DSM 24665); strain PPRI 5339 (e.g. BroadBand™ from BASF); strain PPRI 7315, strain R444 (e.g. Bb-Protec from Andermatt Biocontrol), strains IL197, IL12, IL236, IL10, IL131, IL116 (all referenced in Jaronski, 2007. Use of Entomopathogenic Fungi in Biological Pest Management, 2007: ISBN: 978-81-308-0192-6), strain Bv025 (see e.g. Garcia et al. 2006. Manejo Integrado de Plagas y Agroecologia (Costa Rica) No. 77); strain BaGPK; strain ICPE 279, strain CG 716 (e.g. BoveMax® from Novozymes); C2.4 *Hirsutella citriformis*; C2.5 *Hirsutella thompsonii* (e.g. Mycohit and ABTEC from Agro Bio-tech Research Centre, IN); C2.6 *Lecanicillium lecanii* (formerly known as *Verticillium* lecanii), in particular conidia of strain KV01 (e.g. Mycotal® and Vertalec® from Koppert/Arysta), strain DA0M198499 or strain DA0M216596; C2.9 *Lecanicillium muscarium* (formerly *Verticillium* lecanii), in particular strain VE 6/CABI(=IMI) 268317/CBS102071/ARSEF5128 (e.g. Mycotal from Koppert); C2.10 *Metarhizium anisopliae* var acridum, e.g. ARSEF324 from GreenGuard by Becker Underwood, US or isolate IMI 330189 (ARSEF7486; e.g. Green Muscle by Biological Control Products); C2.11 *Metarhizium brunneum*, e.g. strain Cb 15 (e.g. ATTRACAP® from BIOCARE); C2.12 *Metarhizium anisopliae*, e.g. strain ESALQ 1037 (e.g. from Metarril® SP Organic), strain E-9 (e.g. from Metarril® SP Organic), strain M206077, strain C4-B (NRRL 30905), strain ESC1, strain 15013-1 (NRRL 67073), strain 3213-1 (NRRL 67074), strain C20091, strain C20092, strain F52 (DSM3884/ATCC 90448; e.g. BIO 1020 by Bayer CropScience and also e.g. Met52 by Novozymes) or strain ICIPE 78; C2.15 *Metarhizium robertsii* 23013-3 (NRRL 67075); C2.13 *Nomuraea rileyi*; C2.14 *Paecilomyces fumosoroseus* (new: Isaria fumosorosea), in particular strains Apopka 97 (available as PreFeRal from Certis, USA), Fe9901 (available as NoFly from Natural industries, USA), ARSEF 3581, ARSEF 3302, ARSEF 2679 (ARS Collection of Entomopathogenic Fungal Cultures, Ithaca, USA), IfB01 (China Center for Type Culture Collection CCTCC M2012400), ESALQ1296, ESALQ1364, ESALQ1409 (ESALQ: University of São Paulo (Piracicaba, SP, Brazil)), CG1228 (EMBRAPA Genetic Resources and Biotechnology (Brasilia, DF, Brazil)), KCH J2 (Dymarska et al., 2017; PLoS one 12(10)): e0184885), HIB-19, HIB-23, HIB-29, HIB-30 (Gandarilla-Pacheco et al., 2018; Rev Argent Microbiol 50: 81-89), CHE-CNRCB 304, EH-511/3 (Flores-Villegas et al., 2016; Parasites & Vectors 2016 9:176 doi: 10.1186/s13071-016-1453-1), CHE-CNRCB 303, CHE-CNRCB 305, CHE-CNRCB 307 (Gallou et al., 2016; fungal biology 120 (2016) 414-423), EH-506/3, EH-503/3, EH-520/3, PFCAM, MBP, PSMB1 (National Center for Biolelgical Control, Mexico; Castellanos-Moguel et al., 2013; Revista Mexicana De Micologia 38: 23-33, 2013), RCEF3304 (Meng et al., 2015; Genet Mol Biol. 2015 July-September; 38(3): 381-389), PF01-N10 (CCTCC No. M207088), CCM 8367 (Czech Collection of Microorganisms, Brno), SFP-198 (Kim et al., 2010; Wiley Online: DOI 10.1002/ps.2020), K3 (Yanagawa et al., 2015; J Chem Ecol. 2015; 41(12): 118-1126), CLO 55 (Ansari Ali et al., 2011; PLoS One. 2011; 6(1): e16108. DOI: 10.1371/journal.pone.0016108), IfTS01, IfTS02, IfTS07 (Dong et al. 2016/PLoS ONE 11(5): e0156087. doi:10.1371/journal.pone.0156087), P1 (Sun Agro Biotech Research Centre, India), If-02, If-2.3, If-03 (Farooq and Freed, 2016; DOI: 10.1016/j.bjm.2016.06.002), Ifr AsC (Meyer et al., 2008; J. Invertebr. Pathol. 99:96-102. 10.1016/j.jip.2008.03.007), PC-013 (DSMZ 26931), P43A, PCC (Carrillo-Perez et al., 2012; DOI 10.1007/s11274-012-1184-1), Pf04, Pf59, Pf109 (KimJun et al., 2013; Mycobiology 2013 December; 41(4): 221-224), FG340 (Han et al., 2014; DOI: 10.5941/MYCO.2014.42.4.385), Pfrl, Pfr8, Pfr9, Pfr10, Pfr11, Pfr12 (Angel-Sahagún et al., 2005; Journal of Insect Science), Ifr531 (Daniel and Wyss, 2009; DOI 10.1111/j.1439-0418.2009.01410.x), IF-1106 (Insect Ecology and Biocontrol Laboratory, Shanxi Agricultural University), 19602, 17284 (Hussain et al. 2016, DOI: 10.3390/ijms17091518), I03011 (U.S. Pat. No. 4,618,578), CNRCB1 (Centro Nacional de Referencia de Control Biologico (CNRCB), Colima, Mexico), SCAU-IFCF01 (Nian et al., 2015; DOI: 10.1002/ps.3977), PF01-N4 (Engineering Research Center of Biological Control, SCAU, Guangzhou, P. R. China) Pfr-612 (Institute of Biotechnology (IB-FCB-UANL), Mexico), Pf-Tim, Pf-Tiz, Pf-Hal, Pf-Tic (Chan-Cupul et al. 2013, DOI: 10.5897/AJMR12.493); C2.15 Aschersonia aleyrodis; C2.16 *Beauveria brongniartii* (e.g. Beaupro from Andermatt Biocontrol AG); C2.17 Conidiobolus *obscurus*; C2.18 Entomophthora virulenta (e.g. Vektor from Ecomic); C2.19 Lagenidium *giganteum*; C2.20 Metarhizium flavoviride; C2.21 *Mucor* haemelis (e.g. BioAvard from Indore Biotech Inputs & Research); C2.22 Pandora delphacis; C2.23 *Sporothrix* insectorum (e.g. *Sporothrix* Es from Biocerto, BR); and C2.24 Zoophtora *radicans*, and (C3) viruses selected from the group consisting of (C3.1) *Adoxophyes* honmai nucleopolyhedrovirus (AdhoNPV), e.g. isolate ADN001; (C3.2) *Agrotis ipsilon* multiple nucleopolyhedrovirus (AgipNPV), e.g. isolate from Illinois; (C3.3) *Anticarsia gemmatalis* (Woolly pyrol moth) multiple nucleopolyhedrovirus (AgMNPV) (e.g. products Baculo-*soja* from Nova Era Biotecnologia *Agricola*; Baculovirus Nitral from Nitral Urbana; Coopervirus SC from COODETEC), e.g. isolate 2D; (C3.4) *Autographa californica* (Alfalfa Looper) multiple nucleopolyhedrovirus (AcMNPV) (e.g. product VPN-ULTRA from *Agricola* El Sol, Loopex from Andermatt Biocontrol, Lepigen from AgBiTech), e.g. isolate C6; (C3.5) *Galleria mellonella* multiple nucleopolyhedrovirus (GmMNPV); (C3.6) *Plutella xylostella* multiple nucleopolyhedrovirus, e.g. isolate CL3; (C3.7) *Spodoptera exempta* multiple nucleopolyhedrovirus (SpexNPV); (C3.8) *Trichoplusia ni* multiple nucleopolyhedrovirus (TnMNPV); (C3.9) *Bombyx mori* (silkworm) nucleopolyhedrovirus (BmNPV), e.g. isolate T3; (C3.10) *Bombyx* mandarina nucleopolyhedrovirus (BomaNPV), e.g. isolate 51; (C3.11) Buzura suppressaria nucleopolyhedrovirus (BuzuNPV), e.g. isolate S13; (C3.12) *Choristoneura fumiferana* DEF multiple nucleopolyhedrovirus (CfDefNPV); (C3.13) *Choristoneura fumiferana* multiple nucleopolyhedrovirus (CfMNPV), e.g. isolate from Ireland; (C3.14) *Choristoneura* rosaceana nucleopolyhedrovirus (ChroNPV); (C3.15) Ecotropis obliqua nucleopolyhedrovirus (EcobNPV), e.g. isolate A1; (C3.16) *Epiphyas postvittana* nucleopolyhedrovirus (EppoNPV); (C3.17) Heliocoverpa armigera (cotton bollworm) nucleopolyhedrovirus (Hear-NPV) (e.g. Vivus® MAX and Armigen from AgBiTech, Helicovex from Andermatt Biocontrol, Keyun HaNPV), such as isolate C1 (HearNPV-C1), isolate NNG1 (HearNPV-NNG1), isolate G4 (HearNPV-G4; (C3.18) *Helicoverpa zea* single nucleopolyhedrovirus (HzSNPV) (e.g. Gemstar from Certis USA, Diplomata from Koppert); (C3.19) *Lymantria dispar* (gypsy moth) multiple nucleopolyhedrovirus (LdMNPV) (e.g. *Lymantria dispar* from Andermatt Biocontrol, Gypcheck developed by the US Forestry Service); (C3.20) *Mamestra brassicae* multiple nucleopolyhedrovirus (MbMNPV), e.g. isolate from Oxford; (C3.21) *Mamestra* configurata nucleopolyhedrovirus A (MacoNPV-A), e.g. isolate 90/2 or isolate 90/4; (C3.22) *Mamestra* configurata nucleopolyhedrovirus B (MacoNPV-B), e.g. isolate 96B; (C3.23) *Orgyia pseudotsugata* (Douglas-fir tussock moth) multiple nucleopolyhedrovirus (OpMNPV) (e.g. Virtuss); (C3.24) *Spodoptera exigua* (beet armyworm) multiple nucleopolyhedrovirus (SeMNPV) (e.g. Spexit from Andermatt Biocontrol, Spod-X LC from Certis USA, Keyun SeNPV), e.g. isolate from the US; (C3.25) *Spodoptera frugiperda* (fall armyworm) multiple nucleopolyhedrovirus (SfMNPV) (e.g. Fawligen from AgBiTech), e.g. isolate 3AP2 or isolate 6NR; (C3.26) *Spodoptera littoralis* (African cotton leafworm) nucleopolyhedrovirus (SpliNPV) (e.g. Littovir from Andermatt Biocontrol), e.g. isolate M2; (C3.27) *Spodoptera litura* (oriental leafworm moth) nucleopolyhedrovirus (SpltNPV) (e.g. Keyun SpltNPV), e.g. isolate G2; (C3.28) *Thysanoplusia orichalcea* nucleopolyhedrovirus (ThorNPV), e.g. isolate A28; (C3.29) *Trichoplusia ni* single nucleopolyhedrovirus (TnSNPV); (C3.30) *Wiseana signata* nucleopolyhedrovirus (WisiNPV); (C3.31) *Adoxophyes orana* (summer fruit tortrix) nucleopolyhedrovirus (AdorNPV) (e.g. Capex from Andermatt Biocontrol); (C3.32) *Agrotis segetum* nucleopolyhedrovirus A (AgseNPV); (C3.33) *Anagrapha falcifera* multiple nucleopolyhedrovirus (AnfaNPV); (C3.34) Antheraea pernyi nucleopolyhedrovirus (AnpeNPV); (C3.35) *Chrysodeixis chalcites* nucleopolyhedrovirus (ChchNPV); (C3.36) *Clanis bilineata* nucleopolyhedrovirus (ClbiNPV); (C3.37) *Euproctis pseudoconspersa* nucleopolyhedrovirus (EupsNPV); (C3.38) *Hyphantria cunea* nucleopolyhedrovirus (HycuNPV); (C3.39) *Leucania separata* nucleopolyhedrovirus (LeseNPV); (C3.40) *Maruca vitrata* nucleopolyhedrovirus (MaviNPV); (C3.41) *Orgyia* leucostigma nucleopolyhedrovirus (OrleNPV); (C3.42) *Orgyia pseudotsugata* single nucleopolyhedrovirus (OpSNPV); (C3.43) *Panolis flammea* nucleopolyhedrovirus (PaflNPV); (C3.44) Rachiplusia ou multiple nucleopolyhedrovirus (RoMNPV); (C3.45) *Erinnyis ello* (hornworm) GV (ErelGV), e.g. isolate VG010; (C3.46) Artogeia *rapae* granulovirus (ArGV); (C3.47) *Pieris brassicae* granulovirus (PbGV), e.g. isolate 384; (C3.48) *Choristoneura fumiferana* granulovirus (ChfuGV), e.g. isolate Bonaventure; (C3.49) *Cryptophlebia leucotreta* (false codling moth) granulovirus (CrleGV) (e.g. Cryptex from Andermatt Biocontrol), e.g. isolate CV3; (C3.50) *Cydia pomonella* (codling moth) granulovirus (CpGV) (e.g. Madex® products from Andermatt Biocontrol, Carpovirus Plus from AgroRoca SA), e.g. isolate M1; (C3.51) *Harrisina brillians* granulovirus (HabrGV), e.g. isolate M2; (C3.52) *Helicoverpa armigera* (cotton bollworm) granulovirus (HearGV); (C3.53) *Lacanobia oleracea* granulovirus (LaolGV), e.g. isolate S1; (C3.54) *Phthorimaea operculella* (tobacco leaf miner) granulovirus (PhopGV) (e.g. Tutavir from Andermatt Biocontrol, Matapol); (C3.55) *Plodia interpunctella* granulovirus (PiGV), e.g. isolate B3; (C3.56) *Plutella xylostella* granulovirus (PlxyGV) (e.g. Plutellavex® from Keyun), e.g. isolate K1; (C3.57) *Pseudalatia unipuncta* granulovirus (PsunGV), e.g. Hawaiian isolate; (C3.58) *Trichoplusia ni* granulovirus (TnGV), e.g. isolate M10-5: (C3.59) Xestia c-*nigrum* granulovirus (XecnGV), e.g. isolate alpha4; (C3.60) *Agrotis segetum* granulovirus (AgseGV), e.g. isolate Xinjiang; (C3.61) *Choristoneura occidentalis* granulovirus (ChocGV); (C3.62) *Spodoptera litura* (oriental leafworm moth) granulovirus (SpliGV), e.g. isolate K1; (C3.63) *Neodiprion lecontei* (red-headed pinesawfly) nucleopolyhedrovirus (NeleNPV) (e.g. Lecontvirus from SYLVAR); (C3.64) Neodiprion sertifer (Pine sawfly) nucleopolyhedrovirus (NeseNPV) (e.g. Neocheck-S developed by the US Forestry Service; (C3.65) *Gilpinia hercyniae* nucleopolyhedrovirus (GiheNPV), e.g. isolate i7; (C3.66) *Neodiprion abietis* (balsam-fir sawfly) nucleopolyhedrovirus (NeabNPV) (e.g. ABIETIV from SYLVAR); (C3.67) *Culex nigripalpus* nucleopolyhedrovirus (CuniNPV), e.g. isolate from Florida (1997); (C3.68) *Aedes sollicitans* nucleopolyhedrovirus (AesoNPV); (C3.69) Uranotaenia sapphrinia nucleopolyhedrovirus (UrsaNPV); (C3.70) *Spodoptera albula* (gray-streaked armywom moth) NPV (e.g. VPN-ULTRA from *Agricola* El Sol); (C3.71) *Biston suppressaria* (tea looper) NPV; (C3.72) *Dendrolimus* punctatus (Masson pine moth) CPV; (C3.73) Leucoma *salicis* (satin moth) NPV; (C3.73) *Spodoptera frugiperda* granulovirus (SfGV), e.g. isolate ARG; (C3.74) *Spodoptera sunia* nulear polyhedrosisvirus (e.g. VPN 82 from *Agricola* El Sol); (C3.75) *Pieris rapae* (small white) GV (PiraGV); and (C3.76) *Spodoptera exigua* (beet armyworm) nucleopolyhedrovirus (SeNPV) (e.g. Keyun SeNPV).

Said biological control agent may be a nematicidally active biological control agent selected from the group consisting of (D1) bacteria, for example (D1.1) *Bacillus subtilis*, in particular strain QST713/AQ713 (having NRRL Accession No. B-21661; available as SERENADE® OPTI or SERENADE® ASO from Bayer CropScience LP, US); (D1.2) *Bacillus pumilus*, in particular strain QST2808 (having Accession No. NRRL No. B-30087); (D1.3) *Bacillus firmus*, in particular, strain CNMC I-1582 (e.g. VOTIVO® from BASF SE); (D1.4) *Bacillus amyloliquefaciens*, in particular strain FZB42 (e.g. RHIZOVITAL® from ABiTEP, DE); (D1.5) *Bacillus amyloliquefaciens* strain PTA-4838 (AVEO EZ® from Valent/Sumitomo; VARNIMO® ST from LidoChem); (D1.6) *Bacillus cereus*, in particular spores of *Bacillus cereus* strain CNCM I-1562 (cf. U.S. Pat. No. 6,406, 690); (D1.7) *Bacillus laterosporus* (also known as *Brevibacillus laterosporus*; e.g. BIO-TODE® from Agro-Organics, ZA); (D1.8) *Bacillus megaterium*, strain YFM3.25 (e.g. BIOARC® from BioArc); *Bacillus mojavensis*, strain SR11 (CECT-7666; by Probelte S.A); (D1.9) *Bacillus* nematocida B16 (CGMCC Accession No. 1128); (D1.10) a mixture of *Bacillus licheniformis* FMCH001 and *Bacillus subtilis* FMCH002 (available as QUARTZO® (WG), PRESENCE® (WP) from FMC Corporation); (D1.11) Pasteuria nishizawae (e.g. OYACYST® LF/ST from Pasteuria Bioscience; CLARIVA® PN from Syngenta/ChemChina); (D1.12) *Burkholderia* rinojensis strain A396 (also known as *Burkholderia* rinojensis strain MBI 305) (Accession No. NRRL B-50319; WO 2011/106491 and WO 2013/032693; MAJESTENE® from Marrone Bio Innovations); (D1.13) Pasteuria *penetrans* (formerly *Bacillus penetrans*; e.g. PASTEURIA WETTABLE POWDER™ from Pasteuria Bioscience); Pasteuria usgae (e.g. ECONEM™ from Pasteuria Bioscience); (D1.14) Streptomycete sp., such as *Streptomyces lydicus* strain WYEC108 (also known as *Streptomyces lydicus* strain WYCD108US) (ACTINO-IRON® and ACTINOVATEO from Novozymes); (D1.15) *Streptomyces* saraceticus (e.g. CLANDA® from A & A Group (Agro Chemical Corp.); (D1.16) *Bacillus thuringiensis* strain CR-371 (Accession No. ATCC 55273); (D1.17) *Bacillus cepacia* (e.g. DENY® from Stine Microbial Products); Lysobacter enzymogenes, in particular strain C3 (cf. J Nematol. 2006 June, 38(2): 233-239 and Biological Control 2018 February, 117:158-163); and (D2) fungi, for example D2.1 Muscodor *albus*, in particular strain QST 20799 (Accession No. NRRL 30547); D2.2 Muscodor *roseus*, in particular strain A3-5 (Accession No. NRRL 30548); D2.3 Purpureocillium lilacinum (previously known as *Paecilomyces lilacinus*), in particular P. lilacinum strain 251 (AGAL 89/030550; e.g. BioAct from Bayer CropScience Biologics GmbH), strain 580 (BIOSTAT® WP (ATCC No. 38740) by Laverlam), strain in the product BIO-NEMATON® (T. Stanes and Company Ltd.), strain in the product MYSIS® (Varsha Bioscience and Technology India Pvt Ltd.), strain in the product BIOICONEMA® (Nico Orgo Maures, India), strain in the product NEMAT® (Ballagro Agro Tecnologia Ltda, Brazil), and a strain in the product SPECTRUM PAE L® (Promotora Tecnica Industrial, S.A. DE C.V., Mexico); D2.4 *Trichoderma koningii*; D2.5 Harposporium anguillullae; D2.6 Hirsutella minnesotensis; D2.7 Monacrosporium cionopagum; D2.8 Monacrosporium *psychrophilum*; D2.9 *Myrothecium* verrucaria, in particular strain AARC-0255 (e.g. DiTera™ by Valent Biosciences); D2.10 *Paecilomyces variotii*, strain Q-09 (e.g. Nemaquim® from Quimia, MX); D2.11 *Stagonospora phaseoli* (e.g. from Syngenta); D2.12 *Trichoderma* lignorum, in particular strain TL-0601 (e.g. Mycotric from Futureco Bioscience, ES); D2.13 *Fusarium solani*, strain Fs5; D2.14 Hirsutella rhossiliensis; D2.15 Monacrosporium *drechsleri*; D2.16

Monacrosporium gephyropagum; D2.17 Nematoctonus geogenius; D2.18 Nematoctonus leiosporus; D2.19 Neocosmospora vasinfecta; D2.20 Paraglomus sp, in particular Paraglomus *brasilianum*; D2.21 Pochonia chlamydosporia (also known as Vercillium chlamydosporium), in particular var. *catenulata* (IMI SD 187; e.g. KlamiC from The National Center of Animal and Plant Health (CENSA), CU); D2.22 *Stagonospora* heteroderae; D2.23 Meristacrum asterospermum, and D2.24 Duddingtonia flagrans.

In a preferred embodiment, said biological control agent is selected from the group consisting of
(C1) bacteria selected from *Bacillus thuringiensis* subsp. *aizawai*, in particular strain ABTS-1857 (SD-1372; e.g. XENTARI® from Valent BioSciences); *Bacillus mycoides*, isolate J. (e.g. BmJ from Certis USA LLC, a subsidiary of Mitsui & Co.); *Bacillus sphaericus*, in particular Serotype H5a5b strain 2362 (strain ABTS-1743) (e.g. VECTOLEX® from Valent BioSciences, US); *Bacillus thuringiensis* subsp. kurstaki strain BMP 123 from Becker Microbial Products, IL; *Bacillus thuringiensis* subsp. *aizawai*, in particular serotype H-7 (e.g. FLORBAC® WG from Valent BioSciences, US); *Bacillus thuringiensis* subsp. kurstaki strain HD-1 (e.g. DIPEL® ES from Valent BioSciences, US); *Bacillus thuringiensis* subsp. kurstaki strain BMP 123 by Becker Microbial Products, IL; *Bacillus thuringiensis israelensis* strain BMP 144 (e.g. AQUABAC® by Becker Microbial Products IL); *Burkholderia* spp., in particular *Burkholderia* rinojensis strain A396 (also known as *Burkholderia* rinojensis strain MBI 305) (Accession No. NRRL B-50319; WO 2011/106491 and WO 2013/032693; e.g. MBI-206 TGAI and ZELTO® from Marrone Bio Innovations); Chromobacterium subtsugae, in particular strain PRAA4-1T (MBI-203; e.g. GRANDEVO® from Marrone Bio Innovations); *Paenibacillus popilliae* (formerly *Bacillus popilliae*; e.g. MILKY SPORE POWDER™ and MILKY SPORE GRANULAR™ from St. Gabriel Laboratories); *Bacillus thuringiensis* subsp. *israelensis* (serotype H-14) strain AM65-52 (Accession No. ATCC 1276) (e.g. VECTOBAC® by Valent BioSciences, US)
(C2) fungi selected from C2.10 Metarhizium anisopliae var acridum, e.g. ARSEF324 from GreenGuard by Becker Underwood, US or isolate IMI 330189 (ARSEF7486; e.g. Green Muscle by Biological Control Products); C2.11 Metarhizium *brunneum*, e.g. strain Cb 15 (e.g. ATTRACAP® from BIOCARE); C2.12 Metarhizium anisopliae, e.g. strain ESALQ 1037 (e.g. from Metarril® SP Organic), strain E-9 (e.g. from Metarril® SP Organic), strain M206077, strain C4-B (NRRL 30905), strain ESC1, strain 15013-1 (NRRL 67073), strain 3213-1 (NRRL 67074), strain C20091, strain C20092, strain F52 (DSM3884/ATCC 90448; e.g. BIO 1020 by Bayer CropScience and also e.g. Met52 by Novozymes) or strain ICIPE 78; C2.15 Metarhizium robertsii 23013-3 (NRRL 67075); C2.13 Nomuraea *rileyi*; C2.14 *Paecilomyces* fumosoroseus (new: Isaria fumosorosea), in particular strains Apopka 97 (available as PreFeRal from Certis, USA), Fe9901 (available as NoFly from Natural industries, USA), ARSEF 3581, ARSEF 3302, ARSEF 2679 (ARS Collection of Entomopathogenic Fungal Cultures, Ithaca, USA), Iffl01 (China Center for Type Culture Collection CCTCC M2012400), ESALQ1296, ESALQ1364, ESALQ1409 (ESALQ: University of São Paulo (Piracicaba, SP, Brazil)), CG1228 (EMBRAPA Genetic Resources and Biotechnology (Brasilia, DF, Brazil)), KCH J2 (Dymarska et al., 2017; PLoS one 12(10)): e0184885), HIB-19, HIB-23, HIB-29, HIB-30 (Gandarilla-Pacheco et al., 2018; Rev Argent Microbiol 50: 81-89), CHE-CNRCB 304, EH-511/3 (Flores-Villegas et al., 2016; Parasites & Vectors 2016 9:176 doi: 10.1186/s13071-016-1453-1), CHE-CNRCB 303, CHE-CNRCB 305, CHE-CNRCB 307 (Gallou et al., 2016; fungal biology 120 (2016) 414-423), EH-506/3, EH-503/3, EH-520/3, PFCAM, MBP, PSMB1 (National Center for Biololgical Control, Mexico; Castellanos-Moguel et al., 2013; Revista *Mexicana* De Micologia 38: 23-33, 2013), RCEF3304 (Meng et al., 2015; Genet Mol Biol. 2015 July-September; 38(3): 381-389), PF01-N10 (CCTCC No. M207088), CCM 8367 (Czech Collection of Microorganisms, Brno), SFP-198 (Kim et al., 2010; Wiley Online: DOI 10.1002/ps.2020), K3 (Yanagawa et al., 2015; J Chem Ecol. 2015; 41(12): 118-1126), CLO 55 (Ansari Ali et al., 2011; PLoS One. 2011; 6(1): e16108. DOI: 10.1371/journal.pone.0016108), IfTS01, IfTS02, IfTS07 (Dong et al. 2016/PLoS ONE 11(5): e0156087. doi:10.1371/journal.pone.0156087), P1 (Sun Agro Biotech Research Centre, India), If-02, If-2.3, If-03 (Farooq and Freed, 2016; DOI: 10.1016/j.bjm.2016.06.002), Ifr AsC (Meyer et al., 2008; J. Invertebr. Pathol. 99:96-102. 10.1016/j.jip.2008.03.007), PC-013 (DSMZ 26931), P43A, PCC (Carrillo-Perez et al., 2012; DOI 10.1007/s11274-012-1184-1), PfO4, Pf59, Pf109 (KimJun et al., 2013; Mycobiology 2013 December; 41(4): 221-224), FG340 (Han et al., 2014; DOI: 10.5941/MYCO.2014.42.4.385), Pfrl, Pfr8, Pfr9, Pfr10, Pfr11, Pfr12 (Angel-Sahagún et al., 2005; Journal of Insect Science), Ifr531 (Daniel and Wyss, 2009; DOI 10.1111/j.1439-0418.2009.01410.x), IF-1106 (Insect Ecology and Biocontrol Laboratory, Shanxi Agricultural University), I9602, I7284 (Hussain et al. 2016, DOI: 10.3390/ijms17091518), I03011 (U.S. Pat. No. 4,618,578), CNRCB1 (Centro Nacional de Referencia de Control Biologico (CNRCB), Colima, Mexico), SCAU-IFCF01 (Nian et al., 2015; DOI: 10.1002/ps.3977), PF01-N4 (Engineering Research Center of Biological Control, SCAU, Guangzhou, P. R. China) Pfr-612 (Institute of Biotechnology (IB-FCB-UANL), Mexico), Pf-Tim, Pf-Tiz, Pf-Hal, Pf-Tic (Chan-Cupul et al. 2013, DOI: 10.5897/AJMR12 0.493);
(C3) viruses selected from AcMNPV, HaNPV, SfMNPV, SfGV, ChinNPV SeNPV;
(D1) bacteria selected from *Bacillus subtilis* strain QST713/AQ713; *Bacillus pumilus* strain QST2808, *Bacillus firmus* strain CNMC I-1582; *Bacillus amyloliquefaciens* strain FZB42; *Bacillus amyloliquefaciens* strain PTA-4838; *Bacillus cereus* strain CNCM I-1562 (cf. U.S. Pat. No. 6,406,690); a mixture of *Bacillus licheniformis* FMCH001 and *Bacillus subtilis* FMCH002; Pasteuria nishizawae (e.g. OYACYST® LF/ST from Pasteuria Bioscience; CLARIVA® PN from Syngenta/ChemChina); *Burkholderia* rinojensis strain A396 (also known as *Burkholderia* rinojensis strain MBI 305) (Accession No. NRRL B-50319; Pasteuria *penetrans*;
(D2) fungi selected from Purpureocillium lilacinum (previously known as *Paecilomyces lilacinus*) strain 251 (AGAL 89/030550; e.g. BioAct from Bayer CropScience Biologics GmbH); *Myrothecium* verrucaria, strain AARC-0255 (e.g. DITERA™ by Valent Biosciences);

In a more preferred embodiment, said biological control agent is selected from
(C2) fungi selected from Isaria fumosorosea (previously known as *Paecilomyces* fumosoroseus) strain apopka 97; *Beauveria bassiana* strain ATCC 74040 (e.g. NATURALIS® from Intrachem Bio Italia); *Beauveria bassiana* strain GHA (Accession No. ATCC74250; e.g. BOTANIGUARD® ES and MYCONTROL-O® from Laverlam International Corporation); most preferably Isaria fumosorosea strain apopka 97;
(C3) viruses selected from AcMNPV, HaNPV, SfMNPV, SfGV, ChinNPV SeNPV;
(D1) bacteria selected from *Bacillus subtilis* strain QST713/AQ713 and *Bacillus pumilus* strain QST2808, most preferred *Bacillus subtilis* strain QST713/AQ713;
(D2) a fungus which is Purpureocillium lilacinum strain 251;

According to the invention, the expression "combination" stands for the various combinations of compounds (A) and (B), for example in a single "ready-mix" form, in a combined spray mixture composed from separate formulations of the single active compounds, such as a "tank-mix", and in a combined use of the single active ingredients when applied in a sequential manner, i.e. one after the other within a reasonably short period, such as a few hours or days. Preferably the order of applying the compounds (A) and (B) is not essential for working the present invention.

In the combinations according to the invention, where (B) is a chemical pesticidally active agent the compounds (A) and (B) can be present in a broad range of effective weight ratio of A:B, for example in a range of 1000:1 to 1:1, preferably in a weight ratio of 700:1 to 10:1, more preferably in a weight ratio of 500:1 to 30:1, and most preferably in a weight ratio of 100:1 to 1:100.

Where B is acetamiprid or thiacloprid, preferred ratio ranges are between 500:1 and 1:1, more preferably 250:1 to 5:1, even more preferably 100:1 to 10:1. Most preferred are ratios between 70:1 and 10:1, such as between 10:1 and 65:1, between 12:1 and 65:1 or even between 12:1 and 40:1, such as 15:1, 16:1, or 40:1 or any ratio in between.

Where B is deltamethrin or another pyrethroid, preferred ratio ranges are between 50:1 and 2000:1, more preferably 100:1 to 1000:1, even more preferably 150:1 to 800:1. Most preferred are ratios between 200:1 and 700:1, such as between 250:1 and 650:1, such as 256:1 or 640:1 or any ratio in between.

Where B is flupyradifurone, preferred ratio ranges are between 1:1 and 1000:1, more preferably 5:1 to 500:1, even more preferably 5:1 to 250:1. Most preferred are ratios between 5:1 and 50:1, such as between 8:1 and 45:1 or 15:1 and 40:1 or any ratio in between, such as 19:1.

Where B is a nicotinic acetylcholine receptor (nAChR) competitive modulator other than the above mentioned ones, preferred ratio ranges may be any one of those indicated for acetamiprid/thiacloprid and flupyradifurone.

In the combinations according to the invention, where (B) is a biological control agent, the ratio of compounds (A) and (B) is given in g (A):CFU (colony forming units) of (B). In such cases, the compounds (A) and (B) can be present, for example, in a range of between 1 g: $10^{18}$ CFU to 1 g: $10^4$ CFU, preferably in a ratio of between 1 g: $10^{17}$ and 1 g: $10^5$. In another embodiment, the compounds (A) and (B) can be present in a range of between 1 g: $10^{15}$ CFU to 1 g: $10^8$ CFU, or in a range of 1 g: $10^{13}$ CFU to 1 g: $10^9$ CFU. In yet another embodiment, the compounds (A) and (B) can be present in a range of between 1 g: $10^{13}$ CFU to 1 g: $10^{10}$ CFU.

Any of the above ratios are preferably synergistic weight ratios. The skilled person is able to find out the synergistic weight ratios for the present invention by routine methods. The skilled person understands that these ratios refer to the ratio within a combined-formulation as well as to the calculative ratio of the one or more fatty acids or derivatives thereof described herein and the at least one pesticidally active agent when both components are applied as mono-formulations to a plant to be treated. The skilled person can calculate this ratio by simple mathematics since the volume and the amount of the one or more fatty acids or derivatives thereof and at least one pesticidally active agent, respectively, in a mono-formulation is known to the skilled person.

The active compound combination of the invention may be made by any suitable method. This usually comprises mixing components (a) and (b) in the desired proportion, optionally with one or more agriculturally acceptable auxiliaries as described elsewhere herein, resulting in a composition according to the invention.

The present invention provides an agrochemical product comprising: (a) one or more fatty acids or derivatives thereof; and (b) a pesticidally active agent, wherein components (a) and (b) are formulated for simultaneous or separate treatment of a locus.

In addition to components (a) and (b), the composition typically further comprises a solvent, which is usually water, but may also be methanol, ethanol, n-propanol, iso-propanol, n-butanol, isobutano 1, allyl alcohol, 1,2-propylene glycol, 1,3-propylene glycol, 1,2-ethylene glycol, polyethylene glycol (PEG), benzyl alcohol, glycerol, and mixtures thereof.

In one embodiment, item a) of the composition comprises 2-4 wt % of a metal complex selected from the group consisting of copper mandelate, copper salicylate, copper anthranilate, copper 2,6-dihydroxybenzoate, copper benzenesulphonate, zinc mandelate, zinc salicylate, zinc anthranilate, zinc benzenesulphonate, iron mandelate, iron salicylate, iron 2,6-dihydroxybenzoate, silver mandelate, silver anthranilate, silver benzenesulphonate, magnesium mandelate, magnesium 2,6-dihydroxybenzoate, and mixtures thereof, 75-85 wt % of a salt of oleic acid, and the remainder of b) being a solvent.

The active compound combination according to the invention is generally formulated into a composition. In some cases, the composition may be composed of two ready-made formulations.

The composition according to the invention may further comprise at least one agriculturally suitable auxiliary selected from the group consisting of extenders, solvents, spontaneity promoters, carriers, emulsifiers, dispersants, frost protectants, thickeners and adjuvants.

A carrier is a solid or liquid, natural or synthetic, organic or inorganic substance that is generally inert. The carrier generally improves the application of the compounds, for instance, to plants, plants parts or seeds. Examples of suitable solid carriers include, but are not limited to, ammonium salts, in particular ammonium sulfates, ammonium phosphates and ammonium nitrates, natural rock flours, such as kaolins, clays, talc, chalk, quartz, attapulgite, montmorillonite and diatomaceous earth, silica gel and synthetic rock flours, such as finely divided silica, alumina and silicates. Examples of typically useful solid carriers for preparing granules include but are not limited to crushed and fractionated natural rocks such as calcite, marble, pumice, sepiolite and dolomite, synthetic granules of inorganic and organic flours and granules of organic material such as paper, sawdust, coconut shells, maize cobs and tobacco stalks.

Examples of suitable liquid carriers include, but are not limited to, water, organic solvents and combinations thereof. Examples of suitable solvents include polar and nonpolar organic chemical liquids, for example from the classes of aromatic and nonaromatic hydrocarbons (such as cyclohexane, paraffins, alkylbenzenes, xylene, toluene, tetrahydronaphthalene, alkylnaphthalenes, chlorinated aromatics or chlorinated aliphatic hydrocarbons such as chlorobenzenes, chloroethylenes or methylene chloride), alcohols and polyols (which may optionally also be substituted, etherified and/or esterified, such as ethanol, propanol, propylenglycol, butanol, benzylalcohol, cyclohexanol or glycol), ketones (such as acetone, methyl ethyl ketone, methyl isobutyl ketone or cyclohexanone), esters (including fats and oils) and (poly)ethers, unsubstituted and substituted amines, amides (such as dimethylformamide or fatty acid amides) and esters thereof, lactams (such as N-alkylpyrrolidones, in particular N-methylpyrrolidone) and lactones, sulfones and sulfoxides (such as dimethyl sulfoxide), oils of vegetable or animal origin. The carrier may also be a liquefied gaseous extender, i.e. liquid which is gaseous at standard temperature and under standard pressure, for example aerosol propellants such as halohydrocarbons, butane, propane, nitrogen and carbon dioxide.

Preferred solid carriers are selected from clays, talc and silica.

Preferred liquid carriers are selected from water, alcohols, fatty acid amides and esters thereof, aromatic and nonaromatic hydrocarbons, lactams and carbonic acid esters and mixtures thereof. It is preferred, in particular in cases where component b) is present as a composition, that the carrier is water, optionally in combination with a polyol.

The amount of carrier typically ranges from 1 to 99.99%, preferably from 5 to 99.9%, more preferably from 10 to 99.5%, and most preferably from 20 to 99% by weight of the composition.

Liquid carriers are typically present in a range of from 20 to 90%, for example 30 to 80% by weight of the composition.

Solid carriers are typically present in a range of from 0 to 50%, preferably 5 to 45%, for example 10 to 30% by weight of the composition.

If the composition comprises two or more carriers, the outlined ranges refer to the total amount of carriers.

The surfactant can be an ionic (cationic or anionic), amphoteric or non-ionic surfactant, such as ionic or non-ionic emulsifier(s), foam former(s), dispersant(s), wetting agent(s), penetration enhancer(s) and any mixtures thereof. Examples of suitable surfactants include, but are not limited to, salts of polyacrylic acid, salts of lignosulfonic acid (such as sodium lignosulfonate), salts of phenolsulfonic acid or naphthalenesulfonic acid, polycondensates of ethylene oxide and/or propylene oxide with fatty alcohols, fatty acids or fatty amines (for example, polyoxyethylene fatty acid esters such as castor oil ethoxylate or polyoxyehtylene sorbitan monooleate, polyoxyethylene fatty alcohol ethers, for example alkylaryl polyglycol ethers), substituted phenols (preferably alkylphenols or arylphenols) and ethoxylates thereof (such as tristyrylphenol ethoxylate), salts of sulfosuccinic esters, taurine derivatives (preferably alkyl taurates), phosphoric esters of polyethoxylated alcohols or phenols, fatty esters of polyols (such a fatty acid esters of glycerol, sorbitol or sucrose), sulfates (such as alkyl sulfates and alkyl ether sulfates), sulfonates (for example, alkylsulfonates, arylsulfonates and alkylbenzene sulfonates), phosphate esters, protein hydrolysates, lignosulfite waste liquors and methylcellulose. Any reference to salts in this paragraph refers preferably to the respective alkali, alkaline earth and ammonium salts.

Preferred surfactants are selected from polyoxyethylene fatty alcohol ethers, polyoxyethylene fatty acid esters, such as castor oil ethoxylate or polyoxyehtylene sorbitan monooleate, alkylbenzene sulfonates, such as calcium dodecylbenzenesulfonate, castor oil ethoxylate, sodium lignosulfonate and arylphenol ethoxylates, such as tristyrylphenol ethoxylate.

The amount of surfactants typically ranges from 0.5 to 10%, for example 0.5 to 5%, by weight of the composition.

Further examples of suitable auxiliaries include water repellents, siccatives, binders (adhesive, tackifier, fixing agent, such as carboxymethylcellulose, natural and synthetic polymers in the form of powders, granules or latices, such as gum arabic, polyvinyl alcohol and polyvinyl acetate, natural phospholipids such as cephalins and lecithins and synthetic phospholipids, polyvinylpyrrolidone and tylose), thickeners and secondary thickeners (such as cellulose ethers, acrylic acid derivatives, xanthan gum, modified clays, e.g. the products available under the name Bentone, and finely divided silica), stabilizers (e.g. cold stabilizers, preservatives (e.g. dichlorophen and benzyl alcohol hemiformal), antioxidants, light stabilizers, in particular UV stabilizers, or other agents which improve chemical and/or physical stability), dyes or pigments (such as inorganic pigments, e.g. iron oxide, titanium oxide and Prussian Blue; organic dyes, e.g. alizarin, azo and metal phthalocyanine dyes), antifoams (e.g. silicone antifoams and magnesium stearate), antifreezes, stickers, gibberellins and processing auxiliaries, mineral and vegetable oils, perfumes, waxes, nutrients (including trace nutrients, such as salts of iron, manganese, boron, copper, cobalt, molybdenum and zinc), protective colloids, thixotropic substances, penetrants, sequestering agents and complex formers.

The choice of the auxiliaries depends on the intended mode of application of the compound combination of the invention and/or on the physical properties of the active compound(s) present in said compound combination. Furthermore, the auxiliaries may be chosen to impart particular properties (technical, physical and/or biological properties) to the compositions or use forms prepared therefrom. The choice of auxiliaries may allow customizing the compositions to specific needs.

The composition of the invention may be provided to the end user as ready-for-use formulation, i.e. the compositions may be directly applied to the plants or seeds by a suitable device, such as a spraying or dusting device. Alternatively, the compositions may be provided to the end user in the form of concentrates which have to be diluted, preferably with water, prior to use.

Accordingly, in one aspect of the present invention a formulation and application forms prepared from it, are provided as crop protection agents, such as drench, drip and spray liquids, comprising the active compound combination of the invention. The application forms may comprise further crop protection agents and/or pesticidal agents, and/or activity-enhancing adjuvants such as penetrants, examples being vegetable oils such as, for example, rapeseed oil, sunflower oil, mineral oils such as, for example, liquid paraffins, alkyl esters of vegetable fatty acids, such as rapeseed oil or soybean oil methyl esters, or alkanol alkoxylates, and/or spreaders such as, for example, alkylsiloxanes and/or salts, examples being organic or inorganic ammonium or phosphonium salts, examples being ammonium sulphate or diammonium hydrogen phosphate, and/or retention promoters such as dioctyl sulphosuccinate or hydroxypropylguar polymers and/or humectants such as glycerol and/or fertilizers such as ammonium, potassium or phosphorous fertilizers, for example.

Examples of typical formulations include water-soluble liquids (SL), emulsifiable concentrates (EC), emulsions in water (EW), suspension concentrates (SC, SE, FS, OD), water-dispersible granules (WG), granules (GR) and capsule concentrates (CS); these and other possible types of formulation are described, for example, by Crop Life International and in Pesticide Specifications, Manual on Development and Use of FAO and WHO Specifications for Pesticides, FAO Plant Production and Protection Papers— 173, prepared by the FAO/WHO Joint Meeting on Pesticide Specifications, 2004, ISBN: 9251048576. The formulations may comprise active agrochemical compounds other than one or more active compounds of the invention.

Seed Treatment

The present invention also relates to a seed treated or coated with the active compound combination or composition or the compounds according to a) and b) according the invention.

The present invention also relates in particular to a method for protecting seed and germinating plants from attack by plant pests, by treating the seed with the active compound combination or composition of the present invention. The method of the invention for protecting seed and germinating plants from attack by plant pests encompasses a method in which the seed is treated simultaneously in one operation with the active compound combination or composition according to the invention, and optionally at least one further fungicide, bactericide and/or insecticide. It also encompasses a method in which the seed is treated at different times, i.e. sequentially, with the compounds according to a) and b).

The invention likewise relates to the use of the active compound combination or composition of the invention for treating seed for the purpose of protecting the seed and the resultant plant against plant pests.

The compound combination and the composition of the invention may also be used to protect seeds from unwanted microorganisms, such as phytopathogenic microorganisms, for instance phytopathogenic fungi or phytopathogenic oomycetes. The term seed(s) as used herein include dormant seeds, primed seeds, pregerminated seeds and seeds with emerged roots and leaves.

Thus, the present invention also relates to a method for protecting seeds from unwanted microorganisms which comprises the step of treating the seeds with the compound combination or the composition of the invention, wherein the seeds may be treated simultaneously, separately or sequentially with the compounds (A) and (B).

The treatment of seeds with the compound combination or the composition of the invention protects the seeds from phytopathogenic microorganisms, but also protects the germinating seeds, the emerging seedlings and the plants after emergence from the treated seeds. Therefore, the present invention also relates to a method for protecting seeds, germinating seeds and emerging seedlings.

The seeds treatment may be performed prior to sowing, at the time of sowing or shortly thereafter.

When the seeds treatment is performed prior to sowing (e.g. so-called on-seed applications), the seeds treatment may be performed as follows: the seeds may be placed into a mixer with a desired amount of the compound combination or the composition of the invention, the seeds and the compound combination or the composition of the invention are mixed until an homogeneous distribution on seeds is achieved. If appropriate, the seeds may then be dried.

The invention also relates to seeds coated with the compound combination or the composition of the invention.

Preferably, the seeds are treated in a state in which it is sufficiently stable for no damage to occur in the course of treatment. In general, seeds can be treated at any time between harvest and shortly after sowing. It is customary to use seeds which have been separated from the plant and freed from cobs, shells, stalks, coats, hairs or the flesh of the fruits. For example, it is possible to use seeds which have been harvested, cleaned and dried down to a moisture content of less than 15% by weight. Alternatively, it is also possible to use seeds which, after drying, for example, have been treated with water and then dried again, or seeds just after priming, or seeds stored in primed conditions or pre-germinated seeds, or seeds sown on nursery trays, tapes or paper.

The amount of the compound combination or the composition of the invention applied to the seeds is typically such that the germination of the seed is not impaired, or that the resulting plant is not damaged. This must be ensured particularly in case the compounds contained in the compound combination of the invention would exhibit phytotoxic effects at certain application rates. The intrinsic phenotypes of transgenic plants should also be taken into consideration when determining the amount of the compound combination of the invention to be applied to the seed in order to achieve optimum seed and germinating plant protection with a minimum amount of compound being employed.

The compounds contained in the compound combination of the invention can be applied as such, directly to the seeds, i.e. without the use of any other components and without having been diluted. They can be applied in a simultaneous, separate or sequential manner. Also compositions containing the compounds contained in the compound combination of the invention, such as the composition of the invention, can be applied to the seeds.

The compound combination and the composition of the invention are suitable for protecting seeds of any plant variety. Preferred seeds are that of cereals (such as wheat, barley, rye, millet, triticale, and oats), oilseed rape, maize, cotton, soybean, rice, potatoes, sunflower, beans, coffee, peas, beet (e.g. sugar beet and fodder beet), peanut, vegetables (such as tomato, cucumber, onions and lettuce), lawns and ornamental plants. More preferred are seeds of wheat, soybean, oilseed rape, maize and rice.

The compound combination and the composition of the invention may be used for treating transgenic seeds, in particular seeds of plants capable of expressing a polypeptide or protein which acts against pests, herbicidal damage or abiotic stress, thereby increasing the protective effect. Seeds of plants capable of expressing a polypeptide or protein which acts against pests, herbicidal damage or abiotic stress may contain at least one heterologous gene which allows the expression of said polypeptide or protein. These heterologous genes in transgenic seeds may originate, for example, from microorganisms of the species *Bacillus, Rhizobium, Pseudomonas, Serratia, Trichoderma, Clavibacter, Glomus* or *Gliocladium*. These heterologous genes preferably originate from *Bacillus* sp., in which case the gene product is effective against the European corn borer and/or the Western corn rootworm. Particularly preferably, the heterologous genes originate from *Bacillus thuringiensis*.

Plants and Plant Parts

The compound combination and the composition of the invention may be applied to any plants or plant parts.

Plants mean all plants and plant populations, such as desired and undesired wild plants or crop plants (including naturally occurring crop plants). Crop plants may be plants which can be obtained by conventional breeding and optimization methods or by biotechnological and genetic engineering methods or combinations of these methods, including the genetically modified plants (GMO or transgenic plants) and the plant cultivars which are protectable and non-protectable by plant breeders' rights.

Plant cultivars are understood to mean plants which have new properties ("traits") and have been obtained by conventional breeding, by mutagenesis or by recombinant DNA techniques. They can be cultivars, varieties, bio- or genotypes.

Plant parts are understood to mean all parts and organs of plants above and below the ground, such as shoots, leaves, needles, stalks, stems, flowers, fruit bodies, fruits, seeds, roots, tubers and rhizomes. The plant parts also include harvested material and vegetative and generative propagation material, for example cuttings, tubers, rhizomes, slips and seeds.

Plants which may be treated in accordance with the methods of the invention include the following: cotton, flax, grapevine, fruit, vegetables, such as Rosaceae sp. (for example pome fruits such as apples and pears, but also stone fruits such as apricots, cherries, almonds and peaches, and soft fruits such as strawberries), Ribesioidae sp., Juglandaceae sp., Betulaceae sp., Anacardiaceae sp., Fagaceae sp., Moraceae sp., Oleaceae sp., Actinidaceae sp., Lauraceae sp., Musaceae sp. (for example banana trees and plantations), Rubiaceae sp. (for example coffee), Theaceae sp., Sterculiceae sp., Rutaceae sp. (for example lemons, oranges and grapefruit); Solanaceae sp. (for example tomatoes), Liliaceae sp., Asteraceae sp. (for example lettuce), Umbelliferae sp., Cruciferae sp., Chenopodiaceae sp., Cucurbitaceae sp. (for example cucumber), Alliaceae sp. (for example leek, onion), Papilionaceae sp. (for example peas); major crop plants, such as Gramineae sp. (for example maize, turf, cereals such as wheat, rye, rice, barley, oats, millet and triticale), Asteraceae sp. (for example sunflower), Brassicaceae sp. (for example white cabbage, red cabbage, broccoli, cauliflower, Brussels sprouts, pak choi, kohlrabi, radishes, and oilseed rape, mustard, horseradish and cress), Fabacae sp. (for example bean, peanuts), Papilionaceae sp. (for example soya bean), Solanaceae sp. (for example potatoes), Chenopodiaceae sp. (for example sugar beet, fodder beet, swiss chard, beetroot); useful plants and ornamental plants for gardens and wooded areas; and genetically modified varieties of each of these plants.

Plants and plant cultivars which may be treated by the above disclosed methods include plants and plant cultivars which are resistant against one or more biotic stresses, i.e. said plants show a better defense against animal and microbial pests, such as against nematodes, insects, mites, phytopathogenic fungi, bacteria, viruses and/or viroids.

Plants and plant cultivars which may be treated by the above disclosed methods include those plants which are resistant to one or more abiotic stresses. Abiotic stress conditions may include, for example, drought, cold temperature exposure, heat exposure, osmotic stress, flooding, increased soil salinity, increased mineral exposure, ozone exposure, high light exposure, limited availability of nitrogen nutrients, limited availability of phosphorus nutrients, shade avoidance.

Plants and plant cultivars which may be treated by the above disclosed methods include those plants characterized by enhanced yield characteristics. Increased yield in said plants may be the result of, for example, improved plant physiology, growth and development, such as water use efficiency, water retention efficiency, improved nitrogen use, enhanced carbon assimilation, improved photosynthesis, increased germination efficiency and accelerated maturation. Yield may furthermore be affected by improved plant architecture (under stress and non-stress conditions), including but not limited to, early flowering, flowering control for hybrid seed production, seedling vigor, plant size, internode number and distance, root growth, seed size, fruit size, pod size, pod or ear number, seed number per pod or ear, seed mass, enhanced seed filling, reduced seed dispersal, reduced pod dehiscence and lodging resistance. Further yield traits include seed composition, such as carbohydrate content and composition for example cotton or starch, protein content, oil content and composition, nutritional value, reduction in anti-nutritional compounds, improved processability and better storage stability.

Plants and plant cultivars which may be treated by the above disclosed methods include plants and plant cultivars which are hybrid plants that already express the characteristic of heterosis or hybrid vigor which results in generally higher yield, vigor, health and resistance towards biotic and abiotic stresses.

Transgenic Plants and Integration Events

The compound combination according to the invention can be advantageously used to treat transgenic plants, plant cultivars or plant parts that received genetic material which imparts advantageous and/or useful properties (traits) to these plants, plant cultivars or plant parts. Therefore, it is contemplated that the present invention may be combined with one or more recombinant traits or transgenic event(s) or a combination thereof. For the purposes of this application, a transgenic event is created by the insertion of a specific recombinant DNA molecule into a specific position (locus) within the chromosome of the plant genome. The insertion creates a novel DNA sequence referred to as an "event" and is characterized by the inserted recombinant DNA molecule and some amount of genomic DNA immediately adjacent to/flanking both ends of the inserted DNA. Such trait(s) or transgenic event(s) include, but are not limited to, pest resistance, water use efficiency, yield performance, drought tolerance, seed quality, improved nutritional quality, hybrid seed production, and herbicide tolerance, in which the trait is measured with respect to a plant lacking such trait or transgenic event. Concrete examples of such advantageous and/or useful properties (traits) are better plant growth, vigor, stress tolerance, standability, lodging resistance, nutrient uptake, plant nutrition, and/or yield, in particular improved growth, increased tolerance to high or low temperatures, increased tolerance to drought or to levels of water or soil salinity, enhanced flowering performance, easier harvesting, accelerated ripening, higher yields, higher quality and/or a higher nutritional value of the harvested products, better storage life and/or processability of the harvested products, and increased resistance against animal and microbial pests, such as against insects, arachnids, nematodes, mites, slugs and snails.

Among DNA sequences encoding proteins which confer properties of tolerance to such animal and microbial pests, in particular insects, mention will particularly be made of the genetic material from *Bacillus thuringiensis* encoding the Bt proteins widely described in the literature and well known to those skilled in the art. Mention will also be made of proteins extracted from bacteria such as *Photorhabdus* (WO97/17432 and WO98/08932). In particular, mention will be made of the Bt Cry or VIP proteins which include the Cry1A, Cry1Ab, Cry1Ac, CryIIA, CryIIIA, CryIIIB2, Cry9c Cry2Ab, Cry3Bb and CryIF proteins or toxic fragments thereof and also hybrids or combinations thereof, especially the Cry1F protein or hybrids derived from a Cry1F protein (e.g. hybrid Cry1A-Cry1F proteins or toxic fragments thereof), the Cry1A-type proteins or toxic fragments thereof, preferably the Cry1Ac protein or hybrids derived from the Cry1Ac protein (e.g. hybrid Cry1Ab-Cry1Ac proteins) or the Cry1Ab or Bt2 protein or toxic fragments thereof, the Cry2Ae, Cry2Af or Cry2Ag proteins or toxic fragments thereof, the Cry1A.105 protein or a toxic fragment thereof, the VIP3Aa19 protein, the VIP3Aa20 protein, the VIP3A proteins produced in the COT202 or COT203 cotton events, the VIP3Aa protein or a toxic fragment thereof as described in Estruch et al. (1996), Proc Natl Acad Sci US A. 28; 93(11):5389-94, the Cry proteins as described in WO2001/47952, the insecticidal proteins from Xenorhabdus (as described in WO98/50427), *Serratia* (particularly from *S. entomophila*) or *Photorhabdus* species strains, such as Tc-proteins from *Photorhabdus* as described in WO98/08932. Also any variants or mutants of any one of these proteins differing in some amino acids (1-10, preferably 1-5) from any of the above named sequences, particularly the sequence of their toxic fragment, or which are fused to a transit peptide, such as a plastid transit peptide, or another protein or peptide, is included herein.

Another and particularly emphasized example of such properties is conferred tolerance to one or more herbicides, for example imidazolinones, sulphonylureas, glyphosate or phosphinothricin. Among DNA sequences encoding proteins which confer properties of tolerance to certain herbicides on the transformed plant cells and plants, mention will be particularly be made to the bar or PAT gene or the *Streptomyces coelicolor* gene described in WO2009/152359 which confers tolerance to glufosinate herbicides, a gene encoding a suitable EPSPS (5-Enolpyruvylshikimat-3-phosphat-synthase) which confers tolerance to herbicides having EPSPS as a target, especially herbicides such as glyphosate and its salts, a gene encoding glyphosate-n-acetyltransferase, or a gene encoding glyphosate oxidoreductase.

Further suitable herbicide tolerance traits include at least one ALS (acetolactate synthase) inhibitor (e.g. WO2007/024782), a mutated *Arabidopsis* ALS/AHAS gene (e.g. U.S. Pat. No. 6,855,533), genes encoding 2,4-D-monooxygenases conferring tolerance to 2,4-D (2,4-dichlorophenoxyacetic acid) and genes encoding Dicamba monooxygenases conferring tolerance to dicamba (3,6-dichloro-2-methoxybenzoic acid).

Yet another example of such properties is resistance to one or more phytopathogenic fungi, for example Asian Soybean Rust. Among DNA sequences encoding proteins which confer properties of resistance to such diseases, mention will particularly be made of the genetic material from *glycine tomentella*, for example from any one of publically available accession lines PI441001, PI483224, PI583970, PI446958, PI499939, PI505220, PI499933, PI441008, PI505256 or PI446961 as described in WO2019/103918.

Further and particularly emphasized examples of such properties are increased resistance against bacteria and/or viruses owing, for example, to systemic acquired resistance (SAR), systemin, phytoalexins, elicitors and also resistance genes and correspondingly expressed proteins and toxins.

Particularly useful transgenic events in transgenic plants or plant cultivars which can be treated with preference in accordance with the invention include Event 531/PV-GHBK04 (cotton, insect control, described in WO2002/040677), Event 1143-14A (cotton, insect control, not deposited, described in WO2006/128569); Event 1143-51B (cotton, insect control, not deposited, described in WO2006/128570); Event 1445 (cotton, herbicide tolerance, not deposited, described in US-A2002-120964 or WO2002/034946); Event 17053 (rice, herbicide tolerance, deposited as PTA-9843, described in WO2010/117737); Event 17314 (rice, herbicide tolerance, deposited as PTA-9844, described in WO2010/117735); Event 281-24-236 (cotton, insect control-herbicide tolerance, deposited as PTA-6233, described in WO2005/103266 or US-A 2005-216969); Event 3006-210-23 (cotton, insect control-herbicide tolerance, deposited as PTA-6233, described in US-A 2007-143876 orWO2005/103266); Event 3272 (corn, quality trait, deposited as PTA-9972, described in WO2006/098952 or US-A 2006-230473); Event 33391 (wheat, herbicide tolerance, deposited as PTA-2347, described in WO2002/027004), Event 40416 (corn, insect control-herbicide tolerance, deposited as ATCC PTA-11508, described in WO11/075593); Event 43A47 (corn, insect control-herbicide tolerance, deposited as ATCC PTA-11509, described in WO2011/075595); Event 5307 (corn, insect control, deposited as ATCC PTA-9561, described in WO2010/077816); Event ASR-368 (bent grass, herbicide tolerance, deposited as ATCC PTA-4816, described in US-A 2006-162007 or WO2004/053062); Event B16 (corn, herbicide tolerance, not deposited, described in US-A 2003-126634); Event BPS-CV127-9 (soybean, herbicide tolerance, deposited as NCIMB No. 41603, described in WO2010/080829); Event BLR1 (oilseed rape, restoration of male sterility, deposited as NCIMB 41193, described in WO2005/074671), Event CE43-67B (cotton, insect control, deposited as DSM ACC2724, described in US-A 2009-217423 or WO2006/128573); Event CE44-69D (cotton, insect control, not deposited, described in US-A 2010-0024077); Event CE44-69D (cotton, insect control, not deposited, described in WO2006/128571); Event CE46-02A (cotton, insect control, not deposited, described in WO2006/128572); Event COT102 (cotton, insect control, not deposited, described in US-A 2006-130175 or WO2004/039986); Event COT202 (cotton, insect control, not deposited, described in US-A 2007-067868 or WO2005/054479); Event COT203 (cotton, insect control, not deposited, described in WO2005/054480);); Event DAS21606-3/1606 (soybean, herbicide tolerance, deposited as PTA-11028, described in WO2012/033794), Event DAS40278 (corn, herbicide tolerance, deposited as ATCC PTA-10244, described in WO2011/022469); Event DAS-44406-6/pDAB8264.44.06.1 (soybean, herbicide tolerance, deposited as PTA-11336, described in WO2012/075426), Event DAS-14536-7/pDAB8291.45.36.2 (soybean, herbicide tolerance, deposited as PTA-11335, described in WO2012/075429), Event DAS-59122-7 (corn, insect control-herbicide tolerance, deposited as ATCC PTA 11384, described in US-A 2006-070139); Event DAS-59132 (corn, insect control-herbicide tolerance, not deposited, described in WO2009/100188); Event DAS68416 (soybean, herbicide tolerance, deposited as ATCC PTA-10442, described in WO2011/066384 or WO2011/066360); Event DP-098140-6 (corn, herbicide tolerance, deposited as ATCC PTA-8296, described in US-A 2009-137395 or WO08/112019); Event DP-305423-1 (soybean, quality trait, not deposited, described in US-A 2008-312082 or WO2008/054747); Event DP-32138-1 (corn, hybridization system, deposited as ATCC PTA-9158, described in US-A 2009-0210970 or WO2009/103049); Event DP-356043-5 (soybean, herbicide tolerance, deposited as ATCC PTA-8287, described in US-A 2010-0184079 or WO2008/002872); Event EE-I (brinjal, insect control, not deposited, described in WO07/091277); Event Fil 17 (corn, herbicide tolerance, deposited as ATCC 209031, described in US-A 2006-059581 or WO 98/044140); Event FG72 (soybean, herbicide tolerance, deposited as PTA-11041, described in WO2011/063413), Event GA21 (corn, herbicide tolerance, deposited as ATCC 209033, described in US-A 2005-086719 or WO 98/044140); Event GG25 (corn, herbicide tolerance, deposited as ATCC 209032, described in US-A 2005-188434 or WO98/044140); Event GHB119 (cotton, insect control-herbicide tolerance, deposited as ATCC PTA-8398, described in WO2008/151780); Event GHB614 (cotton, herbicide tolerance, deposited as ATCC PTA-6878, described in US-A 2010-050282 or WO2007/017186); Event GJ11 (corn, herbicide tolerance, deposited as ATCC 209030, described in US-A 2005-188434 or WO98/044140); Event GM RZ13 (sugar beet, virus resistance, deposited as NCIMB-41601, described in WO2010/076212); Event H7-1 (sugar beet, herbicide tolerance, deposited as NCIMB 41158 or NCIMB 41159, described in US-A 2004-172669 or WO 2004/074492); Event JOPLIN' (wheat, disease tolerance, not deposited, described in US-A 2008-064032); Event LL27 (soybean, herbicide tolerance, deposited as NCIMB41658, described in WO2006/108674 or US-A 2008-320616); Event LL55 (soybean, herbicide tolerance, deposited as NCIMB 41660, described in WO 2006/108675 or US-A 2008-196127); Event LLcotton25 (cotton, herbicide tolerance, deposited as ATCC PTA-3343, described in WO2003/013224 or US-A 2003-097687); Event LLRICE06 (rice, herbicide tolerance, deposited as ATCC 203353, described in U.S. Pat. No. 6,468,747 or WO2000/026345); Event LLRice62 (rice, herbicide tolerance, deposited as ATCC 203352, described in WO2000/026345), Event LLRICE601 (rice, herbicide tolerance, deposited as ATCC PTA-2600, described in US-A 2008-2289060 or WO2000/026356); Event LY038 (corn, quality trait, deposited as ATCC PTA-5623, described in US-A 2007-028322 or WO2005/061720); Event MIR162 (corn, insect control, deposited as PTA-8166, described in US-A 2009-300784 or WO2007/142840); Event MIR604 (corn, insect control, not deposited, described in US-A 2008-167456 or WO2005/103301); Event MON15985 (cotton, insect control, deposited as ATCC PTA-2516, described in US-A 2004-250317 or WO2002/100163); Event MON810 (corn, insect control, not deposited, described in US-A 2002-102582); Event MON863 (corn, insect control, deposited as ATCC PTA-2605, described in WO2004/011601 or US-A 2006-095986); Event MON87427 (corn, pollination control, deposited as ATCC PTA-7899, described in WO2011/062904); Event MON87460 (corn, stress tolerance, deposited as ATCC PTA-8910, described in WO2009/111263 or US-A 2011-0138504); Event MON87701 (soybean, insect control, deposited as ATCC PTA-8194, described in US-A 2009-130071 or WO2009/064652); Event MON87705 (soybean, quality trait-herbicide tolerance, deposited as ATCC PTA-9241, described in US-A 2010-0080887 or WO2010/037016); Event MON87708 (soybean, herbicide tolerance, deposited as ATCC PTA-9670, described in WO2011/034704); Event MON87712 (soybean, yield, deposited as PTA-10296, described in WO2012/051199), Event MON87754 (soybean, quality trait, deposited as ATCC PTA-9385, described in WO2010/024976); Event MON87769 (soybean, quality trait, deposited as ATCC PTA-8911, described in US-A 2011-0067141 or WO2009/102873); Event MON88017 (corn, insect control-herbicide tolerance, deposited as ATCC PTA-5582, described in US-A 2008-028482 or WO2005/059103); Event MON88913 (cotton, herbicide tolerance, deposited as ATCC PTA-4854, described in WO2004/072235 or US-A 2006-059590); Event MON88302 (oilseed rape, herbicide tolerance, deposited as PTA-10955, described in WO2011/153186), Event MON88701 (cotton, herbicide tolerance, deposited as PTA-11754, described in WO2012/134808), Event MON89034 (corn, insect control, deposited as ATCC PTA-7455, described in WO07/140256 or US-A 2008-260932); Event MON89788 (soybean, herbicide tolerance, deposited as ATCC PTA-6708, described in US-A 2006-282915 or WO2006/130436); Event MS1 1 (oilseed rape, pollination control-herbicide tolerance, deposited as ATCC PTA-850 or PTA-2485, described in WO2001/031042); Event MS8 (oilseed rape, pollination control-herbicide tolerance, deposited as ATCC PTA-730, described in WO2001/041558 or US-A 2003-188347); Event NK603 (corn, herbicide tolerance, deposited as ATCC PTA-2478, described in US-A 2007-292854); Event PE-7 (rice, insect control, not deposited, described in WO2008/114282); Event RF3 (oilseed rape, pollination control-herbicide tolerance, deposited as ATCC PTA-730, described in WO2001/041558 or US-A 2003-188347); Event RT73 (oilseed rape, herbicide tolerance, not deposited, described in WO2002/036831 or US-A 2008-070260); Event SYHT0H2/SYN-000H2-5 (soybean, herbicide tolerance, deposited as PTA-11226, described in WO2012/082548), Event T227-1 (sugar beet, herbicide tolerance, not deposited, described in WO2002/44407 or US-A 2009-265817); Event T25 (corn, herbicide tolerance, not deposited, described in US-A 2001-029014 or WO2001/051654); Event T304-40 (cotton, insect control-herbicide tolerance, deposited as ATCC PTA-8171, described in US-A 2010-077501 or WO2008/122406); Event T342-142 (cotton, insect control, not deposited, described in WO2006/128568); Event TC1507 (corn, insect control-herbicide tolerance, not deposited, described in US-A 2005-039226 or WO2004/099447); Event VIP1034 (corn, insect control-herbicide tolerance, deposited as ATCC PTA-3925, described in WO2003/052073), Event 32316 (corn, insect control-herbicide tolerance, deposited as PTA-11507, described in WO2011/084632), Event 4114 (corn, insect control-herbicide tolerance, deposited as PTA-11506, described in WO2011/084621), event EE-GM3/FG72 (soybean, herbicide tolerance, ATCC Accession N° PTA-11041) optionally stacked with event EE-GM1/LL27 or event EE-GM2/LL55 (WO2011/063413A2), event DAS-68416-4 (soybean, herbicide tolerance, ATCC Accession N° PTA-10442, WO2011/066360A1), event DAS-68416-4 (soybean, herbicide tolerance, ATCC Accession N° PTA-10442, WO2011/066384A1), event DP-040416-8 (corn, insect control, ATCC Accession N° PTA-11508, WO2011/075593A1), event DP-043A47-3 (corn, insect control, ATCC Accession N° PTA-11509, WO2011/075595A1), event DP-004114-3 (corn, insect control, ATCC Accession N° PTA-11506, WO2011/084621A1), event DP-032316-8 (corn, insect control, ATCC Accession N° PTA-11507, WO2011/084632A1), event MON-88302-9 (oilseed rape, herbicide tolerance, ATCC Accession N° PTA-10955, WO2011/153186A1), event DAS-21606-3 (soybean, herbicide tolerance, ATCC Accession No. PTA-11028, WO2012/033794A2), event MON-87712-4 (soybean, quality trait, ATCC Accession N°. PTA-10296, WO2012/051199A2), event DAS-44406-6 (soybean, stacked herbicide tolerance, ATCC Accession N°. PTA-11336, WO2012/075426A1), event DAS-14536-7

(soybean, stacked herbicide tolerance, ATCC Accession N°. PTA-11335, WO2012/075429A1), event SYN-000H2-5 (soybean, herbicide tolerance, ATCC Accession N°. PTA-11226, WO2012/082548A2), event DP-061061-7 (oilseed rape, herbicide tolerance, no deposit N° available, WO2012071039A1), event DP-073496-4 (oilseed rape, herbicide tolerance, no deposit N° available, US2012131692), event 8264.44.06.1 (soybean, stacked herbicide tolerance, Accession N° PTA-11336, WO2012075426A2), event 8291.45.36.2 (soybean, stacked herbicide tolerance, Accession N°. PTA-11335, WO2012075429A2), event SYHT0H2 (soybean, ATCC Accession N°. PTA-11226, WO2012/082548A2), event MON88701 (cotton, ATCC Accession N° PTA-11754, WO2012/134808A1), event KK179-2 (alfalfa, ATCC Accession N° PTA-11833, WO2013/003558A1), event pDAB8264.42.32.1 (soybean, stacked herbicide tolerance, ATCC Accession N° PTA-11993, WO2013/010094A1), event MZDT09Y (corn, ATCC Accession N° PTA-13025, WO2013/012775A1).

Further, a list of such transgenic event(s) is provided by the United States Department of Agriculture's (USDA) Animal and Plant Health Inspection Service (APHIS) and can be found on their website on the world wide web at aphis.usda.gov. For this application, the status of such list as it is/was on the filing date of this application, is relevant.

The genes/events which impart the desired traits in question may also be present in combinations with one another in the transgenic plants. Examples of transgenic plants which may be mentioned are the important crop plants, such as cereals (wheat, rice, triticale, barley, rye, oats), maize, soya beans, potatoes, sugar beet, sugar cane, tomatoes, peas and other types of vegetable, cotton, tobacco, oilseed rape and also fruit plants (with the fruits apples, pears, citrus fruits and grapes), with particular emphasis being given to maize, soya beans, wheat, rice, potatoes, cotton, sugar cane, tobacco and oilseed rape. Traits which are particularly emphasized are the increased resistance of the plants to insects, arachnids, nematodes and slugs and snails, as well as the increased resistance of the plants to one or more herbicides.

Commercially available examples of such plants, plant parts or plant seeds that may be treated with preference in accordance with the invention include commercial products, such as plant seeds, sold or distributed under the GENUITY®, DROUGHTGARD®, SMARTSTAX®, RIB COMPLETE®, ROUNDUP READY®, VT DOUBLE PRO®, VT TRIPLE PRO®, BOLLGARD II®, ROUNDUP READY 2 YIELD®, YIELDGARD®, ROUNDUP READY® 2 XTEN$^{DTm}$, INTACTA RR2 PRO®, VISTIVE GOLD®, and/or XTENDFLEX™ trade names.

The present invention also relates to a method for enhancing the pesticidal action of a pesticidally active agent comprising simultaneously or sequentially applying a pesticidally active agent as defined herein with one or more fatty acids or derivatives thereof as defined herein to a plant or seed or a locus where said plant or seed is intended to be grown. For example, the method may comprise mixing a pesticidally active agent as defined herein with one or more fatty acids or derivatives thereof as defined herein and applying said mixture to a plant or seed or a locus where said plant or seed is intended to be grown.

The active compound combination according to the present invention may be used as pesticide. It is active against normally sensitive and resistant species and against all or some stages of development. Pests include:

pests from the phylum of the Arthropoda, in particular from the class of the Arachnida, for example *Acarus* spp., for example *Acarus siro, Aceria kuko, Aceria sheldoni, Aculops* spp., *Aculus* spp., for example *Aculus fockeui, Aculus schlechtendali, Amblyomma* spp., *Amphitetranychus viennensis, Argas* spp., *Boophilus* spp., *Brevipalpus* spp., for example *Brevipalpus phoenicis, Bryobia graminum, Bryobia praetiosa, Centruroides* spp., *Chorioptes* spp., *Dermanyssus gallinae, Dermatophagoides pteronyssinus, Dermatophagoides farinae, Dermacentor* spp., *Eotetranychus* spp., for example *Eotetranychus hicoriae, Epitrimerus pyri, Eutetranychus* spp., for example *Eutetranychus banksi, Eriophyes* spp., for example *Eriophyes pyri, Glycyphagus domesticus, Halotydeus destructor, Hemitarsonemus* spp., for example *Hemitarsonemus latus* (=*Polyphagotarsonemus latus*), *Hyalomma* spp., *Ixodes* spp., *Latrodectus* spp., *Loxosceles* spp., *Neutrombicula autumnalis, Nuphersa* spp., *Oligonychus* spp., for example *Oligonychus coffeae, Oligonychus coniferarum, Oligonychus ilicis, Oligonychus indicus, Oligonychus mangiferus, Oligonychus pratensis, Oligonychus punicae, Oligonychus yothersi, Ornithodorus* spp., *Ornithonyssus* spp., *Panonychus* spp., for example *Panonychus citri* (=*Metatetranychus citri*), *Panonychus ulmi* (=*Metatetranychus ulmi*), *Phyllocoptruta oleivora, Platytetranychus multidigituli, Polyphagotarsonemus latus, Psoroptes* spp., *Rhipicephalus* spp., *Rhizoglyphus* spp., *Sarcoptes* spp., *Scorpio maurus, Steneotarsonemus* spp., *Steneotarsonemus spinki, Tarsonemus* spp., for example *Tarsonemus confusus, Tarsonemus pallidus, Tetranychus* spp., for example *Tetranychus canadensis, Tetranychus cinnabarinus, Tetranychus turkestani, Tetranychus urticae, Trombicula alfreddugesi, Vaejovis* spp., *Vasates lycopersici;* from the class of the Chilopoda, for example *Geophilus* spp., *Scutigera* spp.;

from the order or the class of the Collembola, for example *Onychiurus armatus; Sminthurus viridis;* from the class of the Diplopoda, for example *Blaniulus guttulatus;* from the class of the Insecta, for example from the order of the Blattodea, for example *Blatta orientalis, Blattella asahinai, Blattella germanica, Leucophaea maderae, Loboptera decipiens, Neostylopyga rhombifolia, Panchlora* spp., *Parcoblatta* spp., *Periplaneta* spp., for example *Periplaneta americana, Periplaneta australasiae, Pycnoscelus surinamensis, Supella longipalpa;* from the order of the Coleoptera, for example Acalymma *vittatum, Acanthoscelides obtectus,* Adoretus spp., *Aethina tumida, Agelastica alni, Agrilus* spp., for example *Agrilus planipennis, Agrilus coxalis, Agrilus bilineatus, Agrilus anxius, Agriotes* spp., for example *Agriotes linneatus, Agriotes mancus, Alphitobius diaperinus, Amphimallon solstitialis, Anobium punctatum, Anoplophora* spp., for example *Anoplophora glabripennis, Anthonomus* spp., for example *Anthonomus grandis* or *Anthonomus rubi, Anthrenus* spp., *Apion* spp., *Apogonia* spp., *Atomaria* spp., for example *Atomaria linearis, Attagenus* spp., *Baris caerulescens, Bruchidius obtectus, Bruchus* spp., for example *Bruchus pisorum, Bruchus rufimanus, Cassida* spp., *Cerotoma trifurcata, Ceutorrhynchus* spp., for example *Ceutorrhynchus assimilis, Ceutorrhynchus quadridens, Ceutorrhynchus rapae, Chaetocnema* spp., for example *Chaetocnema confinis, Chaetocnema denticulata, Chaetocnema ectypa, Cleonus mendicus, Conoderus* spp., *Cosmopolites* spp., for example *Cosmopolites sordidus, Costelytra zealandica, Ctenicera* spp., *Curculio* spp., for example *Curculio caryae, Curculio caryatrypes, Curculio obtusus, Curculio sayi, Cryptolestes ferrugineus, Cryptolestes pusillus, Cryptorhyn-* chus lapathi, Cryptorhynchus mangiferae, Cylindrocopturus spp., Cylindrocopturus adspersus, Cylindrocopturus furnissi, Dendroctonus spp., for example Dendroctonus ponderosae, Dermestes spp., Diabrotica spp., for example Diabrotica balteata, Diabrotica barberi, Diabrotica undecimpunctata howardi, Diabrotica undecimpunctata undecimpunctata, Diabrotica virgifera virgifera, Diabrotica virgifera zeae, Dichocrocis spp., Dicladispa armigera, Diloboderus spp., Epicaerus spp., Epilachna spp., for example Epilachna borealis, Epilachna varivestis, Epitrix spp., for example Epitrix cucumeris, Epitrix fuscula, Epitrix hirtipennis, Epitrix subcrinita, Epitrix tuberis, Faustinus spp., Gibbium psylloides, Gnathocerus cornutus, Hellula undalis, Heteronychus arator, Heteronyx spp., Hylamorpha elegans, Hylotrupes bajulus, Hypera postica, Hypomeces squamosus, Hypothenemus spp., for example Hypothenemus hampei, Hypothenemus obscurus, Hypothenemus pubescens, Lachnosterna consanguinea, Lasioderma serricorne, Latheticus oryzae, Lathridius spp., Lema spp., Leptinotarsa decemlineata, Leucoptera spp., for example Leucoptera coffeella, Limonius ectypus, Lissorhoptrus oryzophilus, Listronotus (=Hyperodes) spp., Lixus spp., Luperodes spp., Luperomorpha xanthodera, Lyctus spp., Megacyllene spp., for example Megacyllene robiniae, Megascelis spp., Melanotus spp., for example Melanotus longulus oregonensis, Meligethes aeneus, Melolontha spp., for example Melolontha melolontha, Migdolus spp., Monochamus spp., Naupactus xanthographus, Necrobia spp., Neogalerucella spp., Niptus hololeucus, Oryctes rhinoceros, Oryzaephilus surinamensis, Oryzaphagus oryzae, Otiorhynchus spp., for example Otiorhynchus cribricollis, Otiorhynchus ligustici, Otiorhynchus ovatus, Otiorhynchus rugosostriarus, Otiorhynchus sulcatus, Oulema spp., for example Oulema melanopus, Oulema oryzae, Oxycetonia jucunda, Phaedon cochleariae, Phyllophaga spp., Phyllophaga helleri, Phyllotreta spp., for example Phyllotreta armoraciae, Phyllotreta pusilla, Phyllotreta ramosa, Phyllotreta striolata, Popillia japonica, Premnotrypes spp., Prostephanus truncatus, Psylliodes spp., for example Psylliodes affinis, Psylliodes chrysocephala, Psylliodes punctulata, Ptinus spp., Rhizobius ventralis, Rhizopertha dominica, Rhynchophorus spp., Rhynchophorus ferrugineus, Rhynchophorus palmarum, Scolytus spp., for example Scolytus multistriatus, Sinoxylon perforans, Sitophilus spp., for example Sitophilus granarius, Sitophilus linearis, Sitophilus oryzae, Sitophilus zeamais, Sphenophorus spp., Stegobium paniceum, Sternechus spp., for example Sternechus paludatus, Symphyletes spp., Tanymecus spp., for example Tanymecus dilaticollis, Tanymecus indicus, Tanymecus palliatus, Tenebrio molitor, Tenebrioides mauretanicus, Tribolium spp., for example Tribolium audax, Tribolium castaneum, Tribolium confusum, Trogoderma spp., Tychius spp., Xylotrechus spp., Zabrus spp., for example Zabrus tenebrioides;

from the order of the Dermaptera, for example Anisolabis maritime, Forficula auricularia, Labidura riparia;

from the order of the Diptera, for example Aedes spp., for example Aedes aegypti, Aedes albopictus, Aedes sticticus, Aedes vexans, Agromyza spp., for example Agromyza frontella, Agromyza parvicornis, Anastrepha spp., Anopheles spp., for example Anopheles quadrimaculatus, Anopheles gambiae, Asphondylia spp., Bactrocera spp., for example Bactrocera cucurbitae, Bactrocera dorsalis, Bactrocera oleae, Bibio hortulanus, Calliphora erythrocephala, Calliphora vicina, Ceratitis capitata, Chironomus spp., Chrysomya spp., Chrysops spp., Chrysozona pluvialis, Cochliomya spp., Contarinia spp., for example Contarinia johnsoni, Contarinia nasturtii, Contarinia pyrivora, Contarinia schulzi, Contarinia sorghicola, Contarinia tritici, Cordylobia anthropophaga, Cricotopus sylvestris, Culex spp., for example Culex pipiens, Culex quinquefasciatus, Culicoides spp., Culiseta spp., Cuterebra spp., Dacus oleae, Dasineura spp., for example Dasineura brassicae, Delia spp., for example Delia antiqua, Delia coarctata, Delia florilega, Delia platura, Delia radicum, Dermatobia hominis, Drosophila spp., for example Drosphila melanogaster, Drosophila suzukii, Echinocnemus spp., Euleia heraclei, Fannia spp., Gasterophilus spp., Glossina spp., Haematopota spp., Hydrellia spp., Hydrellia griseola, Hylemya spp., Hippobosca spp., Hypoderma spp., Liriomyza spp., for example Liriomyza brassicae, Liriomyza huidobrensis, Liriomyza sativae, Lucilia spp., for example Lucilia cuprina, Lutzomyia spp., Mansonia spp., Musca spp., for example Musca domestica, Musca domestica vicina, Oestrus spp., Oscinella frit, Paratanytarsus spp., Paralauterborniella subcincta, Pegomya or Pegomyia spp., for example Pegomya betae, Pegomya hyoscyami, Pegomya rubivora, Phlebotomus spp., Phorbia spp., Phormia spp., Piophila casei, Platyparea poeciloptera, Prodiplosis spp., Psila rosae, Rhagoletis spp., for example Rhagoletis cingulata, Rhagoletis completa, Rhagoletis fausta, Rhagoletis indifferens, Rhagoletis mendax, Rhagoletis pomonella, Sarcophaga spp., Simulium spp., for example Simulium meridionale, Stomoxys spp., Tabanus spp., Tetanops spp., Tipula spp., for example Tipula paludosa, Tipula simplex, Toxotrypana curvicauda;

from the order of the Hemiptera, for example Acizzia acaciaebaileyanae, Acizzia dodonaeae, Acizzia uncatoides, Acrida turrita, Acyrthosipon spp., for example Acyrthosiphon pisum, Acrogonia spp., Aeneolamia spp., Agonoscena spp., Aleurocanthus spp., Aleyrodes proletella, Aleurolobus barodensis, Aleurothrixus floccosus, Allocaridara malayensis, Amrasca spp., for example Amrasca bigutulla, Amrasca devastans, Anuraphis cardui, Aonidiella spp., for example Aonidiella aurantii, Aonidiella citrina, Aonidiella inornata, Aphanostigma piri, Aphis spp., for example Aphis citricola, Aphis craccivora, Aphis fabae, Aphis forbesi, Aphis glycines, Aphis gossypii, Aphis hederae, Aphis illinoisensis, Aphis middletoni, Aphis nasturtii, Aphis nerii, Aphis pomi, Aphis spiraecola, Aphis viburniphila, Arboridia apicalis, Arytainilla spp., Aspidiella spp., Aspidiotus spp., for example Aspidiotus nerii, Atanus spp., Aulacorthum solani, Bemisia tabaci, Blastopsylla occidentalis, Boreioglycaspis melaleucae, Brachycaudus helichrysi, Brachycolus spp., Brevicoryne brassicae, Cacopsylla spp., for example Cacopsylla pyricola, Calligypona marginata, Capulinia spp., Carneocephala fulgida, Ceratovacuna lanigera, Cercopidae, Ceroplastes spp., Chaetosiphon fragaefolii, Chionaspis tegalensis, Chlorita onukii, Chondracris rosea, Chromaphis juglandicola, Chrysomphalus aonidum, Chrysomphalus ficus, Cicadulina mbila, Coccomytilus halli, Coccus spp., for example Coccus hesperidum, Coccus longulus, Coccus pseudomagnoliarum, Coccus viridis, Cryptomyzus ribis, Cryptoneossa spp., Ctenarytaina spp., Dalbulus spp., Dialeurodes chittendeni, Dialeurodes citri, Diaphorina citri, Diaspis spp., Diuraphis spp., Doralis spp., Drosicha spp., Dysaphis spp., for example Dysaphis apiifolia, Dysaphis plantaginea, Dysaphis tulipae, Dysmicoccus spp., Empoasca spp., for example Empoasca abrupta, Empoasca fabae, Empoasca maligna, Empoasca solana, Empoasca stevensi, Eriosoma spp., for example Eriosoma americanum, Eriosoma lanigerum, Eriosoma pyricola, Erythroneura spp., Eucalyptolyma spp., Euphyllura spp., Euscelis bilobatus, Ferrisia spp., Fiorinia spp., Furcaspis oceanica, Geococcus coffeae, Glycaspis spp., Heteropsylla cubana, Heteropsylla spinulosa, Homalodisca coagulata, Hyalopterus arundinis, Hyalopterus pruni, Icerya spp., for example Icerya purchasi, Idiocerus spp., Idioscopus spp., Laodelphax striatellus, Lecanium spp., for example Lecanium corni (=Parthenolecanium corni), Lepidosaphes spp., for example Lepidosaphes ulmi, Lipaphis erysimi, Lopholeucaspis japonica, Lycorma delicatula, Macrosiphum spp., for example Macrosiphum euphorbiae, Macrosiphum lilii, Macrosiphum rosae, Macrosteles facifrons, Mahanarva spp., Melanaphis sacchari, Metcalfiella spp., Metcalfa pruinosa, Metopolophium dirhodum, Monellia costalis, Monelliopsis pecanis, Myzus spp., for example Myzus ascalonicus, Myzus cerasi, Myzus ligustri, Myzus ornatus, Myzus persicae,. Myzus nicotianae, Nasonovia ribisnigri, Neomaskellia spp., Nephotettix spp., for example Nephotettix cincticeps, Nephotettix nigropictus, Nettigoniclla spectra, Nilaparvata lugens, Oncometopia spp., Orthezia praelonga, Oxya chinensis, Pachypsylla spp., Parabemisia myricae, Paratrioza spp., for example Paratrioza cockerelli, Parlatoria spp., Pemphigus spp., for example Pemphigus bursarius, Pemphigus populivenae, Peregrinus maidis, Perkinsiella spp., Phenacoccus spp., for example Phenacoccus madeirensis, Phloeomyzus passerinii, Phorodon humuli, Phylloxera spp., for example Phylloxera devastatrix, Phylloxera notabilis, Pinnaspis aspidistrae, Planococcus spp., for example Planococcus citri, Prosopidopsylla flava, Protopulvinaria pyriformis, Pseudaulacaspis pentagona, Pseudococcus spp., for example Pseudococcus calceolariae, Pseudococcus comstocki, Pseudococcus longispinus, Pseudococcus maritimus, Pseudococcus viburni, Psyllopsis spp., Psylla spp., for example Psylla buxi, Psylla mali, Psylla pyri, Pteromalus spp., Pulvinaria spp., Pyrilla spp., Quadraspidiotus spp., for example Quadraspidiotus juglansregiae, Quadraspidiotus ostreaeformis, Quadraspidiotus perniciosus, Quesada gigas, Rastrococcus spp., Rhopalosiphum spp., for example Rhopalosiphum maidis, Rhopalosiphum oxyacanthae, Rhopalosiphum padi, Rhopalosiphum rufiabdominale, Saissetia spp., for example Saissetia coffeae, Saissetia miranda, Saissetia neglecta, Saissetia oleae, Scaphoideus titanus, Schizaphis graminum, Selenaspidus articulatus, Sipha flava, Sitobion avenae, Sogata spp., Sogatella furcifera, Sogatodes spp., Stictocephala festina, Siphoninus phillyreae, Tenalaphara malayensis, Tetragonocephela spp., Tinocallis caryaefoliae, Tomaspis spp., Toxoptera spp., for example Toxoptera aurantii, Toxoptera citricidus, Trialeurodes vaporariorum, Trioza spp., for example Trioza diospyri, Typhlocyba spp., Unaspis spp., Viteus vitifolii, Zygina spp.;

from the suborder of the Heteroptera, for example Aelia spp., Anasa tristis, Antestiopsis spp., Boisea spp., Blissus spp., Calocoris spp., Campylomma livida, Cavelerius spp., Cimex spp., for example Cimex adjunctus, Cimex hemipterus, Cimex lectularius, Cimex pilosellus, Collaria spp., Creontiades dilutus, Dasynus piperis, Dichelops furcatus, Diconocoris hewetti, Dysdercus spp., Euschistus spp., for example Euschistus heros, Euschistus servus, Euschistus tristigmus, Euschistus variolarius, Eurydema spp., Eurygaster spp., Halyomorpha halys, Heliopeltis spp., Horcias nobilellus, Leptocorisa spp., Leptocorisa varicornis, Leptoglossus occidentalis, Leptoglossus phyllopus, Lygocoris spp., for example Lygocoris pabulinus, Lygus spp., for example Lygus elisus, Lygus hesperus, Lygus lineolaris, Macropes excavatus, Megacopta cribraria, Miridae, Monalonion atratum, Nezara spp., for example Nezara viridula, Nysius spp., Oebalus spp., Pentomidae, Piesma quadrata, Piezodorus spp., for example Piezodorus guildinii, Psallus spp., Pseudacysta persea, Rhodnius spp., Sahlbergella singularis, Scaptocoris castanea, Scotinophora spp., Stephanitis nashi, Tibraca spp., Triatoma spp.;

from the order of the Hymenoptera, for example Acromyrmex spp., Athalia spp., for example Athalia rosae, Atta spp., Camponotus spp., Dolichovespula spp., Diprion spp., for example Diprion similis, Hoplocampa spp., for example Hoplocampa cookei, Hoplocampa testudinea, Lasius spp., Linepithema (Iridiomyrmex) humile, Monomorium pharaonis, Paratrechina spp., Paravespula spp., Plagiolepis spp., Sirex spp., for example Sirex noctilio, Solenopsis invicta, Tapinoma spp., Technomyrmex albipes, Urocerus spp., Vespa spp., for example Vespa crabro, Wasmannia auropunctata, Xeris spp.;

from the order of the Isopoda, for example Armadillidium vulgare, Oniscus asellus, Porcellio scaber;

from the order of the Isoptera, for example Coptotermes spp., for example Coptotermes formosanus, Cornitermes cumulans, Cryptotermes spp., Incisitermes spp., Kalotermes spp., Microtermes obesi, Nasutitermes spp., Odontotermes spp., Porotermes spp., Reticulitermes spp., for example Reticulitermes flavipes, Reticulitermes hesperus;

from the order of the Lepidoptera, for example Achroia grisella, Acronicta major, Adoxophyes spp., for example Adoxophyes orana, Aedia leucomelas, Agrotis spp., for example Agrotis segetum, Agrotis ipsilon, Alabama spp., for example Alabama argillacea, Amyelois transitella, Anarsia spp., Anticarsia spp., for example Anticarsia gemmatalis, Argyroploce spp., Autographa spp., Barathra brassicae, Blastodacna atra, Borbo cinnara, Bucculatrix thurberiella, Bupalus piniarius, Busseola spp., Cacoecia spp., Caloptilia theivora, Capua reticulana, Carpocapsa pomonella, Carposina niponensis, Cheimatobia brumata, Chilo spp., for example Chilo plejadellus, Chilo suppressalis, Choreutis pariana, Choristoneura spp., Chrysodeixis chalcites, Clysia ambiguella, Cnaphalocerus spp., Cnaphalocrocis medinalis, Cnephasia spp., Conopomorpha spp., Conotrachelus spp., Copitarsia spp., Cydia spp., for example Cydia nigricana, Cydia pomonella, Dalaca noctuides, Diaphania spp., Diparopsis spp., Diatraea saccharalis, Dioryctria spp., for example Dioryctria zimmermani, Earias spp., Ecdytolopha aurantium, Elasmopalpus lignosellus, Eldana saccharina, Ephestia spp., for example Ephestia elutella, Ephestia kuehniella, Epinotia spp., Epiphyas postvittana, Erannis spp., Erschoviella musculana, Etiella spp., Eudocima spp., Eulia spp., Eupoecilia ambiguella, Euproctis spp., for example Euproctis

*chrysorrhoea, Euxoa* spp., *Feltia* spp., *Galleria mellonella, Gracillaria* spp., *Grapholitha* spp., for example *Grapholita molesta, Grapholita prunivora, Hedylepta* spp., *Helicoverpa* spp., for example *Helicoverpa armigera, Helicoverpa zea, Heliothis* spp., for example *Heliothis virescens, Hofmannophila pseudospretella, Homoeosoma* spp., *Homona* spp., *Hyponomeuta padella, Kakivoria flavofasciata, Lampides* spp., *Laphygma* spp., *Laspeyresia molesta, Leucinodes orbonalis, Leucoptera* spp., for example *Leucoptera coffeella, Lithocolletis* spp., for example *Lithocolletis blancardella, Lithophane antennata, Lobesia* spp., for example *Lobesia botrana, Loxagrotis albicosta, Lymantria* spp., for example *Lymantria dispar, Lyonetia* spp., for example *Lyonetia clerkella, Malacosoma neustria, Maruca testulalis, Mamestra brassicae, Melanitis leda, Mocis* spp., *Monopis obviella, Mythimna separata, Nemapogon cloacellus, Nymphula* spp., *Oiketicus* spp., *Omphisa* spp., *Operophtera* spp., *Oria* spp., *Orthaga* spp., *Ostrinia* spp., for example *Ostrinia nubilalis, Panolis flammea, Parnara* spp., *Pectinophora* spp., for example *Pectinophora gossypiella, Perileucoptera* spp., *Phthorimaea* spp., for example *Phthorimaea operculella, Phyllocnistis citrella, Phyllonorycter* spp., for example *Phyllonorycter blancardella, Phyllonorycter crataegella, Pieris* spp., for example *Pieris rapae, Platynota stultana, Plodia interpunctella, Plusia* spp., *Plutella xylostella* (=*Plutella maculipennis*), *Podesia* spp., for example *Podesia syringae, Prays* spp., *Prodenia* spp., *Protoparce* spp., *Pseudaletia* spp., for example *Pseudaletia unipuncta, Pseudoplusia includens, Pyrausta nubilalis, Rachiplusia nu, Schoenobius* spp., for example *Schoenobius bipunctifer, Scirpophaga* spp., for example *Scirpophaga innotata, Scotia segetum, Sesamia* spp., for example *Sesamia inferens, Sparganothis* spp., *Spodoptera* spp., for example *Spodoptera eradiana, Spodoptera exigua, Spodoptera frugiperda, Spodoptera praefica, Stathmopoda* spp., *Stenoma* spp., *Stomopteryx subsecivella, Synanthedon* spp., *Tecia solanivora, Thaumetopoea* spp., *Thermesia gemmatalis, Tinea cloacella, Tinea pellionella, Tineola bisselliella, Tortrix* spp., *Trichophaga tapetzella, Trichoplusia* spp., for example *Trichoplusia ni, Tryporyza incertulas, Tuta absoluta, Virachola* spp.;

from the order of the Orthoptera or Saltatoria, for example *Acheta domesticus, Dichroplus* spp., *Gryllotalpa* spp., for example *Gryllotalpa gryllotalpa, Hieroglylphus* spp., *Locusta* spp., for example *Locusta migratoria, Melanoplus* spp., for example *Melanoplus devastator, Paratlanticus ussuriensis, Schistocerca gregaria;* from the order of the Phthiraptera, for example *Damalinia* spp., *Haematopinus* spp., *Linognathus* spp., *Pediculus* spp., *Phylloxera vastatrix, Phthirus pubis, Trichodectes* spp.;

from the order of the Psocoptera, for example *Lepinotus* spp., *Liposcelis* spp.;

from the order of the Siphonaptera, for example, *Ceratophyllus* spp., *Ctenocephalides* spp., for example *Ctenocephalides canis, Ctenocephalides felis, Pulex irritans, Tunga penetrans, Xenopsylla cheopis;* from the order of the Thysanoptera, for example *Anaphothrips obscurus, Baliothrips biformis, Chaetanaphothrips leeuweni, Drepanothrips reuteri, Enneothrips flavens, Frankliniella* spp., for example *Frankliniella fusca, Frankliniella occidentalis, Frankliniella schultzei, Frankliniella tritici, Frankliniella vaccinii,*

*Frankliniella williamsi, Haplothrips* spp., *Heliothrips* spp., *Hercinothrips femoralis, Kakothrips* spp., *Rhipiphorothrips cruentatus, Scirtothrips* spp., *Taeniothrips cardamomi, Thrips* spp., for example *Thrips palmi, Thrips tabaci;* from the order of the Zygentoma (=Thysanura), for example *Ctenolepisma* spp., *Lepisma saccharina, Lepismodes inquilinus, Thermobia domestica;* from the class of the Symphyla, for example *Scutigerella* spp., for example *Scutigerella immaculata;* pests from the phylum of the Mollusca, for example from the class of the Bivalvia, for example *Dreissena* spp., and also from the class of the Gastropoda, for example *Arion* spp., for example *Arion* ater *rufus, Biomphalaria* spp., *Bulinus* spp., *Deroceras* spp., for example *Deroceras laeve, Galba* spp., *Lymnaea* spp., *Oncomelania* spp., *Pomacea* spp., *Succinea* spp.;

plant pests from the phylum of the Nematoda, i.e. phytoparasitic nematodes, in particular *Aglenchus* spp., for example *Aglenchus agricola, Anguina* spp., for example *Anguina tritici, Aphelenchoides* spp., for example *Aphelenchoides arachidis, Aphelenchoides fragariae, Belonolaimus* spp., for example *Belonolaimus gracilis, Belonolaimus longicaudatus, Belonolaimus nortoni, Bursaphelenchus* spp., for example *Bursaphelenchus cocophilus, Bursaphelenchus* eremus, *Bursaphelenchus xylophilus, Cacopaurus* spp., for example *Cacopaurus pestis, Criconemella* spp., for example *Criconemella curvata, Criconemella onoensis, Criconemella ornata, Criconemella rusium, Criconemella xenoplax* (=*Mesocriconema xenoplax*), *Criconemoides* spp., for example *Criconemoides ferniae, Criconemoides onoense, Criconemoides ornatum, Ditylenchus* spp., for example *Ditylenchus dipsaci, Dolichodorus* spp., *Globodera* spp., for example *Globodera pallida, Globodera rostochiensis, Helicotylenchus* spp., for example *Helicotylenchus dihystera, Hemicriconemoides* spp., *Hemicycliophora* spp., *Heterodera* spp., for example *Heterodera avenae, Heterodera glycines, Heterodera schachtii, Hirschmaniella* spp., *Hoplolaimus* spp., *Longidorus* spp., for example *Longidorus africanus, Meloidogyne* spp., for example *Meloidogyne chitwoodi, Meloidogyne fallax, Meloidogyne hapla, Meloidogyne incognita, Meloinema* spp., *Nacobbus* spp., *Neotylenchus* spp., *Paralongidorus* spp., *Paraphelenchus* spp., *Paratrichodorus* spp., for example *Paratrichodorus minor, Paratylenchus* spp., *Pratylenchus* spp., for example *Pratylenchus penetrans, Pseudohalenchus* spp., *Psilenchus* spp., *Punctodera* spp., *Quinisulcius* spp., *Radopholus* spp., for example *Radopholus citrophilus, Radopholus similis, Rotylenchulus* spp., *Rotylenchus* spp., *Scutellonema* spp., *Subanguina* spp., *Trichodorus* spp., for example *Trichodorus obtusus, Trichodorus primitivus, Tylenchorhynchus* spp., for example *Tylenchorhynchus annulatus, Tylenchulus* spp., for example *Tylenchulus semipenetrans, Xiphinema* spp., for example *Xiphinema index.*

The plant nematodes include, for example, *Aglenchus agricola, Anguina tritici, Aphelenchoides arachidis, Aphelenchoides fragaria,* and the stem and leaf endoparasites *Aphelenchoides* spp., *Belonolaimus gracilis, Belonolaimus longicaudatus, Belonolaimus nortoni, Bursaphelenchus cocophilus, Bursaphelenchus eremus, Bursaphelenchus xylophilus* and *Bursaphelenchus* spp., *Cacopaurus pestis, Criconemella curvata, Criconemella onoensis, Criconemella ornata, Criconemella rusium, Criconemella xenoplax*

(=*Mesocriconema xenoplax*) and *Criconemella* spp., *Criconemoides ferniae*, *Criconemoides onoense*, *Criconemoides ornatum* and *Criconemoides* spp., *Ditylenchus destructor*, *Ditylenchus dipsaci*, *Ditylenchus myceliophagus* and also the stem and leaf endoparasites *Ditylenchus* spp., *Dolichodorus heterocephalus*, *Globodera pallida* (=*Heterodera pallida*), *Globodera rostochiensis* (yellow potato cyst nematode), *Globodera solanacearum*, *Globodera tabacum*, *Globodera virginia* and the non-migratory cyst-forming parasites *Globodera* spp., *Helicotylenchus digonicus*, *Helicotylenchus dihystera*, *Helicotylenchus erythrine*, *Helicotylenchus multicinctus*, *Helicotylenchus nannus*, *Helicotylenchus pseudorobustus* and *Helicotylenchus* spp., *Hemicriconemoides*, *Hemicycliophora arenaria*, *Hemicycliophora nudata*, *Hemicycliophora parvana*, *Heterodera avenae*, *Heterodera cruciferae*, *Heterodera glycines* (soya bean cyst nematode), *Heterodera oryzae*, *Heterodera schachtii*, *Heterodera zeae* and the non-migratory cyst-forming parasites *Heterodera* spp., *Hirschmaniella gracilis*, *Hirschmaniella oryzae*, *Hirschmaniella spinicaudata* and the stem and leaf endoparasites *Hirschmaniella* spp., *Hoplolaimus aegyptii*, *Hoplolaimus californicus*, *Hoplolaimus columbus*, *Hoplolaimus galeatus*, *Hoplolaimus indicus*, *Hoplolaimus magnistylus*, *Hoplolaimus pararobustus*, *Longidorus africanus*, *Longidorus breviannulatus*, *Longidorus elongatus*, *Longidorus laevicapitatus*, *Longidorus vineacola* and the ectoparasites *Longidorus* spp., *Meloidogyne acronea*, *Meloidogyne africana*, *Meloidogyne arenaria*, *Meloidogyne arenaria thamesi*, *Meloidogyne artiella*, *Meloidogyne chitwoodi*, *Meloidogyne coffeicola*, *Meloidogyne ethiopica*, *Meloidogyne exigua*, *Meloidogyne fallax*, *Meloidogyne graminicola*, *Meloidogyne graminis*, *Meloidogyne hapla*, *Meloidogyne incognita*, *Meloidogyne incognita acrita*, *Meloidogyne javanica*, *Meloidogyne kikuyensis*, *Meloidogyne minor*, *Meloidogyne naasi*, *Meloidogyne paranaensis*, *Meloidogyne thamesi* and the non-migratory parasites *Meloidogyne* spp., *Meloinema* spp., *Nacobbus aberrans*, *Neotylenchus vigissi*, *Paraphelenchus pseudoparietinus*, *Paratrichodorus allius*, *Paratrichodorus lobatus*, *Paratrichodorus minor*, *Paratrichodorus nanus*, *Paratrichodorus porosus*, *Paratrichodorus teres* and *Paratrichodorus* spp., *Paratylenchus hamatus*, *Paratylenchus minutus*, *Paratylenchus projectus* and *Paratylenchus* spp., *Pratylenchus agilis*, *Pratylenchus alleni*, *Pratylenchus andinus*, *Pratylenchus brachyurus*, *Pratylenchus cerealis*, *Pratylenchus coffeae*, *Pratylenchus crenatus*, *Pratylenchus delattrei*, *Pratylenchus giibbicaudatus*, *Pratylenchus goodeyi*, *Pratylenchus hamatus*, *Pratylenchus hexincisus*, *Pratylenchus loosi*, *Pratylenchus neglectus*, *Pratylenchus penetrans*, *Pratylenchus pratensis*, *Pratylenchus scribneri*, *Pratylenchus teres*, *Pratylenchus thornei*, *Pratylenchus vulnus*, *Pratylenchus zeae* and the migratory endoparasites *Pratylenchus* spp., *Pseudohalenchus minutus*, *Psilenchus magnidens*, *Psilenchus tumidus*, *Punctodera chalcoensis*, *Quinisulcius acutus*, *Radopholus citrophilus*, *Radopholus similis*, the migratory endoparasites *Radopholus* spp., *Rotylenchulus borealis*, *Rotylenchulus parvus*, *Rotylenchulus reniformis* and *Rotylenchulus* spp., *Rotylenchus laurentinus*, *Rotylenchus macrodoratus*, *Rotylenchus robustus*, *Rotylenchus uniformis* and *Rotylenchus* spp., *Scutellonema brachyurum*, *Scutellonema bradys*, *Scutellonema clathricaudatum* and the migratory endoparasites *Scutellonema* spp., *Subanguina radiciola*, *Tetylenchus nicotianae*, *Trichodorus cylindricus*, *Trichodorus minor*, *Trichodorus primitivus*, *Trichodorus proximus*, *Trichodorus similis*, *Trichodorus sparsus* and the ectoparasites *Trichodorus* spp., *Tylenchorhynchus agri*, *Tylenchorhynchus brassicae*, *Tylenchorhynchus clarus*, *Tylenchorhynchus claytoni*, *Tylenchorhynchus digitatus*, *Tylenchorhynchus ebriensis*, *Tylenchorhynchus maximus*, *Tylenchorhynchus nudus*, *Tylenchorhynchus vulgaris* and *Tylenchorhynchus* spp., *Tylenchulus semipenetrans* and the *semiparasites Tylenchulus* spp., *Xiphinema americanum*, *Xiphinema brevicolle*, *Xiphinema dimorphicaudatum*, *Xiphinema index* and the ectoparasites *Xiphinema* spp.

Nematodes for the control of which the active compound combination or composition may be used include nematodes of the genus *Meloidogyne* such as the Southern root-knot nematode (*Meloidogyne incognita*), the Javanese root-knot nematode (*Meloidogyne javanica*), the Northern root-knot nematode (*Meloidogyne hapla*) and the peanut root-knot nematode (*Meloidogyne arenaria*); nematodes of the genus *Ditylenchus* such as the potato rot nematode (*Ditylenchus destructor*) and stem and bulb eelworm (*Ditylenchus dipsaci*); nematodes of the genus *Pratylenchus* such as the cob root-lesion nematode (*Pratylenchus penetrans*), the chrysanthemum root-lesion nematode (*Pratylenchus fallax*), the coffee root nematode (*Pratylenchus coffeae*), the tea root nematode (*Pratylenchus loosi*) and the walnut root-lesion nematode (*Pratylenchus vulnus*); nematodes of the genus *Globodera* such as the yellow potato cyst nematode (*Globodera rostochiensis*) and the white potato cyst nematode (*Globodera pallida*); nematodes of the genus *Heterodera* such as the soya bean cyst nematode (*Heterodera glycines*) and beet cyst eelworm (*Heterodera schachtii*); nematodes of the genus *Aphelenchoides* such as the rice white-tip nematode (*Aphelenchoides besseyi*), the chrysanthemum nematode (*Aphelenchoides ritzemabosi*) and the strawberry nematode (*Aphelenchoides fragariae*); nematodes of the genus *Aphelenchus* such as the fungivorous nematode (*Aphelenchus avenae*); nematodes of the genus *Radopholus*, such as the burrowing nematode (*Radopholus similis*); nematodes of the genus *Tylenchulus* such as the citrus root nematode (*Tylenchulus semipenetrans*); nematodes of the genus *Rotylenchulus* such as the reniform nematode (*Rotylenchulus reniformis*); tree-dwelling nematodes such as the pine wood nematode (*Bursaphelenchus xylophilus*) and the red ring nematode (*Bursaphelenchus cocophilus*) and the like.

Preferably, the active compound combination is effective against *Brevipalpus phoenicis*, *Panonychus citri* (=*Metatetranychus citri*), *Panonychus ulmi* (=*Metatetranychus ulmi*), *Phyllocoptruta oleivora*, *Polyphagotarsonemus latus*, *Tetranychus urticae*, *Vasates lycopersici*; *Ceutorrhynchus* spp., *Meligethes aeneus*, *Anastrepha* spp., *Bactrocera dorsalis*, *Dacus oleae*, *Delia radicum*, *Drosophila suzukii*, *Psila rosae*, *Rhagoletis* spp., *Rhagoletis completa*, *Acyrthosiphon pisum*, *Anthonomus rubi*, *Aonidiella aurantii*, *Aphis fabae*, *Aphis gossypii*, *Aphis pomi*, *Aphis spiraecola*, *Bemisia tabaci*, *Brevicoryne brassicae*, *Cacopsylla pyricola*, *Ceroplastes* spp., *Diaphorina citri*, *Dysaphis plantaginea*, *Empoasca* spp., *Eriosoma lanigerum*, *Halyomorpha halys*, *Hyalopterus pruni*, *Leptinotarsa decemlineata*, *Macrosiphum euphorbiae*, *Myzus cerasi*, *Myzus persicae*, *Nasonovia ribisnigri*, *Planococcus citri*, *Psylla pyri*, *Quadraspidiotus perniciosus*, *Rhopalosiphum padi*, *Scaphoideus titanus*, *Sitobion avenae*, *Trialeurodes vaporariorum*, *Frankliniella occidentalis*, *Thrips palmi*, *Thrips tabaci*; *Meloidogyne incognita*.

It is most preferred that the combination is active against at least one plant pest selected from *Aphis gossypii*, *Macrosiphum euphorbiae*, *Leptinotarsa decemlineata*, *Halyomorpha halys* and *Anthonomus rubi*, preferably against at least two or at least three, most preferably against all of the above.

In another aspect, the present invention relates to a method for reducing overall damage of plants and plant parts as well as losses in harvested fruits or vegetables caused by plant pests comprising the step of simultaneously or sequentially applying one or more fatty acids or derivatives thereof as defined herein and at least one pesticidally active agent as defined herein to a plant or seed or a locus where said plant or seed is intended to be grown.

In another aspect, the present invention relates to a method for increasing crop yield and/or the quality of food commodities comprising the step of simultaneously or sequentially applying one or more fatty acids or derivatives thereof as defined herein and at least one further agent active against at least one plant pathogen and/or active in plant growth promotion biological control agent as defined herein to a plant or seed or a locus where said plant or seed is intended to be grown.

Said applying is preferably effected as a foliar or soil application or as a seed treatment as described elsewhere in more detail.

The method of the present invention includes the following application methods, namely both of the one or more fatty acids or derivatives thereof and the at least one pesticidally active agent mentioned before may be formulated into a single, stable composition with an agriculturally acceptable shelf life (so called "solo-formulation"), or being combined before or at the time of use (so called "combined-formulations").

Application

The compound combination of the invention can be applied as such, or for example in the fonm of as ready-to-use solutions, emulsions, water- or oil-based suspensions, powders, wettable powders, pastes, soluble powders, dusts, soluble granules, granules for broadcasting, suspoemulsion concentrates, natural products impregnated with the compound combination of the invention, synthetic substances impregnated with the compound combination of the invention, fertilizers or microencapsulations in polymeric substances.

Application is accomplished in a customary manner, for example by watering, spraying, atomizing, broadcasting, dusting, foaming or spreading-on. It is also possible to deploy the compound combination of the invention by the ultra-low volume method, via a drip irrigation system or drench application, to apply it in-furrow or to inject it into the soil stem or trunk. It is further possible to apply the compound combination of the invention by means of a wound seal, paint or other wound dressing. The effective and plant-compatible amount of the compound combination of the invention which is applied to the plants, plant parts, fruits, seeds or soil will depend on various factors, such as the compound/composition employed, the subject of the treatment (plant, plant part, fruit, seed or soil), the type of treatment (dusting, spraying, seed dressing), the purpose of the treatment (curative and protective), the type of microorganisms, the development stage of the microorganisms, the sensitivity of the microorganisms, the crop growth stage and the environmental conditions.

When the compound combination of the invention is used as a pesticide, the application rates can vary within a relatively wide range, depending on the kind of application. For the treatment of plant parts, such as leaves, the application rate may range from 0.1 to 10 000 g/ha, preferably from 10 to 1000 g/ha, more preferably from 50 to 300 g/ha (in the case of application by watering or dripping, it is even possible to reduce the application rate, especially when inert substrates such as rockwool or perlite are used). For the treatment of seeds, the application rate may range from 0.1 to 200 g per 100 kg of seeds, preferably from 1 to 150 g per 100 kg of seeds, more preferably from 2.5 to 25 g per 100 kg of seeds, even more preferably from 2.5 to 12.5 g per 100 kg of seeds. For the treatment of soil, the application rate may range from 0.1 to 10 000 g/ha, preferably from 1 to 5000 g/ha. The outlined application rates refer to the total application rates of compounds (A) and (B) present in the compound combination of the present invention.

These application rates are merely examples and are not intended to limit the scope of the present invention.

The compound combination of the invention can be used in combination with models e.g. embedded in computer programs for site specific crop management, satellite farming, precision farming or precision agriculture. Such models support the site specific management of agricultural sites with data from various sources such as soils, weather, crops (e.g. type, growth stage, plant health), weeds (e.g. type, growth stage), diseases, pests, nutrients, water, moisture, biomass, satellite data, yield etc. with the purpose to optimize profitability, sustainability and protection of the environment. In particular, such models can help to optimize agronomical decisions, control the precision of pesticide applications and record the work performed.

As an example, the compound of the invention can be applied to a crop plant according to appropriate dose regime if a model models the development of a plant pest and calculates that a threshold has been reached for which it is recommendable to apply the compound of the invention to the crop plant.

Commercially available systems which include agronomic models are e.g. FieldScripts™ from The Climate Corporation, Xarvio™ from BASF, AGLogic™ from John Deere, etc.

The compounds of the invention can also be used in combination with smart spraying equipment such as e.g. spot spraying or precision spraying equipment attached to or housed within a farm vehicle such as a tractor, robot, helicopter, airplane, unmanned aerial vehicle (UAV) such as a drone, etc. Such an equipment usually includes input sensors (such as e.g. a camera) and a processing unit configured to analyze the input data and configured to provide a decision based on the analysis of the input data to apply the compound of the invention to the crop plants (respectively the weeds) in a specific and precise manner. The use of such smart spraying equipment usually also requires positions systems (e.g. GPS receivers) to localize recorded data and to guide or to control farm vehicles; geographic information systems (GIS) to represent the information on intelligible maps, and appropriate farm vehicles to perform the required farm action such as the spraying.

In an example, plant pests can be detected from imagery acquired by a camera. In an example, plant pests can be identified and/or classified based on that imagery. Such identification and/classification can make use of image processing algorithms. Such image processing algorithms can utilize machine learning algorithms, such as trained neutral networks, decision trees and utilize artificial intelligence algorithms. In this manner, the compounds described herein can be applied only where needed.

If not mentioned otherwise, the expression "combination" stands for the various combinations of the one or more fatty acid or derivative thereof and the at least one pesticidally active agent, and optionally at least one fungicide, in a solo-formulation, in a single "ready-mix" form, in a combined spray mixture composed from solo-formulations, such as a "tank-mix", and especially in a combined use of the single active ingredients when applied in a sequential manner, i.e. one after the other within a reasonably short period, such as a few hours or days, e.g. 2 hours to 7 days. The order of applying the composition according to the present invention is not essential for working the present invention. Accordingly, the term "combination" also encompasses the presence of the one or more fatty acid or derivative thereof and the at least one pesticidally active agent, and optionally at least one fungicide on or in a plant to be treated or its surrounding, habitat or storage space, e.g. after simultaneously or consecutively applying the at least one biological control agent and the at least one insecticide, and optionally the at least one fungicide to a plant its surrounding, habitat or storage space.

If the one or more fatty acid or derivative thereof and the at least one pesticidally active agent, and optionally at least one fungicide are employed or used in a sequential manner, it is preferred to treat the plants or plant parts (which includes seeds and plants emerging from the seed), harvested fruits and vegetables according to the following method: Firstly applying the at least one pesticidally active agent and optionally at least one fungicide on the plant or plant parts, and secondly applying the one or more fatty acid or derivative thereof to the same plant or plant parts. The time periods between the first and the second application within a (crop) growing cycle may vary and depend on the effect to be achieved. For example, the first application is done to prevent an infestation of the plant or plant parts with insects, mites and/or nematodes (this is particularly the case when treating seeds) or to combat the infestation with insects, mites and/or nematodes (this is particularly the case when treating plants and plant parts) and the second application is done to prevent or control the infestation with insects, mites and/or nematodes. Control in this context means that the pesticidally active agent is not able to fully exterminate the pests but is able to keep the infestation on an acceptable level.

By following the before mentioned steps, a very low level of residues of the at least one specified insecticide, on the treated plant, plant parts, and the harvested fruits and vegetables can be achieved.

If not mentioned otherwise the treatment of plants or plant parts (which includes seeds and plants emerging from the seed), harvested fruits and vegetables with the composition according to the invention is carried out directly or by action on their surroundings, habitat or storage space using customary treatment methods, for example dipping, spraying, atomizing, irrigating, evaporating, dusting, fogging, broadcasting, foaming, painting, spreading-on, watering (drenching), drip irrigating. It is furthermore possible to apply the at least one biological control agent, the at least one insecticide, and optionally the at least one fungicide as solo-formulation or combined-formulations by the ultra-low volume method, or to inject the composition according to the present invention as a composition or as sole-formulations into the soil (in-furrow).

The invention furthermore relates to a kit-of-parts comprising a biological control agent selected from the group consisting of one or more fatty acids or derivatives thereof as defined herein and at least one further agent active against at least one plant pathogen and/or active in plant growth promotion as defined herein in a spatially separated arrangement The following examples illustrate the invention in a non-limiting fashion.

The advanced pesticidal activity of the active compound combinations according to the invention is evident from the example below. While the individual active compounds exhibit weaknesses with regard to the pesticidal activity, the combinations have an activity which exceeds a simple addition of activities.

A synergistic effect of pesticides is always present when the pesticidal activity of the active compound combinations exceeds the total of the activities of the active compounds when applied individually. The expected activity for a given combination of two active compounds can be calculated as follows (cf. Colby, S.R., "Calculating Synergistic and Antagonistic Responses of Herbicide Combinations", Weeds 1967, 15, 20-22):

If

X is the efficacy when active compound A is applied at an application rate of m ppm (or g/ha), Y is the efficacy when active compound B is applied at an application rate of n ppm (or g/ha), E is the efficacy when the active compounds A and B are applied at application rates of m and n ppm (or g/ha), respectively, and then $$E = X + Y - \frac{X \cdot Y}{100}$$

The degree of efficacy, expressed in % is denoted. 0% means an efficacy which corresponds to that of the control while an efficacy of 100% means that no pest is observed.

If the actual pesticidal activity exceeds the calculated value, then the activity of the combination is superadditive, i.e. a synergistic effect exists. In this case, the efficacy which was actually observed must be greater than the value for the expected efficacy (E) calculated from the abovementioned formula.

A further way of demonstrating a synergistic effect is the method of Tammes (cf. "Isoboles, a graphic representation of synergism in pesticides" in Neth. J. Plant Path., 1964, 70, 73-80).

The invention is illustrated by the following examples. However the invention is not limited to the examples.

EXAMPLE 1: PRODUCTION OF FATTY ACID DERIVATIVE

A salt derivative of fatty acids can be prepared by the following method. The derivative is obtained by mixing in a reactor a selection of fatty acids (C14-C18) derived from olive oil following oil hydrolysis whereby the glycerine is separated from the fatty acids and the fatty acids are subjected to fractional distillation in order to achieve the required specification. The fatty acids are made to react in a temperature controlled blending vessel with such quantity of potassium hydroxide and water for the production of the liquid fatty acid salt until solubilization of the components occurs and a liquid is produced that will readily form a true solution when diluted in water at the recommended rates of application for use in the field.

EXAMPLE 2: EFFICACY OF A COMBINATION OF FATTY ACID POTASSIUM SALT AND FLUPYRADIFURONE IN FIELD TRIALS

In 2020 an open field trial in potato was conducted in order to compare the efficacy of Flupyradifurone (Flupyradifurone SL200), fatty acid potassium salt (FLiPPER®), as well as both formulations applied in tank mix against Colorado Potato Beetle (*Leptinotarsa decemlineata*).

One foliar application was conducted at crop growth stage BBCH 69 according to the following treatment scheme:

TABLE 1 treatment scheme

| Treatment | Formulations | Dose Rate (rate per ha) | Water Volume |
|---|---|---|---|
| 1 | Flupyradifurone SL200 | 500 mL/ha (100 g/ha) | 400 L/ha |
| 2 | FLiPPER ® | 1% V/V (1919.2 g/ha) | 400 L/ha |
| 3 | Flupyradifurone SL200 + FLiPPER ® | 500 mL/ha + 1% V/V (100 g/ha + 1919.2 g/ha) | 400 L/ha |
| 4 | Flupyradifurone SL200 + FLiPPER ® | 500 mL/ha + 0.5% V/V (100 g/ha + 959.6 g/ha) | 400 L/ha |

In order to evaluate the efficacy, the number of living larvae were assessed 1 day after the application (1 DAA). The efficacy was calculated according to Henderson-Tilton, results are displayed in table 2 below.

TABLE 2

Results

| Treatment | Formulations | Dose Rate | Efficacy observed H-T [%] 1 DAA | Efficacy calculated |
|---|---|---|---|---|
| 1 | Flupyradifurone SL200 | 500 mL/ha | 69.6 | |
| 2 | FLiPPER ® | 1% v/v | 69.1 | |
| 3 | Flupyradifurone SL200 + FLiPPER ®; 1:19.2 | 500 mL/ha + 1% V/V | 95.0 | 90.6 |
| 4 | Flupyradifurone SL200 + FLiPPER ®; 1:9.6 | 500 mL/ha + 0.5% V/V | 92.6 | |

Conclusion: The combination of fatty acid potassium salt with Flupyradifurone in tank-mix provides synergistic activity against *Leptinotarsa decemlineata* in potato, compared to Flupyradifurone or fatty acid potassium salt applied on its own. Activity was increased as compared to the calculated value, even when the dose rate of fatty acid potassium salt in the tank-mix was reduced from 1 to 0.5% V/V.

EXAMPLE 3: EFFICACY OF A COMBINATION OF FATTY ACID POTASSIUM SALT AND VARIOUS INSECTICIDES IN FIELD TRIAL

In 2020 an open field trial in peach was conducted in Italy, in order to compare the efficacy of Acetamiprid (Acetamiprid SL50), Flupyradifurone (Flupyradifurone SL200), fatty acid potassium salt (FLiPPER®), as well as tank mixes of each of the chemical products with FLiPPER® against Brown Marmorated Stink Bug (*Halyomorpha halys*). One foliar application was conducted at crop growth stage BBCH 77 at a canopy height (CH) of 2 m according to the following treatment scheme:

TABLE 3 treatment scheme

| Treatment | Formulations | Dose Rate (rate per ha) | Water Volume |
|---|---|---|---|
| 1 | Acetamiprid SL50 | 1500 mL/ha (75 g/ha) | 500 L/ha/m CH |
| 2 | Flupyradifurone SL200 | 300 mL/ha/m CH, (120 g/ha) | 500 L/ha/m CH |
| 3 | FLiPPER ® | 1% V/V (4798 g/ha) | 500 L/ha/m CH |
| 4 | Acetamiprid SL50 + FLiPPER ® | 1500 mL/ha + 1% V/V (75 g/ha + 4798 g/ha) | 500 L/ha/m CH |
| 5 | Flupyradifurone SL200 + FLiPPER ® | 300 mL/ha/m CH + 1% V/V (120 g/ha + 4798 g/ha) | 500 L/ha/m CH |

In order to evaluate the efficacy, the number of dead larvae were assessed 1 and 5 days after the application (1 & 5 DAA). The efficacy is given as number of dead larvae per plot in table 4 below.

TABLE 4

Results

| | | | Efficacy [no. dead larvae/plot] | |
|---|---|---|---|---|
| Treatment | Formulations | Dose Rate | 1 DAA | 5 DAA |
| 1 | Acetamiprid SL50 | 1500 mL/ha | 13.8 | 26.5 |
| 2 | Flupyradifurone SL200 | 300 mL/ha/m CH | 13.2 | 24.8 |
| 3 | FLiPPER ® | 1% V/V | 13.8 | 23.8 |
| 4 | Acetamiprid SL50 + FLiPPER ®; 1:64 | 1500 mL/ha + 1% V/V | 51.3 | 29.8 |
| 5 | Flupyradifurone SL200 + FLiPPER ®; 1:40 | 300 mL/ha/m CH + 1% V/V | 40.0 | 37.3 |

Conclusion: The combination of fatty acid potassium salt (FLiPPER®) with Flupyradifurone (Flupyradifurone SL200) or Acetamiprid (Acetamiprid SL50) in tank-mix provides increased activity against *Halyomorpha halys* in peach tree, compared to the respective formulations applied on their own.

EXAMPLE 4: EFFICACY OF A COMBINATION OF FATTY ACID POTASSIUM SALT AND DELTAMETHRIN

In 2017 one trial in strawberry was conducted in the Netherlands, in order to compare the efficacy of Deltamethrin EC25, FLiPPER®, as well as both formulations applied in tank mix against *Anthonomus rubi*. Two foliar applications were conducted at an interval of 5 days at crop growth stage BBCH 89 according to the following treatment scheme:

TABLE 5 treatment scheme

| Treatment | Formulations | Dose Rate (rate per ha) | Water Volume |
|---|---|---|---|
| 1 | Deltamethrin EC25 | 120 mL/ha (3 g/ha) | 400 L/ha |
| 2 | FLiPPER ® | 1% V/V (1919.2 g/ha) | 400 L/ha |

TABLE 5-continued treatment scheme

| Treatment | Formulations | Dose Rate (rate per ha) | Water Volume |
|---|---|---|---|
| 3 | Deltamethrin EC25 + FLiPPER ® | 120 mL/ha + 1% V/V (3 g/ha + 1919.2 g/ha) | 400 L/ha |

In order to evaluate the efficacy, the number of living insects were assessed 4 days after the 2nd application (4 DAB). The efficacy was calculated according to ABBOTT, results are displayed in table 6 below.

TABLE 6

Results

| Treatment | Formulations | Dose Rate | Efficacy observed ABBOTT [%] 4 DAB | Efficacy calculated |
|---|---|---|---|---|
| 1 | Deltamethrin EC25 | 120 mL/ha | 47.7 | |
| 2 | FLiPPER ® | 1% v/v | 33.8 | |
| 3 | Deltamethrin EC25 + FLiPPER ®; 1:640 | 120 mL/ha + 1% V/V | 66.2 | 63.4 |

Conclusion: The combination of fatty acid potassium salt (FLiPPER®) with Deltamethrin (Deltamethrin EC25) in tank-mix provided increased activity against *Anthonomus rubi* in strawberry, compared to the respective formulations applied on their own.

EXAMPLE 5: EFFICACY OF A COMBINATION OF FATTY ACID POTASSIUM SALT AND THIACLOPRID OR DELTAMETHRIN

A trial in strawberry was conducted in the Netherlands, in order to compare the efficacy of thiacloprid (Thiacloprid SC480), deltamethrin (Deltamethrin EW15), fatty acid potassium salt (FLiPPER®), as well as tank mixes of each of the chemical products with said fatty acid potassium salt against *Anthonomus rubi*. Two foliar applications were conducted at an interval of 6 days at crop growth stage BBCH 59/60 according to the following treatment scheme:

TABLE 7

Treatment scheme

| Treatment | Formulations | Dose Rate (rate per ha) | Water Volume |
|---|---|---|---|
| 1 | FLiPPER ® | 1% V/V (1919.2 g/ha) | 400 L/ha |
| 2 | Thiacloprid SC480 | 0.25 L/ha (120 g/ha) | 400 L/ha |
| 3 | Deltamethrin EW15 | 0.5 L/ha (7.5 g/ha) | 400 L/ha |
| 4 | Thiacloprid SC480 + FLiPPER ® | 0.25 L/ha + 1% V/V (120 g/ha + 1919.2 g/ha) | 400 L/ha |
| 5 | Deltamethrin EW 15 + FLiPPER ® | 0.5 L/ha + 1% V/V (7.5 g/ha + 1919.2 g/ha) | 400 L/ha |

In order to evaluate the efficacy, the number of blossoms damaged by the pest were assessed 6 days after the 2nd application (6 DAB). The efficacy was calculated according to ABBOTT, results are displayed in table 8 below.

TABLE 8

Results

| Treatment | Formulations | Dose Rate | Efficacy ABBOTT [%] 6 DAB |
|---|---|---|---|
| 1 | FLiPPER ® | 1% V/V | 34.7% |
| 2 | Thiacloprid SC480 | 0.25 L/ha | 31.9% |
| 3 | Deltamethrin EW15 | 0.5 L/ha | 37.7% |
| 4 | Thiacloprid SC480 + FLiPPER ®; 1:16 | 0.25 L/ha + 1% V/V | 50.2% |
| 5 | Deltamethrin EW 15 + FLiPPER ®; 1:256 | 0.5 L/ha + 1% V/V | 47.9% |

Conclusion: The combination of fatty acid potassium salt (FLiPPER®) with deltamethrin (Deltamethrin EW15) or thiacloprid (Thiacloprid SC480) in tank-mix provided increased protection against blossom damage caused by *Anthonomus rubi*, compared to the solo-treatments.

The invention claimed is:

1. An active compound combination comprising:
   (a) a mixture of unsaturated and saturated $C_{12-24}$ fatty acid salts; and
   (b) at least one further pesticidally active agent selected from the group consisting of acetamiprid, deltamethrin, flupyradifurone, and thiacloprid,
   wherein the combination is at least 20% (a) by weight.

2. The active compound combination according to claim 1, wherein said one or more fatty acid salts are selected from unsaturated and saturated $C_{14-20}$ fatty acid salts.

3. The active compound combination according to claim 1, wherein the one or more fatty acid salts comprises two or more fatty acid salts selected from C16:0 fatty acid salts, C16:1 fatty acid salts, C18:0 fatty acid salts, C18:1 fatty acid salts, C18:2 fatty acid salts, and C18:3 fatty acid salts.

4. The active compound combination according to claim 1 wherein the one or more fatty acid salts comprises oleic acid salt.

5. The active compound combination according to claim 1, wherein the one or more fatty acids or derivatives thereof comprise one or more metal salts of fatty acids, which one or more metal salts of fatty acids are obtainable by a process comprising
   (a) Providing a vegetable oil;
   (b) Hydrolyzing triglycerides in the vegetable oil;
   (c) Extracting fatty acids from the hydrolyzed vegetable oil; and
   (d) Forming the metal salts of the extracted fatty acids.

6. The active compound combination according to claim 1, wherein the fatty acid salts are alkali metal salts.

7. The active compound combination according to claim 1, wherein said fatty acid salts are salts of lithium, sodium, potassium, magnesium, calcium, aluminum, copper iron or zinc or a mixture thereof.

8. The active compound combination according to claim 7, wherein component a) is a potassium salt of one or more fatty acid.

9. The active compound combination according to claim 1 additionally comprising at least one auxiliary selected from the group consisting of extenders, solvents, spontaneity promoters, carriers, emulsifiers, dispersants, frost protectants, thickeners and adjuvants.

10. A seed coated with the active compound combination according to claim 1.

11. A method for reducing overall damage of plants and plant parts as well as losses in harvested fruits or vegetables caused by plant pests comprising the step of simultaneously or sequentially applying a mixture of unsaturated and saturated $C_{12-24}$ fatty acid salts and at least one pesticidally active agent selected from the group consisting of acetamiprid, deltamethrin, flupyradifurone, and thiacloprid, to a plant or seed or a locus where said plant or seed is intended to be grown.

12. The active compound combination according to claim 1, wherein said at least one further pesticidally active agent is deltamethrin.

13. The active compound combination according to claim 1, wherein the combination is between 25% and 55% (a) by weight.

* * * * *